(12) United States Patent
Mepham et al.

(10) Patent No.: US 11,292,332 B2
(45) Date of Patent: Apr. 5, 2022

(54) AXLE ASSEMBLY FOR LOW FLOOR VEHICLE

(71) Applicant: ALLISON TRANSMISSION, INC., Indianapolis, IN (US)

(72) Inventors: Shaun Mepham, Clarkston, MI (US); Vikram Chopra, Troy, MI (US); Christopher G. Baillie, Lake Orion, MI (US)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 0 days.

(21) Appl. No.: 16/630,757

(22) PCT Filed: Jul. 12, 2018

(86) PCT No.: PCT/US2018/041876
§ 371 (c)(1),
(2) Date: Jan. 13, 2020

(87) PCT Pub. No.: WO2019/014479
PCT Pub. Date: Jan. 17, 2019

(65) Prior Publication Data
US 2020/0180426 A1 Jun. 11, 2020

Related U.S. Application Data

(60) Provisional application No. 62/531,737, filed on Jul. 12, 2017, provisional application No. 62/669,729, filed on May 10, 2018.

(51) Int. Cl.
*B60K 17/00* (2006.01)
*B60K 7/00* (2006.01)
(Continued)

(52) U.S. Cl.
CPC .......... *B60K 7/0007* (2013.01); *B60K 17/043* (2013.01); *B60K 17/22* (2013.01);
(Continued)

(58) Field of Classification Search
CPC .. B60K 17/046; B60K 17/043; B60K 7/0007; F16H 3/12; F16H 57/02
See application file for complete search history.

(56) References Cited

U.S. PATENT DOCUMENTS

| 4,570,741 A | 2/1986 | Mccoy |
| 5,762,154 A | 6/1998 | Hsu |

(Continued)

FOREIGN PATENT DOCUMENTS

| CN | 104908579 | 9/2015 |
| KR | 101338796 | 12/2013 |
| WO | 2013119047 | 8/2013 |

OTHER PUBLICATIONS

Search Report & Written Opinion issued in App. No. PCT/US2018/041876 (dated 2018).
(Continued)

*Primary Examiner* — Hau V Phan
(74) *Attorney, Agent, or Firm* — Barnes & Thornburg LLP

(57) ABSTRACT

An axle assembly for a low floor vehicle is described herein. The axle assembly includes an axle housing and a drive unit for driving a wheel assembly. The drive unit includes an axle shaft, a wheel end assembly, an electric machine, and a transmission unit. The axle shaft extends along an axle centerline axis between a first axle end and a second axle end. The wheel end assembly is coupled to the first axle end. The electric machine is positioned within the axle housing and includes a rotor shaft, a drive pinion coupled to the rotor shaft, and an electric motor for rotating the rotor shaft. The
(Continued)

rotor shaft extends along a rotor shaft centerline axis that is orientated parallel to the axle centerline axis. The transmission unit is positioned within the axle housing and is configured to transfer torque from the electric machine to the axle shaft.

20 Claims, 44 Drawing Sheets

(51) Int. Cl.
    *B60K 17/04*         (2006.01)
    *B60K 17/22*         (2006.01)
    *F16H 3/32*          (2006.01)
    *F16H 57/02*         (2012.01)

(52) U.S. Cl.
    CPC .............. *F16H 3/32* (2013.01); *F16H 57/02* (2013.01); *B60K 2007/0061* (2013.01); *F16H 2057/02034* (2013.01); *F16H 2057/02052* (2013.01); *F16H 2200/0034* (2013.01)

(56) References Cited

U.S. PATENT DOCUMENTS

| | | | | |
|---|---|---|---|---|
| 5,921,338 | A | 7/1999 | Edmondson | |
| 6,089,341 | A * | 7/2000 | Gingerich | B60L 15/2036 180/65.1 |
| 6,540,632 | B1 | 4/2003 | Wendi et al. | |
| 6,664,694 | B2 * | 12/2003 | Yang | H02K 7/12 310/112 |
| 6,698,313 | B2 | 3/2004 | Gaffney et al. | |
| 6,727,620 | B2 * | 4/2004 | White | B60K 7/0007 310/112 |
| 6,752,227 | B1 | 6/2004 | Bachmann | |
| 7,134,517 | B1 | 11/2006 | Kaiser et al. | |
| 7,195,085 | B2 * | 3/2007 | Pia | E21B 10/345 175/263 |
| 7,377,343 | B2 | 5/2008 | Adams, III et al. | |
| 7,703,565 | B2 * | 4/2010 | Ikenoya | B60K 17/356 180/65.51 |
| 7,712,561 | B2 * | 5/2010 | Niwa | B60K 7/0007 180/65.51 |
| 9,079,482 | B2 * | 7/2015 | Besler | B60K 17/356 |
| 9,090,142 | B2 * | 7/2015 | Lee | B60K 7/0007 |
| 9,132,723 | B2 * | 9/2015 | Munster | B60K 17/046 |
| 9,975,576 | B2 * | 5/2018 | Flaxman | B62D 11/14 |
| 10,800,242 | B2 | 10/2020 | Langhoff et al. | |
| 2003/0010549 | A1 | 1/2003 | Hinton et al. | |
| 2003/0111280 | A1 | 6/2003 | Platner et al. | |
| 2003/0132039 | A1 | 7/2003 | Gaffney et al. | |
| 2004/0124019 | A1 * | 7/2004 | Harrup | B60K 7/0007 180/65.1 |
| 2006/0054368 | A1 * | 3/2006 | Varela | B60K 7/0007 180/65.51 |
| 2006/0180366 | A1 * | 8/2006 | Brill | B60K 17/046 180/65.6 |
| 2008/0018064 | A1 * | 1/2008 | Martin | B60G 17/017 280/6.152 |
| 2008/0230284 | A1 | 9/2008 | Schoon | |
| 2008/0230289 | A1 | 9/2008 | Schoon et al. | |
| 2009/0032321 | A1 * | 2/2009 | Marsh | B60L 50/16 180/65.51 |
| 2010/0187044 | A1 | 7/2010 | Nabeshima et al. | |
| 2010/0191417 | A1 | 7/2010 | Murahashi et al. | |
| 2011/0094807 | A1 | 4/2011 | Pruitt et al. | |
| 2012/0142487 | A1 * | 6/2012 | Winter | B60K 1/00 475/332 |
| 2014/0011620 | A1 * | 1/2014 | Munster | B60K 17/046 475/149 |
| 2014/0051538 | A1 | 2/2014 | Wenthen et al. | |
| 2014/0288739 | A1 | 9/2014 | Braun et al. | |
| 2015/0226300 | A1 | 8/2015 | Neumann | |
| 2017/0122408 | A1 | 5/2017 | Chung et al. | |
| 2020/0384806 | A1 | 12/2020 | Falls et al. | |
| 2021/0001939 | A1 | 1/2021 | Beiler et al. | |
| 2021/0008969 | A1 | 1/2021 | Chopra et al. | |

OTHER PUBLICATIONS

Supplementary European Search Report and Written Opinion for European Patent Application No. 18832577, dated Mar. 12, 2021, 8 pages.

* cited by examiner

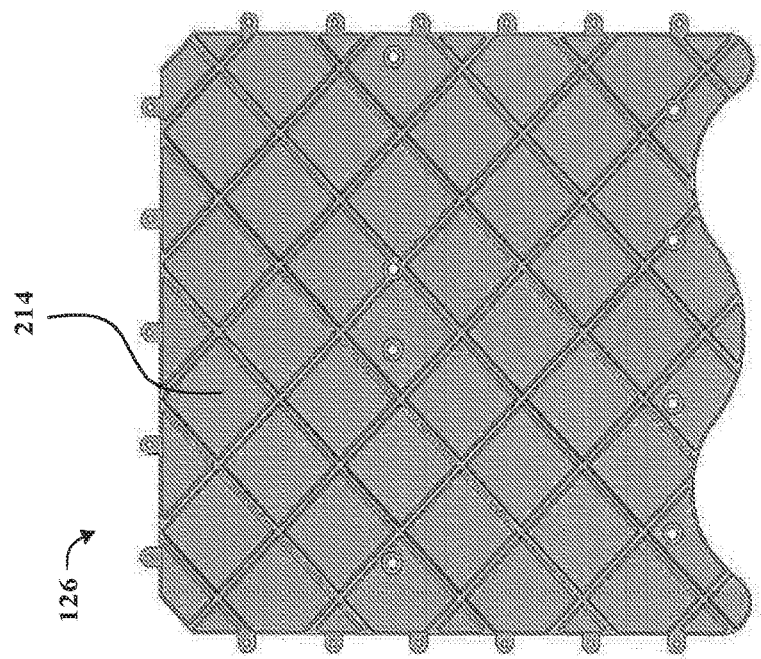
FIG. 31
FIG. 30
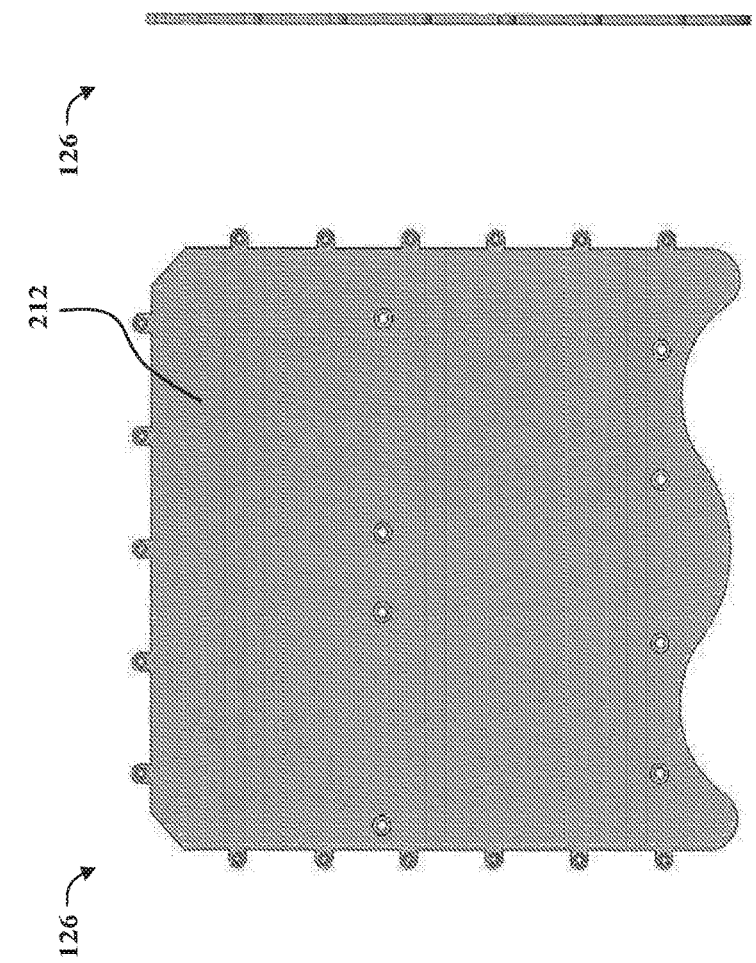
FIG. 29

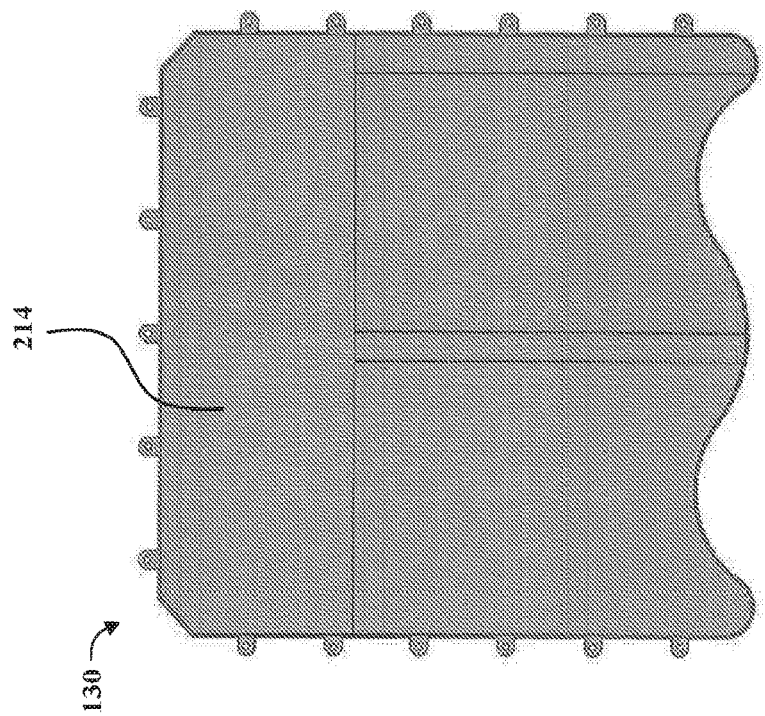
FIG. 35
FIG. 34
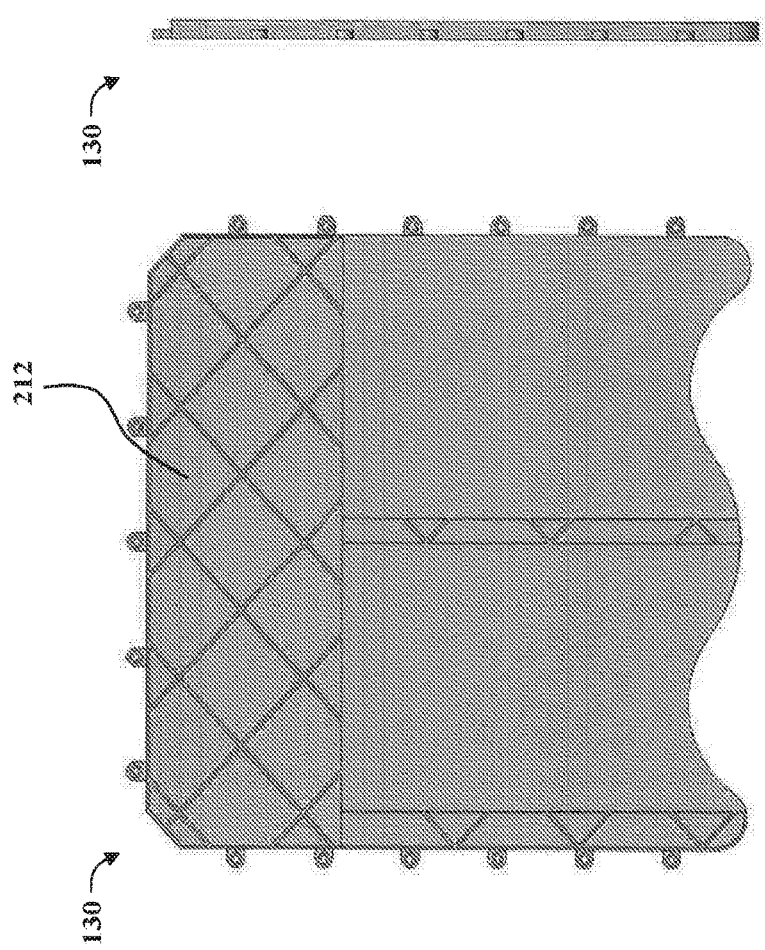
FIG. 33

AXLE ASSEMBLY FOR LOW FLOOR VEHICLE

CROSS-REFERENCE TO RELATED APPLICATION

This application is a U.S. nationalization under 35 U.S.C. § 371 of International Application No. PCT/US2018/041876, filed Jul. 12, 2018, which claims priority to U.S. Provisional Application No. 62/531,737, filed Jul. 12, 2017, and claims priority to U.S. Provisional Application No. 62/669,729, filed May 10, 2018, the disclosures of which are hereby incorporated by reference in their entirety for all purposes.

FIELD OF THE DISCLOSURE

The present invention relates to vehicle axle assemblies, and more particularly, to an axle assembly for use with a low floor vehicle.

BACKGROUND

In order to aid ingress and egress, it is oftentimes ideal for a vehicle to have a floor that is as low as possible. Busses and people carriers, commonly called low floor vehicles, are examples of vehicles that benefit from a low floor height. By minimizing the floor height, a step at a door of the vehicle may be eliminated, which in turn allows passengers easier ingress and egress of vehicle passengers. Furthermore, elimination of steps is especially beneficial to disabled passengers, and passengers with strollers. Increasingly, manufacturers have turned to electric and hybrid propulsion systems for low floor vehicles for increased performance and efficiency. In order to have the floor of the vehicle as low as possible, the drivetrain components are relocated so as to reduce intrusions into the vehicle floor.

At least some known low floor vehicles include wheel assemblies driven by electric motor having the electric rotor connected directly to the axle shaft of the wheel assembly. Because these electric motors are connected directly to the axle shaft, the orientation of the electric motor reduces the amount of space available across the wheel assembly, thus reducing the floor space available for the low floor vehicle. Accordingly, a new axle assembly is required to increase the spacing between wheel assemblies and provide larger floor areas.

The present invention is aimed at one or more of the problems identified above.

SUMMARY OF THE INVENTION

Accordingly, the present invention provides an axle assembly for a low floor vehicle with increased performance and efficiency.

In one embodiment of the present invention, an axle assembly is provided. The axle assembly includes an axle housing and a drive unit for driving a wheel assembly. The drive unit includes an axle shaft, a wheel end assembly, an electric machine, and a transmission unit. The axle shaft extends along an axle centerline axis between a first axle end and a second axle end. The wheel end assembly is coupled to the first axle end. The electric machine is positioned within the axle housing and includes a rotor shaft, a drive pinion coupled to the rotor shaft, and an electric motor for rotating the rotor shaft. The rotor shaft extends along a rotor shaft centerline axis that is orientated parallel to the axle centerline axis. The transmission unit is positioned within the axle housing and is configured to transfer torque from the electric machine to the axle shaft. The transmission unit includes an output assembly and an offset gear reduction assembly. The output assembly is coupled to the second axle end such that a rotation of the output assembly rotates the axle shaft. The offset gear reduction assembly is coupled to the output assembly and the drive pinion of the electric machine for transferring torque from the electric machine to the output assembly.

In another embodiment of the present invention, an axle housing is provided. The axle housing is configured to be used with an axle assembly that includes a drive unit including an electric machine, a transmission unit, and an inverter assembly. The axle housing includes a first outer section, a second outer section, and a bridge section extending between the first outer section and the second outer section. The first outer section includes a gearbox including an inner surface that defines a cavity configured to receive the electric machine and the transmission unit therein. The bridge section includes a cradle assembly coupled to the gearbox. The cradle assembly includes an inner surface that defines a support chamber configured to receive the inverter assembly therein.

In yet another embodiment of the present invention, a vehicle is provided. The vehicle includes a vehicle frame and an axle assembly coupled to the vehicle frame. The axle assembly includes an axle housing, a first drive unit, and a second drive unit. The axle housing includes a bridge section extending between a first outer section and an opposite second outer section. The first outer section includes a first gearbox and the second outer section includes a second gearbox. The bridge section includes a cradle assembly that is coupled to the first gearbox and the second gearbox. The cradle assembly includes an inner surface that defines a support chamber within the cradle assembly. The first drive unit is adapted to be coupled to a first wheel assembly. The first drive unit includes a first electric machine, and a first transmission unit. The first electric machine is positioned within the first gearbox. The first electric machine includes a drive pinion that is coupled to a rotor shaft. The first transmission unit is positioned within the first gearbox and includes an output assembly and an offset gear reduction assembly that is coupled to the output assembly and the drive pinion of the first electric machine for transferring torque from the first electric machine to the output assembly. A first axle shaft is coupled to the output assembly and extends outwardly from an outer surface of the first gearbox. The second drive unit is adapted to be coupled to a second wheel assembly. The second drive unit includes a gear reduction and a second axle shaft that is oriented coaxially with the first axle shaft along an axle centerline axis. The gear reduction is positioned within the second gearbox. The second axle shaft extends outwardly from the second gearbox towards the second wheel assembly. An inverter assembly is positioned within the support chamber of the cradle assembly and is coupled to the first electric machine for providing electrical power to the first electric machine.

BRIEF DESCRIPTION OF THE DRAWINGS

Advantages of the present invention will be readily appreciated as the same becomes better understood by reference to the following detailed description when considered in connection with the accompanying drawings.

FIG. 29 is a view of a top surface of the top cover shown in FIG. 28.

FIG. 30 is a side view of the top cover shown in FIG. 28.

FIG. 31 is a view of a bottom surface of the top cover shown in FIG. 28.

FIG. 33 is a view of a top surface of the bottom cover shown in FIG. 32.

FIG. 34 is a side view of the bottom cover shown in FIG. 32.

FIG. 35 is a view of a bottom surface of the bottom cover shown in FIG. 32.

Corresponding reference characters indicate corresponding parts throughout the drawings.

DETAILED DESCRIPTION

Figure 1:
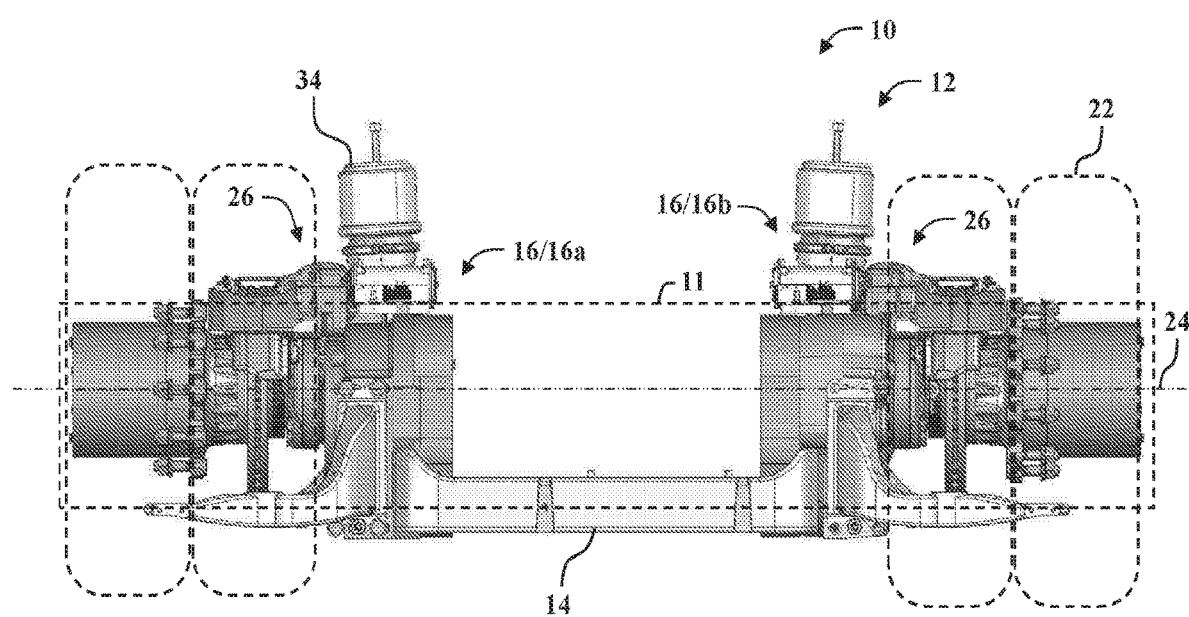
FIG. 1 is an elevation view of an axle assembly for a low floor vehicle, according to embodiments of the present invention.

The present invention is directed to an electric drive axle assembly for a low-floor or ultra-low floor (no step) vehicle. The vehicle is generally a high occupancy or heavy-duty vehicle with electric (all-battery or may be a hybrid) propulsion. The invention allows a compact packaging for two 2-speed transmission unit, two electric motors and two wheelhub reduction gears for a low floor vehicle. Having 2-speeds in the transmission unit will allow vehicle performance improvement for top speed and motor efficiency. Integrating the electric motor on the side of the transmission unit (e.g., parallel and adjacent) helps package the system compactly. Using a set of parallel shaft gears for reduction allows an offset to package the motor. The two-speed transmission unit will be integrated within the axle housing.

The electric drive axle may include two motors, two 2-speed transmission units, two hub reduction gears and an external axle housing, wherein the motors are used for providing power for driving each wheel. The electric drive axle may include an electric motor with a rotor shaft driving an offset gearing reduction. The output of the offset gearing reduction will input power to a shaft with several bearings, a selectable synchronizer/clutch and two gears, which pair with two gears on the output shaft of the transmission, respectively. The synchronizer will select speeds for two ratios, which will transmit power to the output shaft with either gear pairs in the transmission. The output shaft of the transmission will couple to the input of the wheel hub planetary drive sun gear. In the wheel hub planetary drive, the ring gear will be held stationary while the planet carrier will output power to the wheels as in conventional wheel hub drives. Two electric motors, two 2-speed transmission units and two planetary wheel hub drives are on one axle. The axle housing will integrate each electric motor and transmission compactly and transmit vehicle loads to suspension components.

With reference to FIGS. 1-15, the present invention includes an axle assembly 10 for a low floor vehicle. The axle assembly 10 includes an axle housing 12 that is coupled to a vehicle frame 11. The axle housing includes a bridge section 14 and outer sections 16 arranged at opposite ends of the bridge section 14. Each outer section 16 is spaced laterally from the other relative to the vehicle. In the illustrated embodiment, the axle housing 12 includes a first outer section 16*a* and a second outer section 16*b*. The bridge section 14 extends between the first outer section 16*a* and the second outer section 16*b*.

The axle assembly 10 further includes suspension arms 18 coupled to the axle housing 12, which may be used to attach the axle assembly 10 to the vehicle. Additionally, tie-rods 20 movably attach the axle assembly 10 to the vehicle. The vehicle may be an electric vehicle or a hybrid vehicle with an electric motor and internal combustion generator/motor. Advantageously, the suspension arms 18 may be configured to retrofit the axle assembly 10 to a vehicle. For example, a low floor bus originally equipped with a traditional axle assembly may utilize the axle assembly 10 in place of the traditional axle assembly.

A wheel 22 is coupled to each end of the axle assembly 10 to support the vehicle and transfer motive power to a road surface. In the embodiment shown, the axle assembly 10 is a dual wheel configuration with a pair of wheels 22 coupled to each end of the axle assembly 10. Each wheel 22 defines an axis of rotation 24. The axis of rotation 24 of each wheel 22 is generally aligned.

The axle assembly 10 further includes a wheel drive unit 26 coupled to each outer section 16 of the axle housing 12. Each of the wheel drive units 26 is configured to independently drive one of the wheels 22. Each drive unit 26 may operate the respective wheel 22 at a different speed during a turning maneuver of the vehicle, or in response to available traction at each wheel 22. Each wheel drive unit 26 includes an electric machine 28, a transmission unit 30, and a wheel end assembly 32. The axle housing 12 integrates the electric machine 28 and transmission unit 30 compactly and transmits vehicle loads to the tie-rods 20 and suspension arms 18. The transmission unit 30 allows the vehicle to have an increased top speed while operating more efficiently at low speeds.

Figure 2:
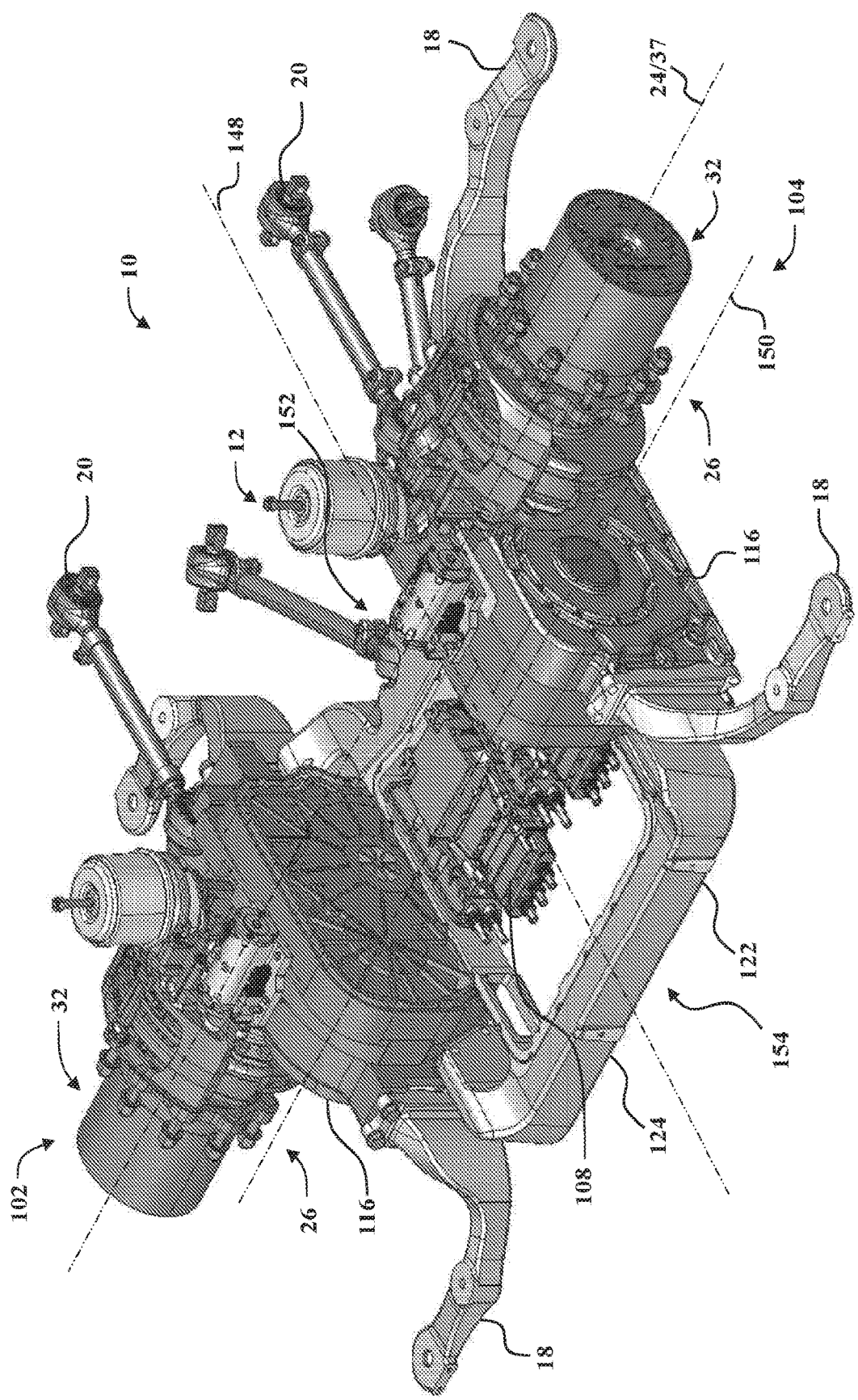
FIGS. 2-5 are perspective views of the axle assembly shown in FIG. 1.
Figure 3:
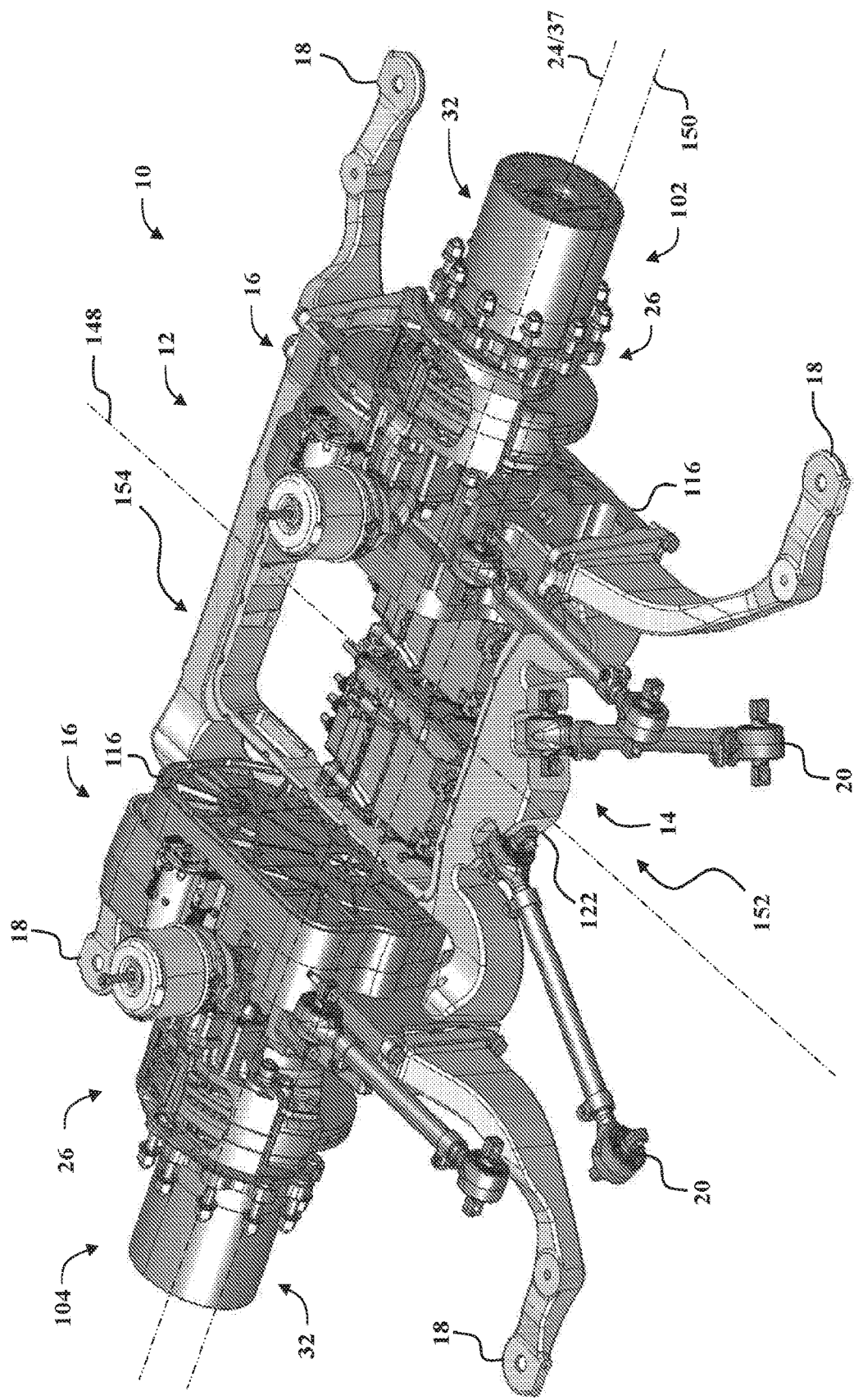
Figure 4:
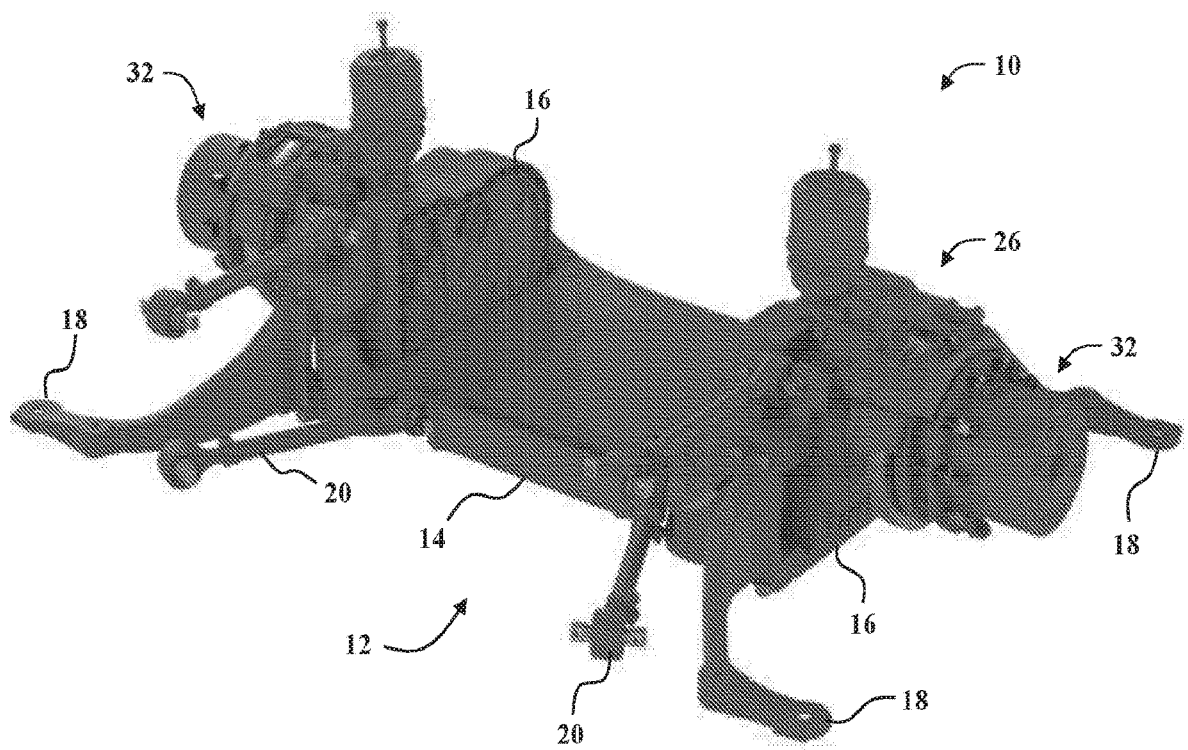
Figure 5:
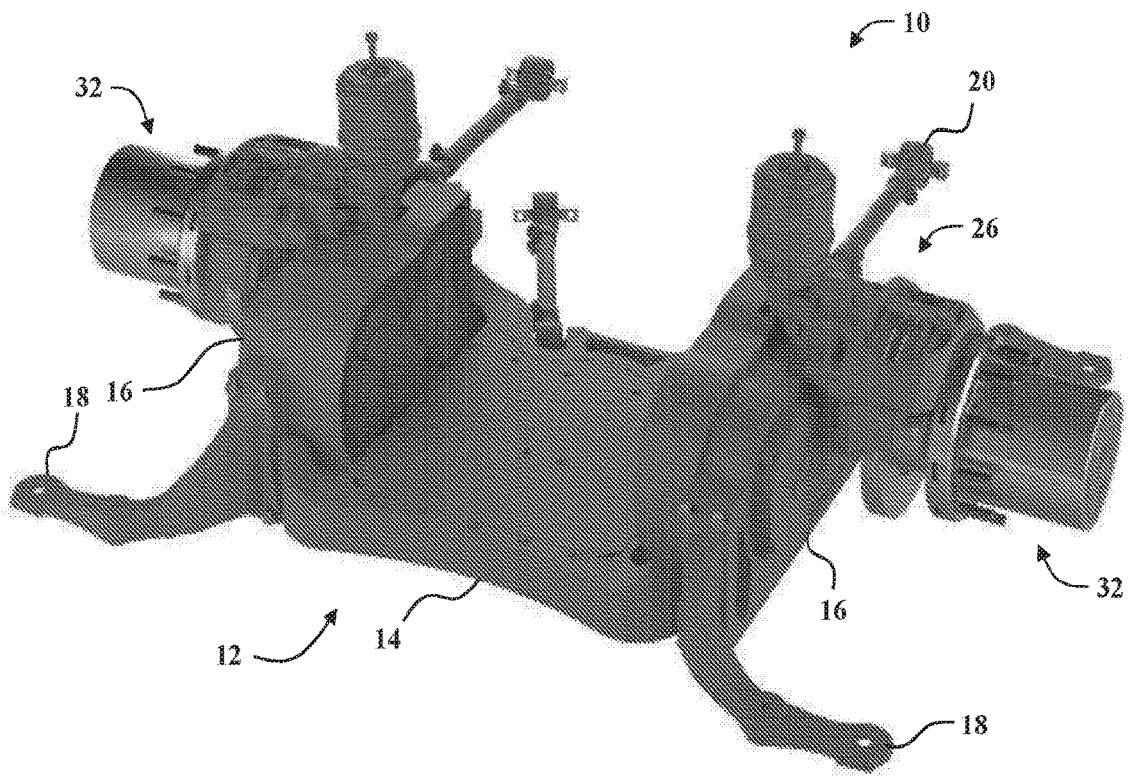
Figure 6:
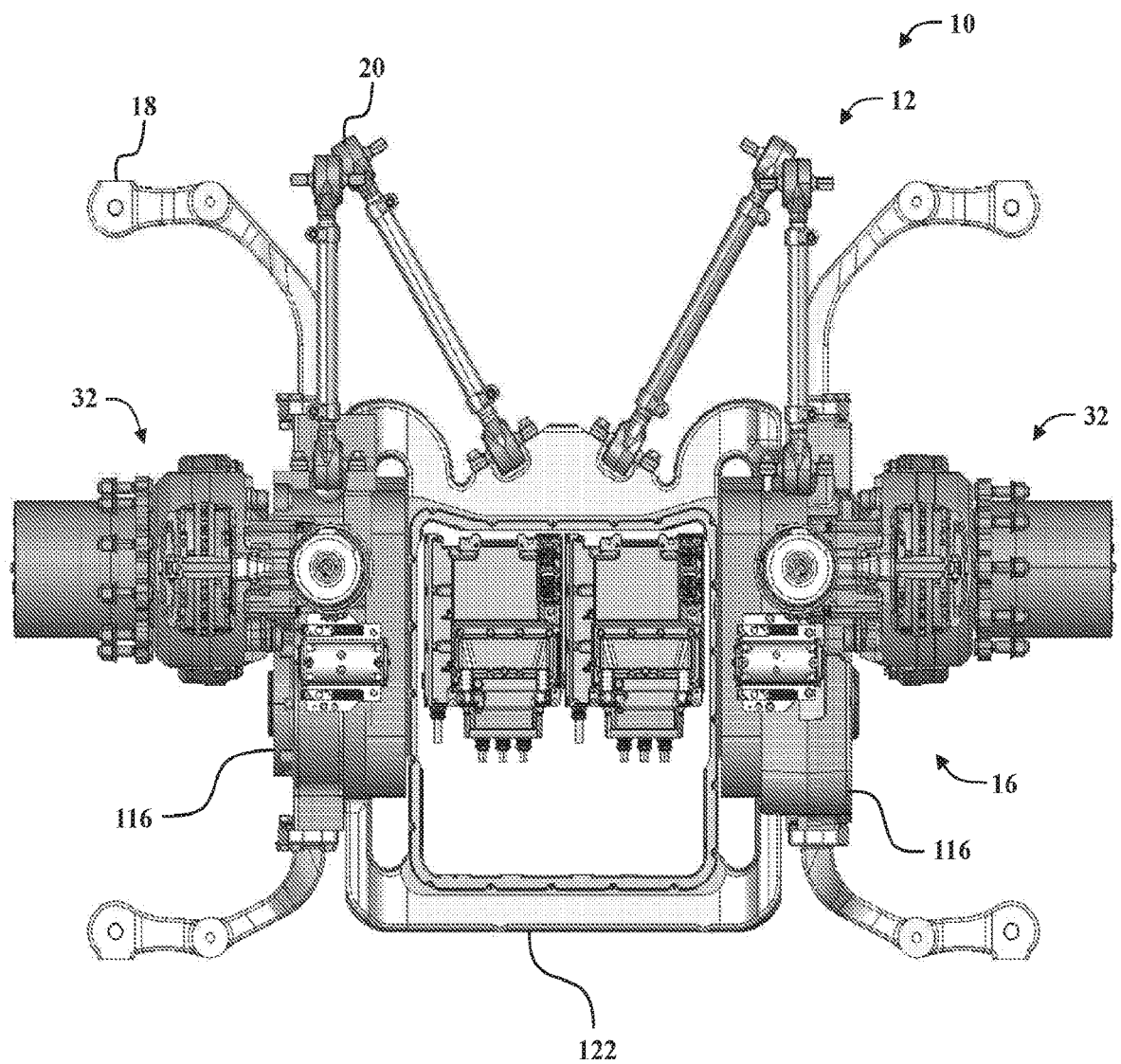
FIG. 6 is a top view of the axle assembly shown in FIG. 2.
Figure 7:
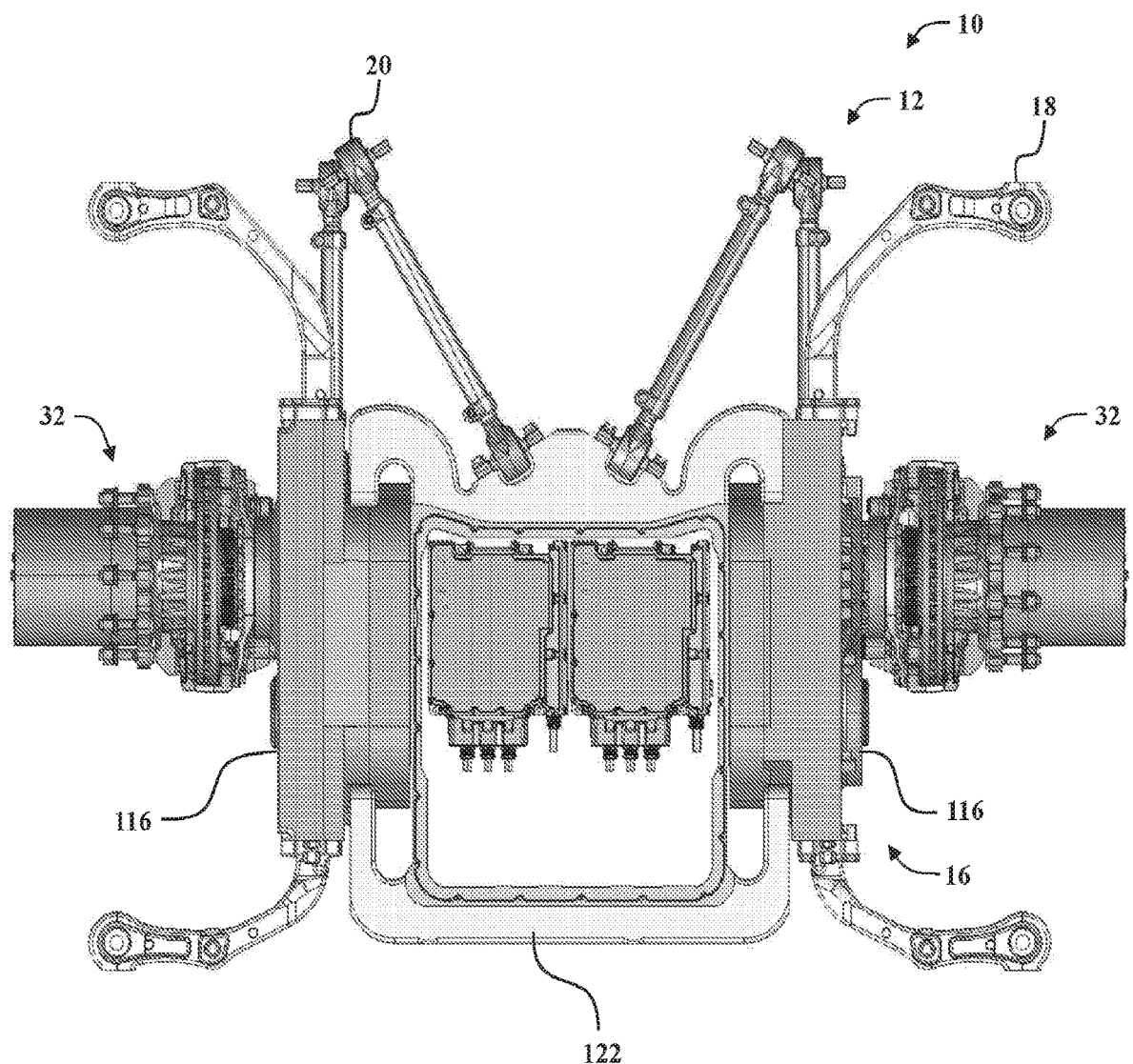
FIG. 7 is a bottom view of the axle assembly shown in FIG. 2.
Figure 8:
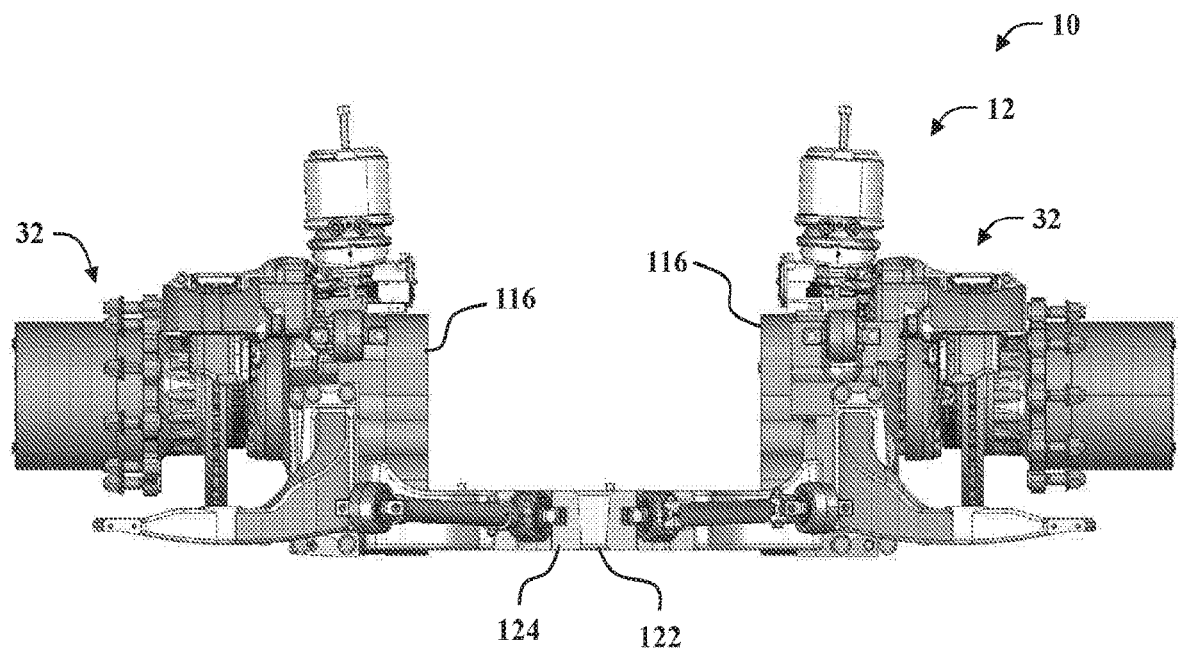
FIG. 8 is an elevation view of a front portion of the axle assembly shown in FIG. 2.
Figure 9:
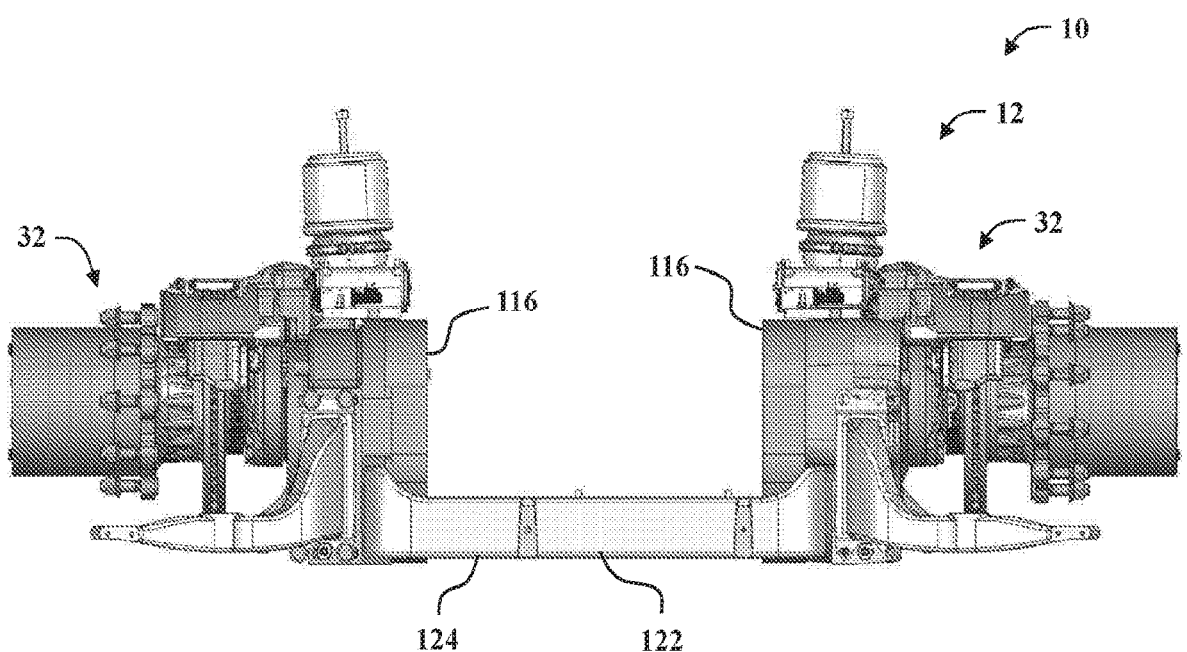
FIG. 9 is an elevation view of a rear portion of the axle assembly shown in FIG. 2.
Figure 10:
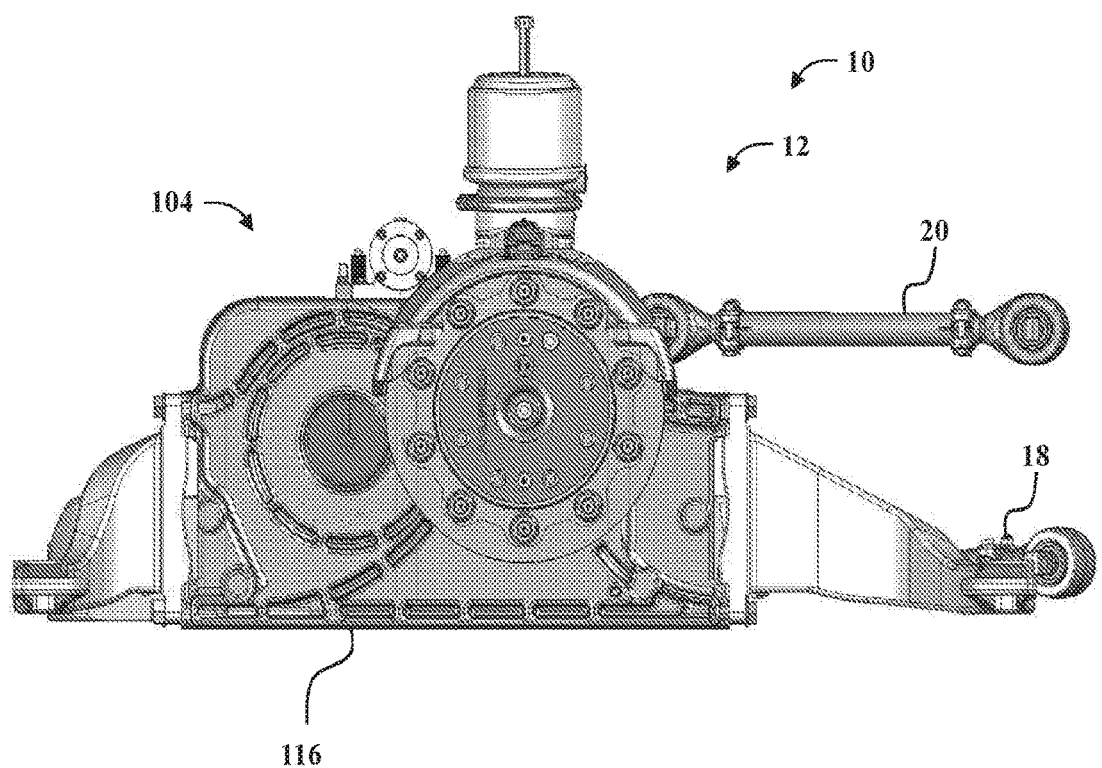
FIG. 10 is an elevation view of a right side of the axle assembly shown in FIG. 2.
Figure 11:
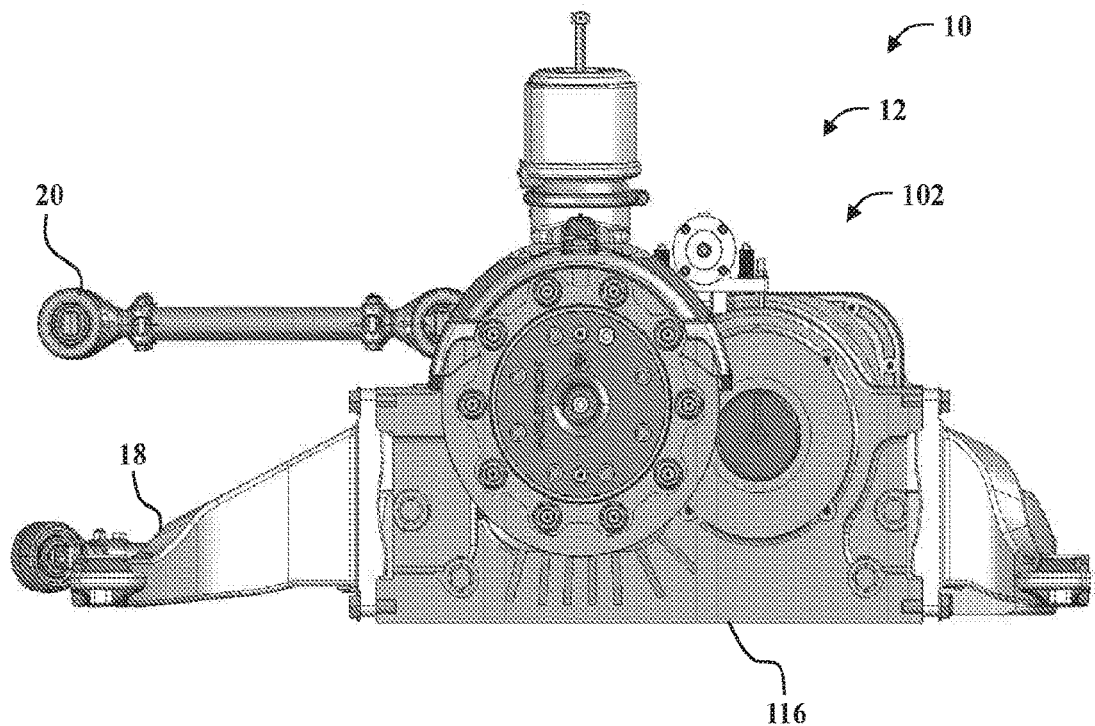
FIG. 11 is an elevation view of a left side of the axle assembly shown in FIG. 2.
Figure 12:
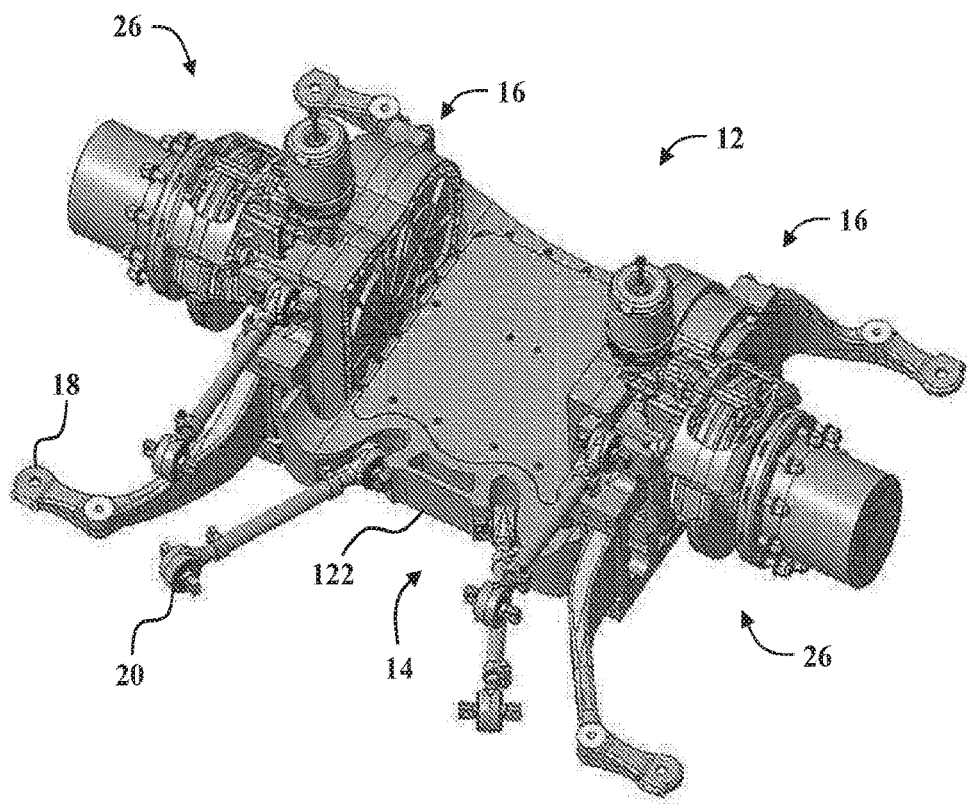
FIGS. 12-13 are perspective views of the axle assembly shown in FIG. 1.
Figure 13:
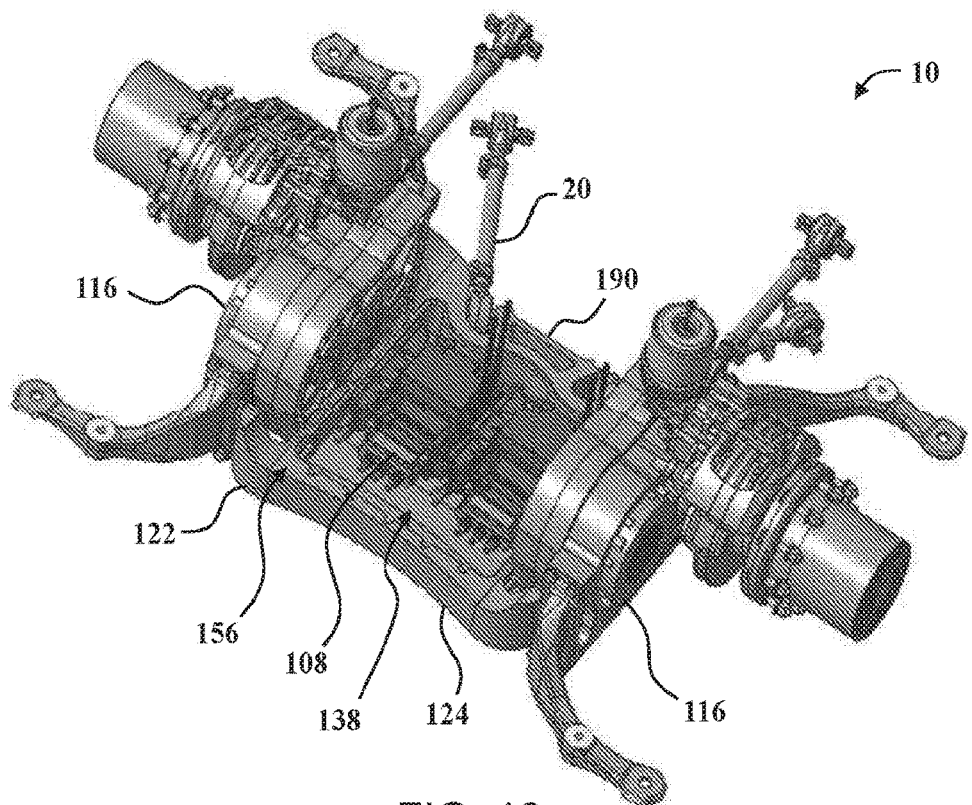
Figure 14:
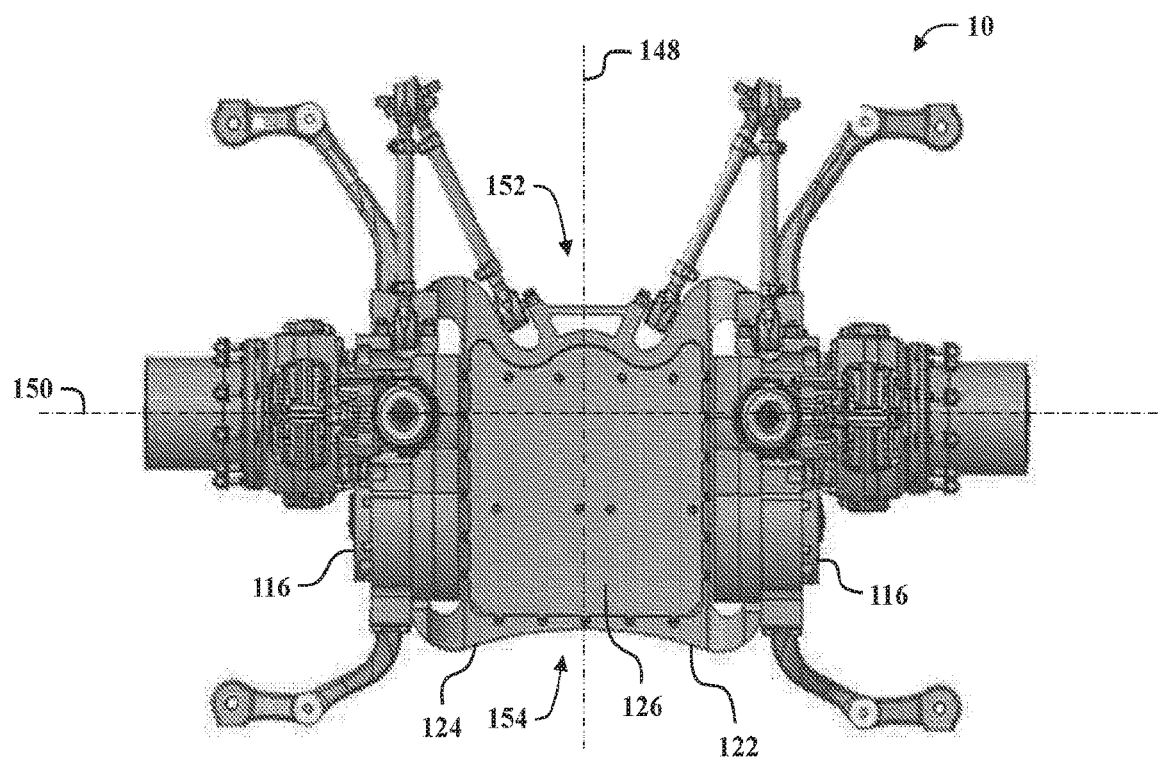
FIG. 14 is a top view of the axle assembly shown in FIGS. 12-13.
Figure 15:
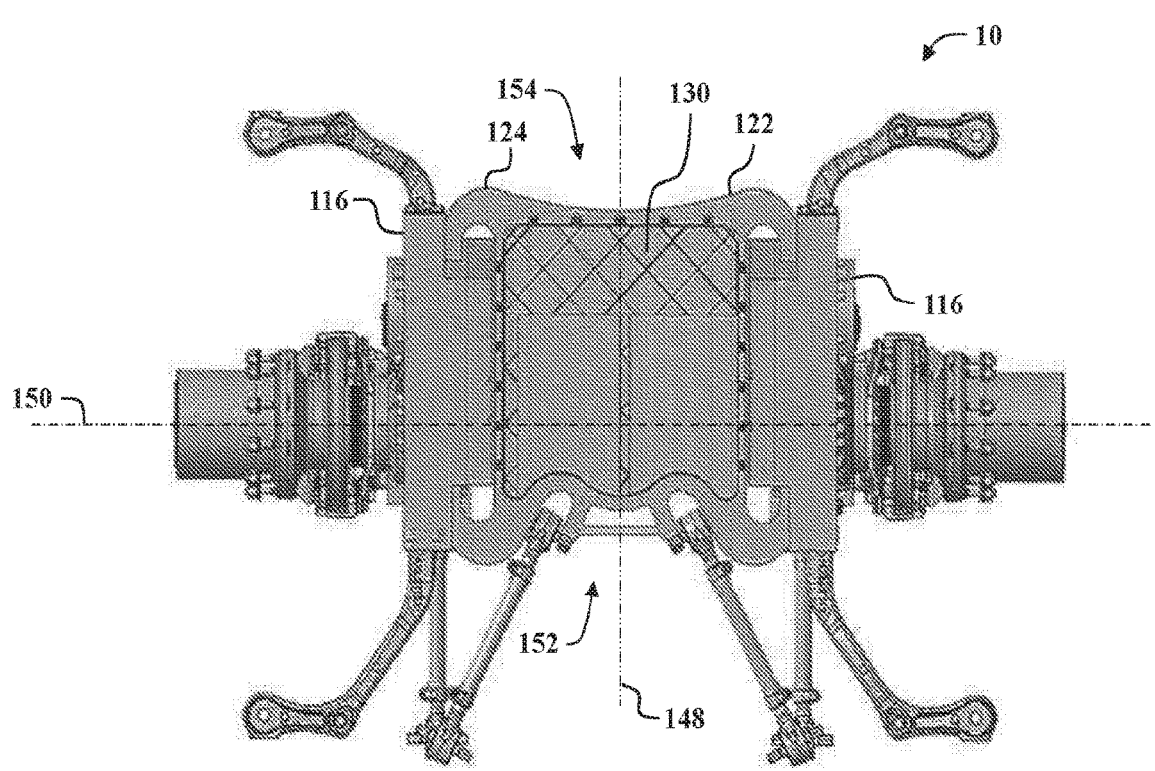
FIG. 15 is a bottom view of the axle assembly shown in FIGS. 12-13.
Figure 16:
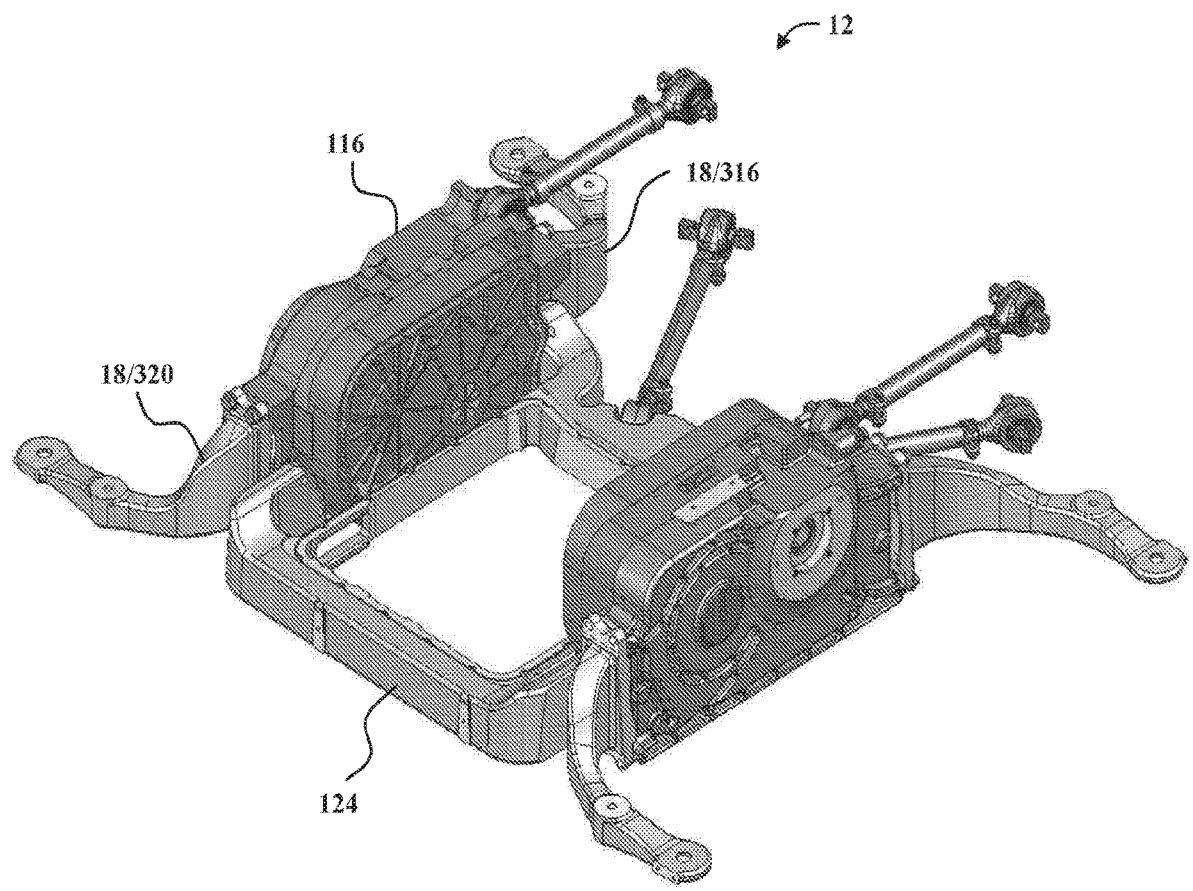
FIG. 16 is perspective view of a portion of the axle assembly shown in FIG. 2.
Figure 17:
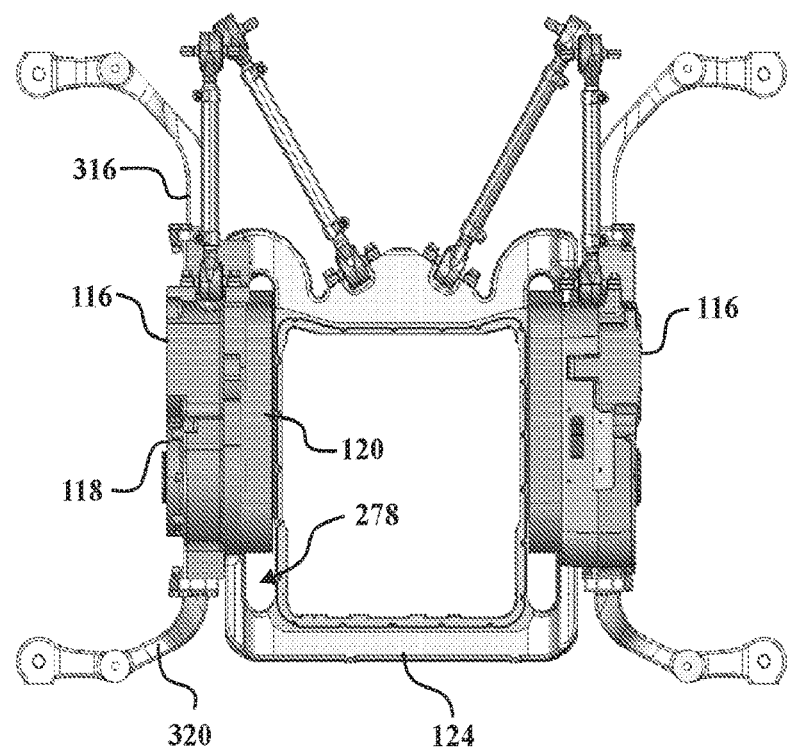
FIG. 17 is a top view of the axle assembly shown in FIG. 16.
Figure 18:
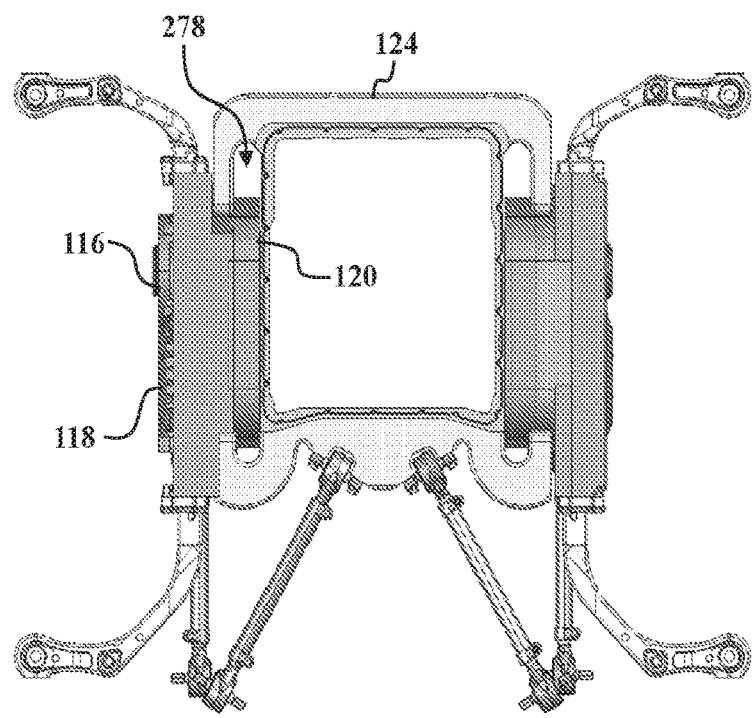
FIG. 18 is a bottom view of the axle assembly shown in FIG. 17.
Figure 19:
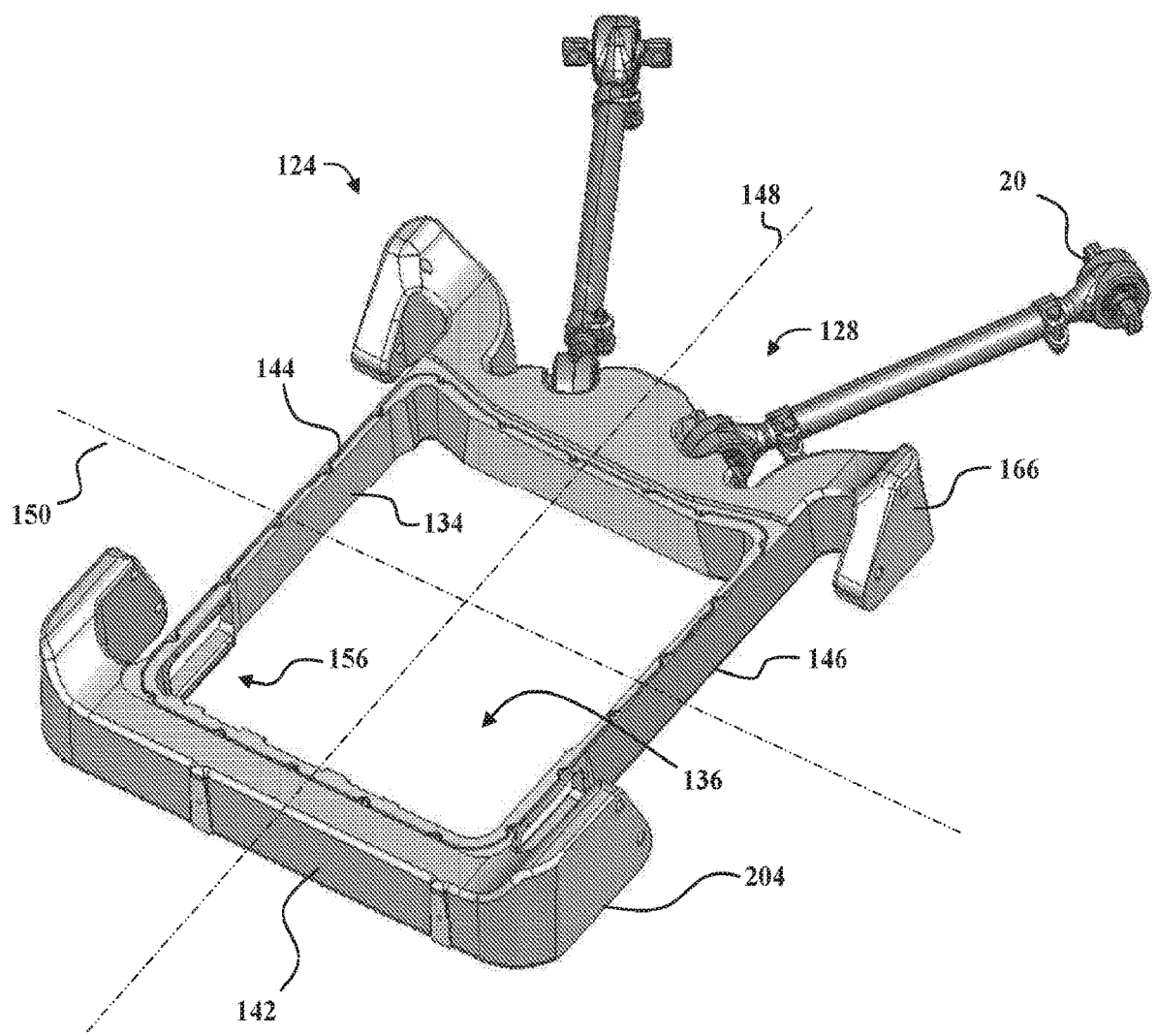
FIGS. 19 and 20 are perspective views of a cradle assembly that may be used with the axle assembly shown in FIG. 2, according to embodiments of the present invention.
Figure 20:
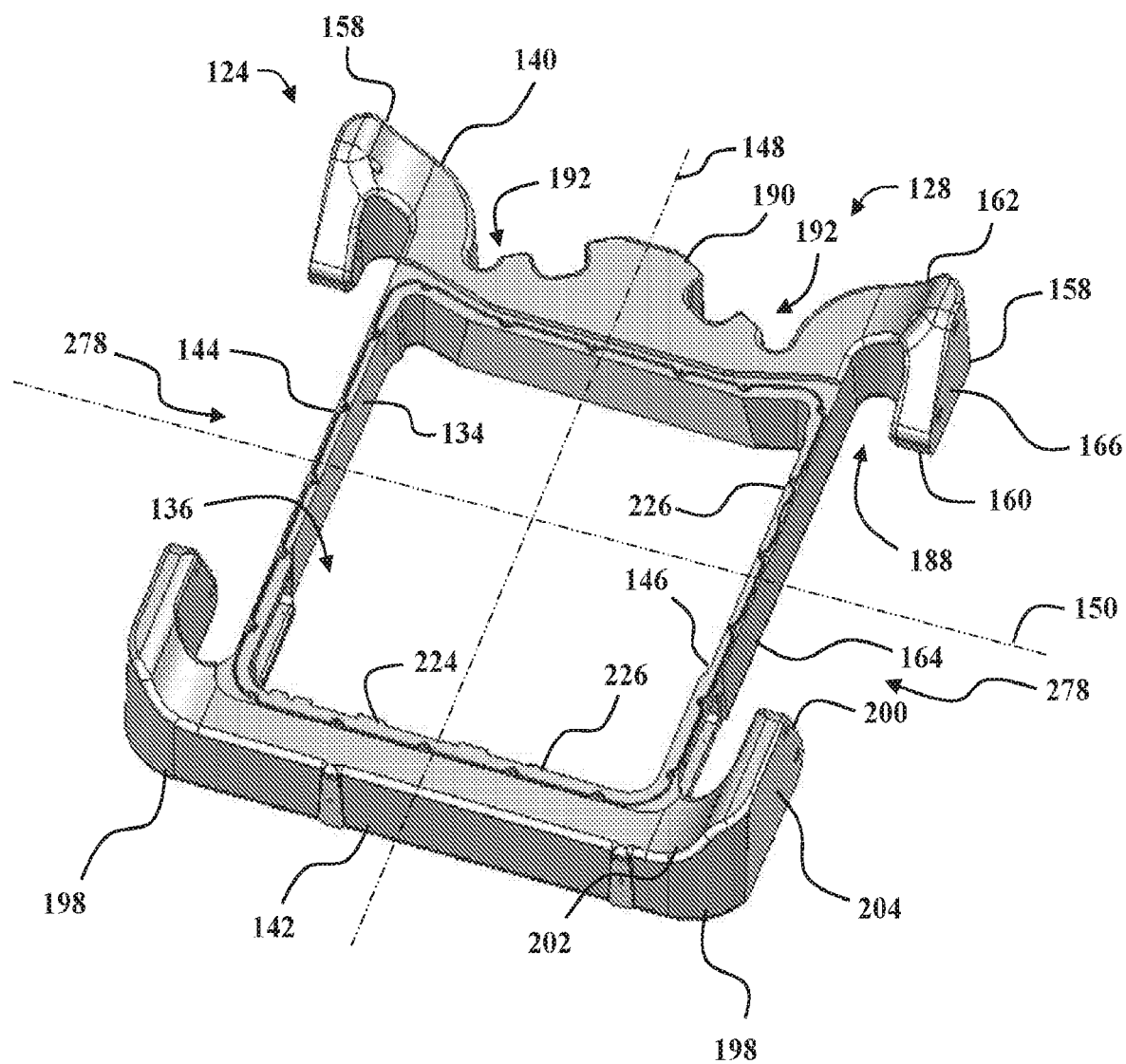
Figure 21:
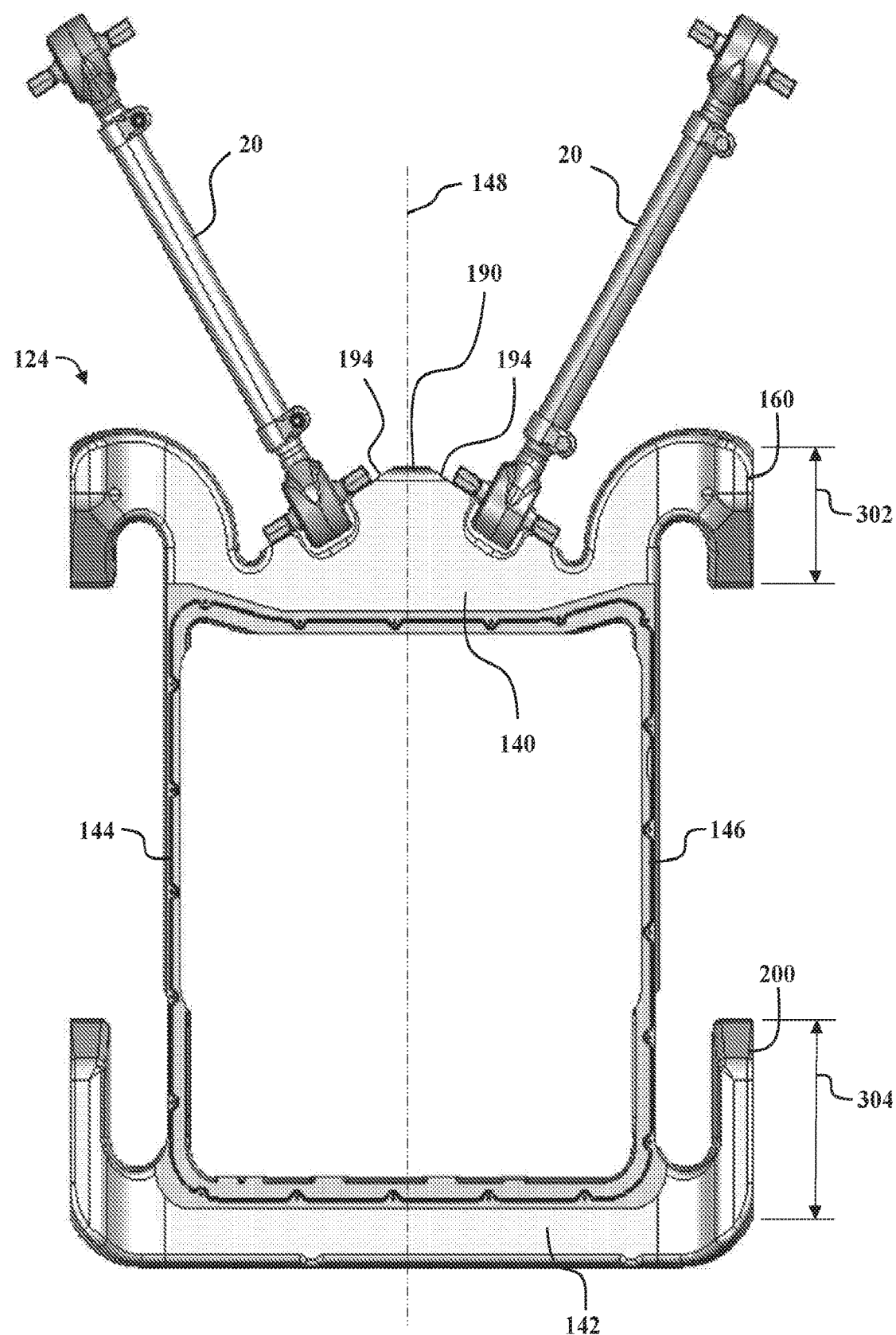
FIGS. 21-22 are top views of the cradle assembly shown in FIG. 19.
Figure 22:
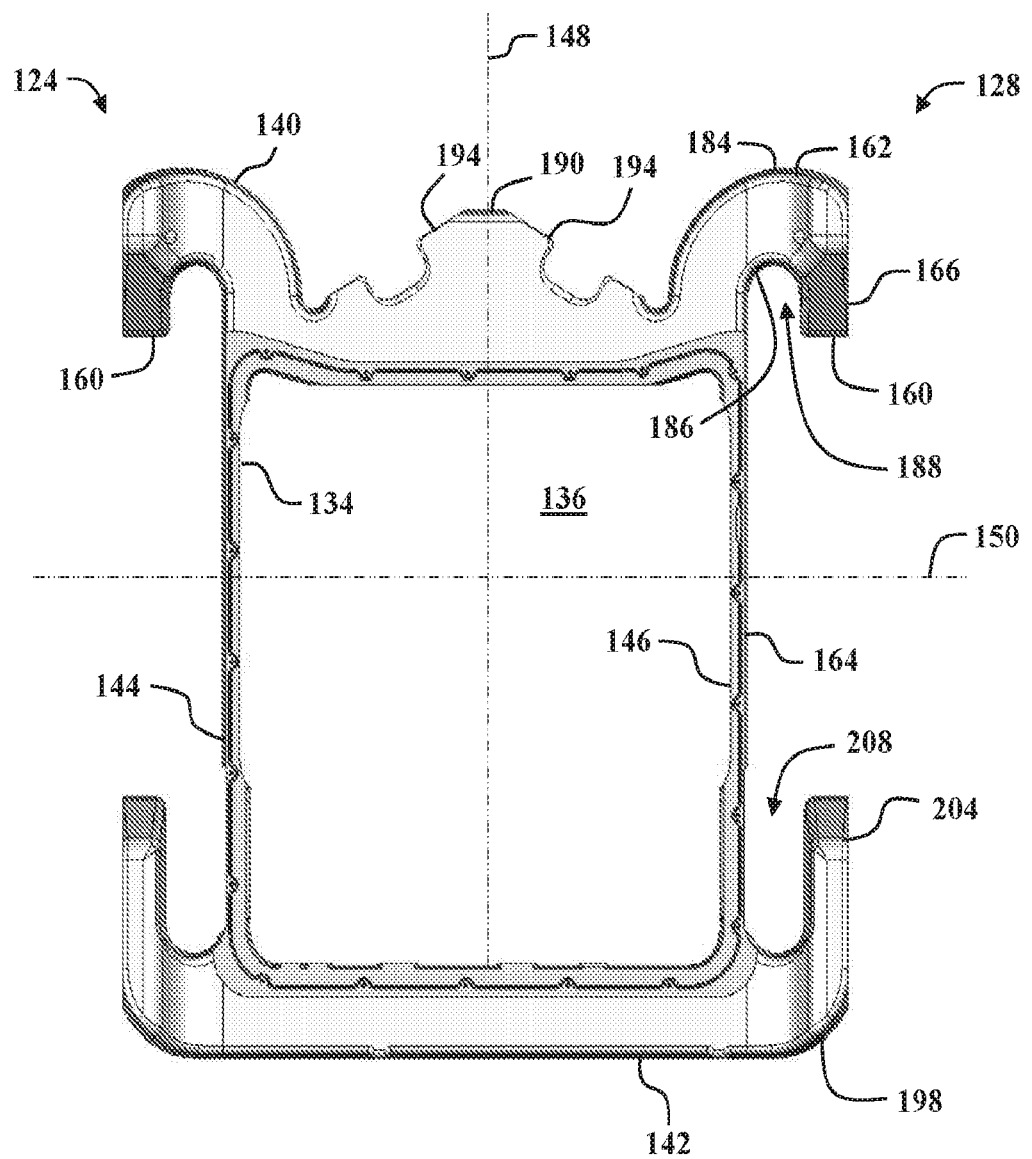
Figure 23:
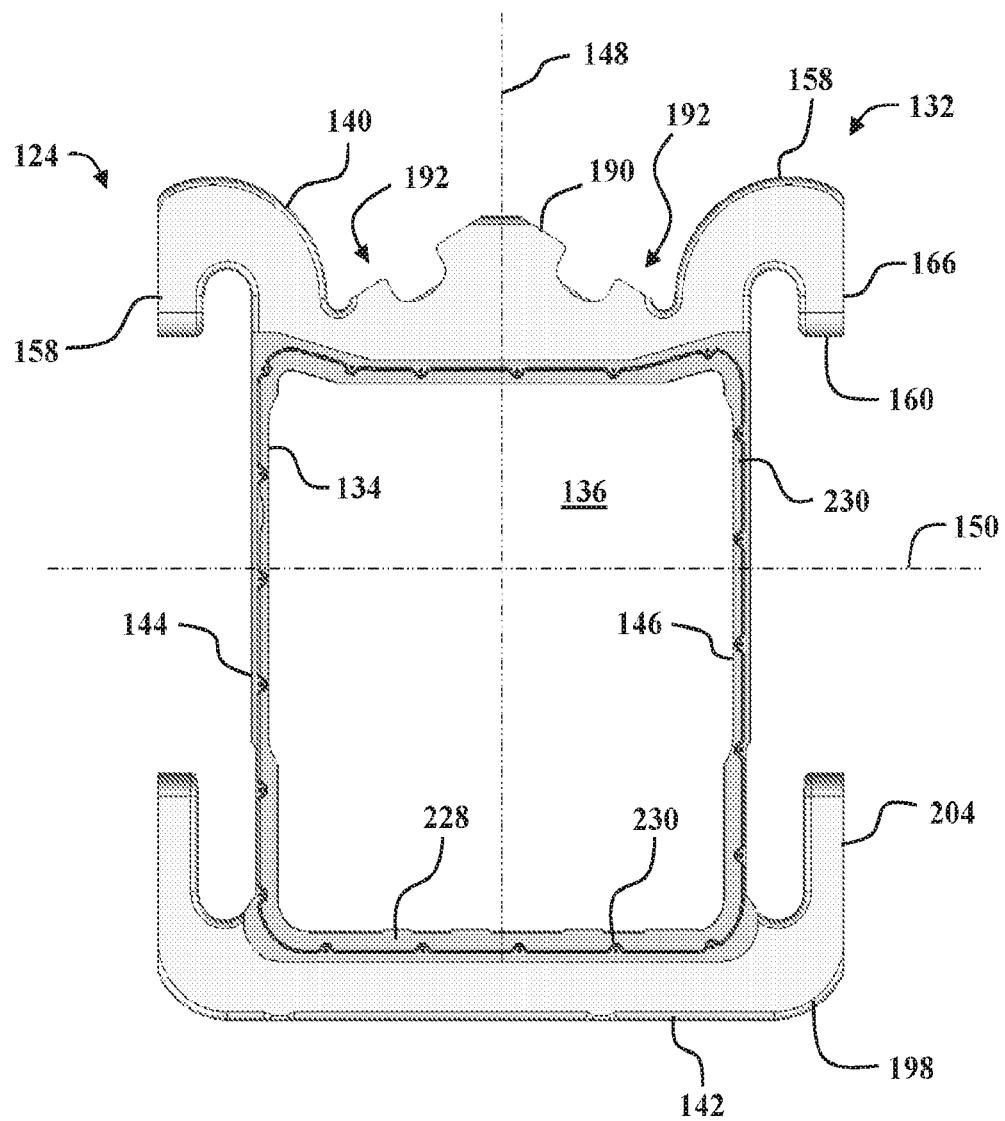
FIG. 23 is a bottom view of the cradle assembly shown in FIG. 19.
Figure 24:
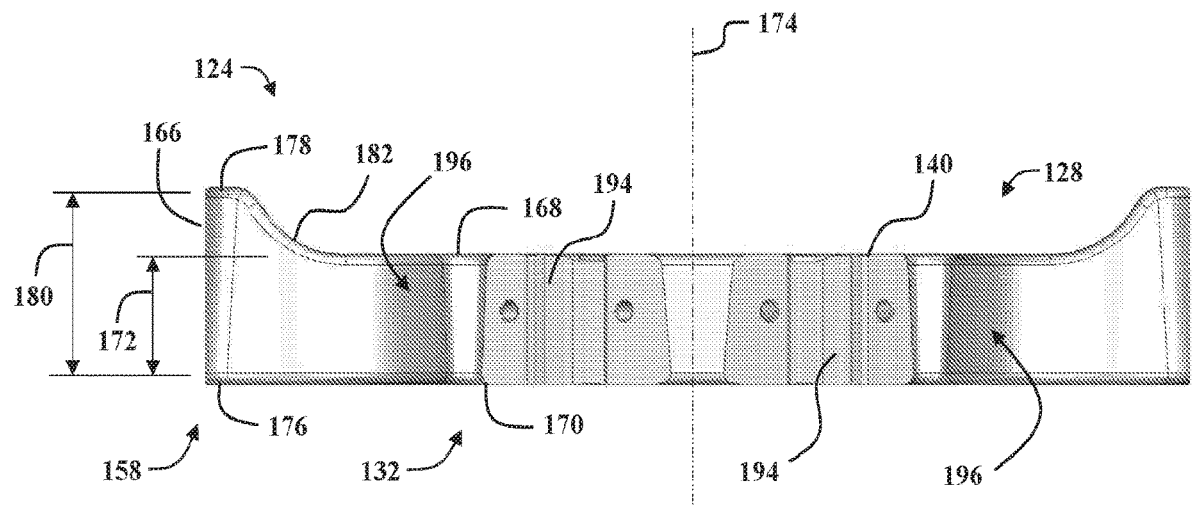
FIG. 24 is front view of the cradle assembly shown in FIG. 19.
Figure 25:
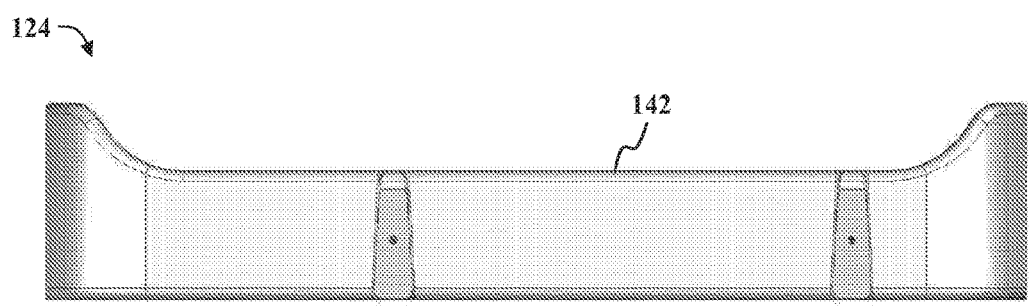
FIG. 25 is rear view of the cradle assembly shown in FIG. 19.
Figure 26:
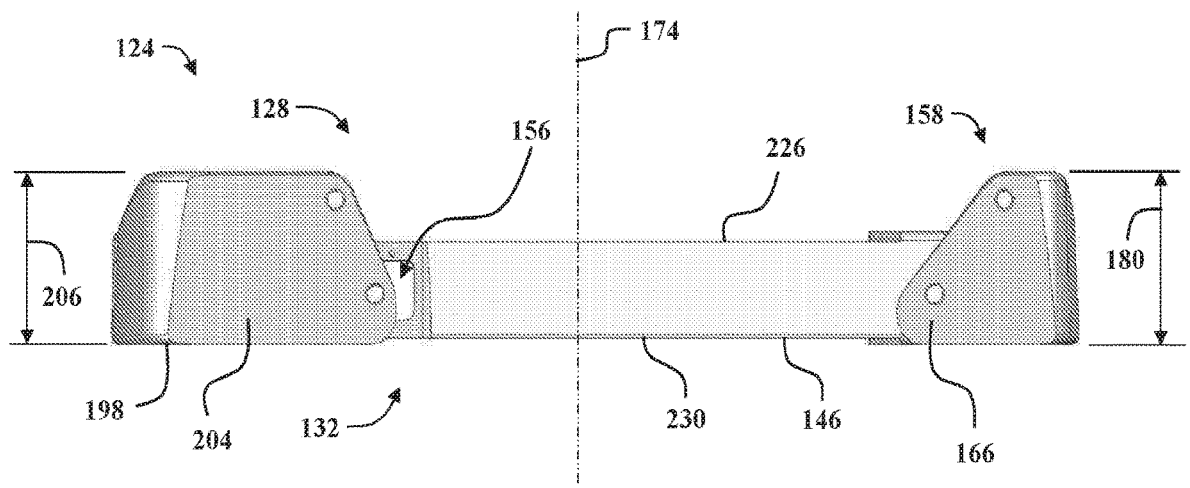
FIGS. 26 and 27 are side views of the cradle assembly shown in FIG. 19.
Figure 27:
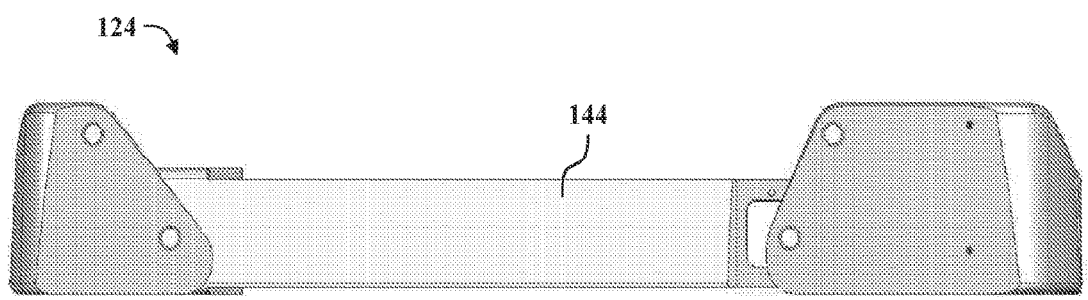
Figure 28:
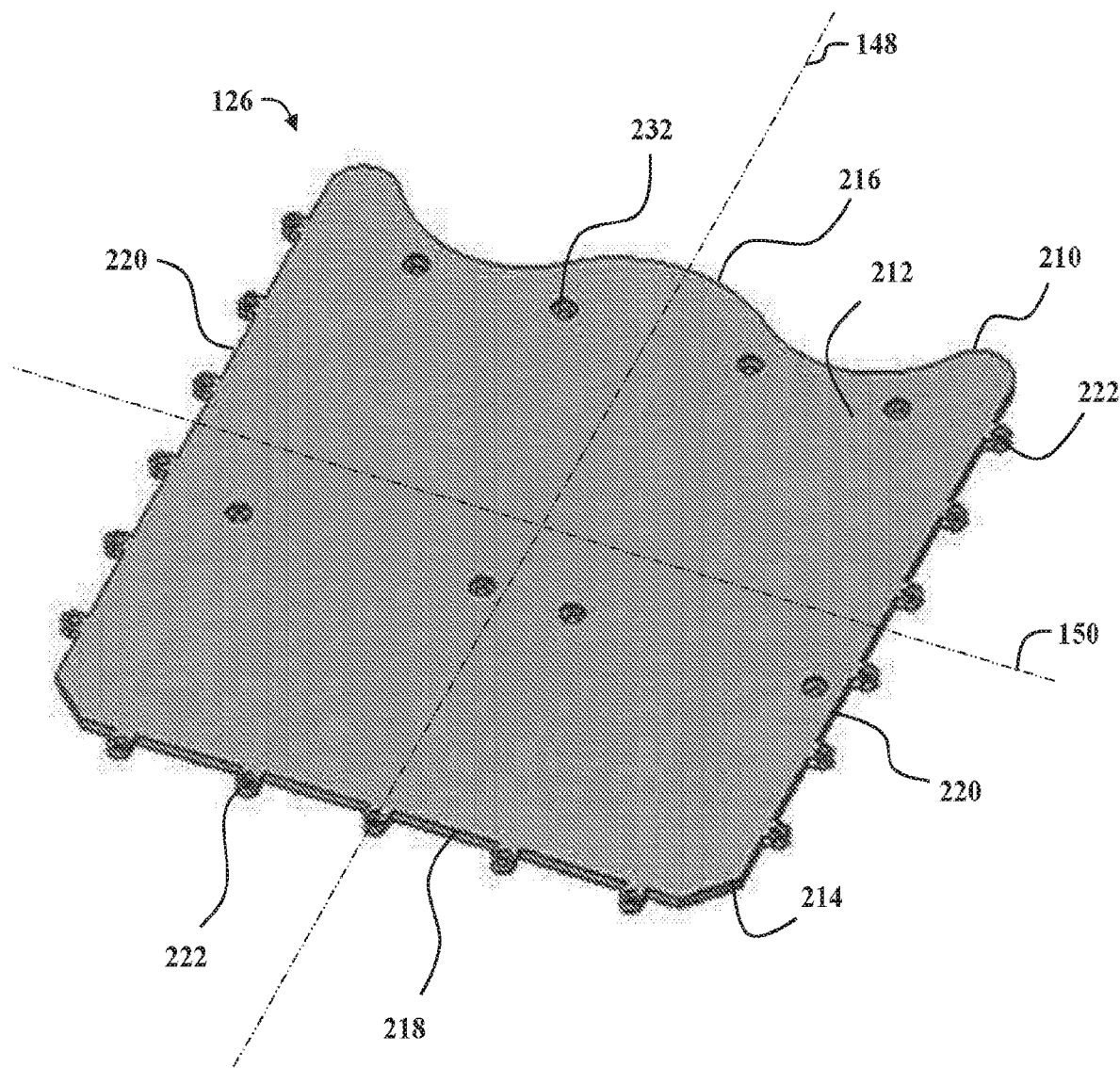
FIG. 28 is a perspective view of a top cover that may be used with the cradle assembly shown in FIG. 19.
Figure 32:
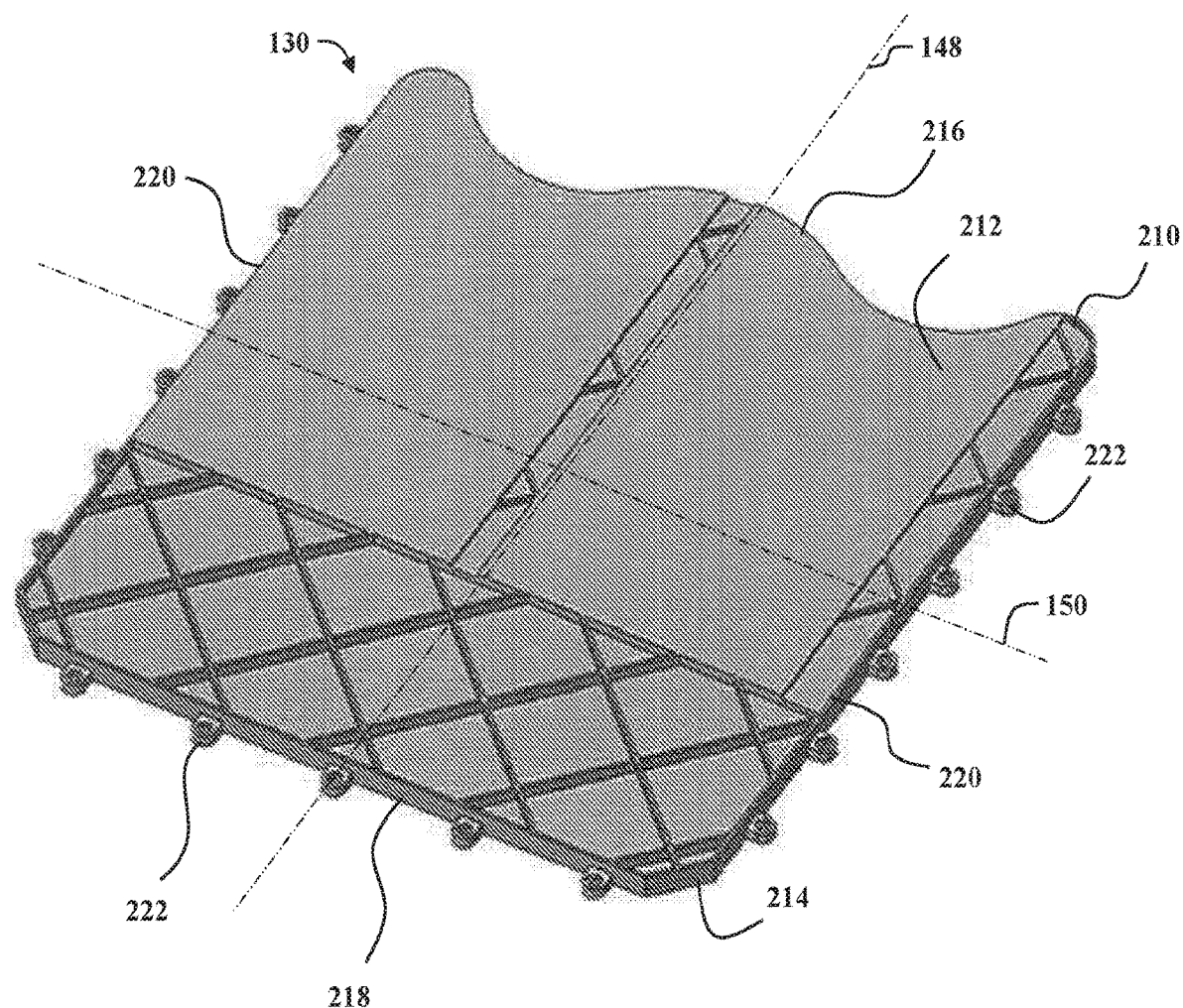
FIG. 32 is a perspective view of a bottom cover that may be used with the cradle assembly shown in FIG. 19.
Figure 36:
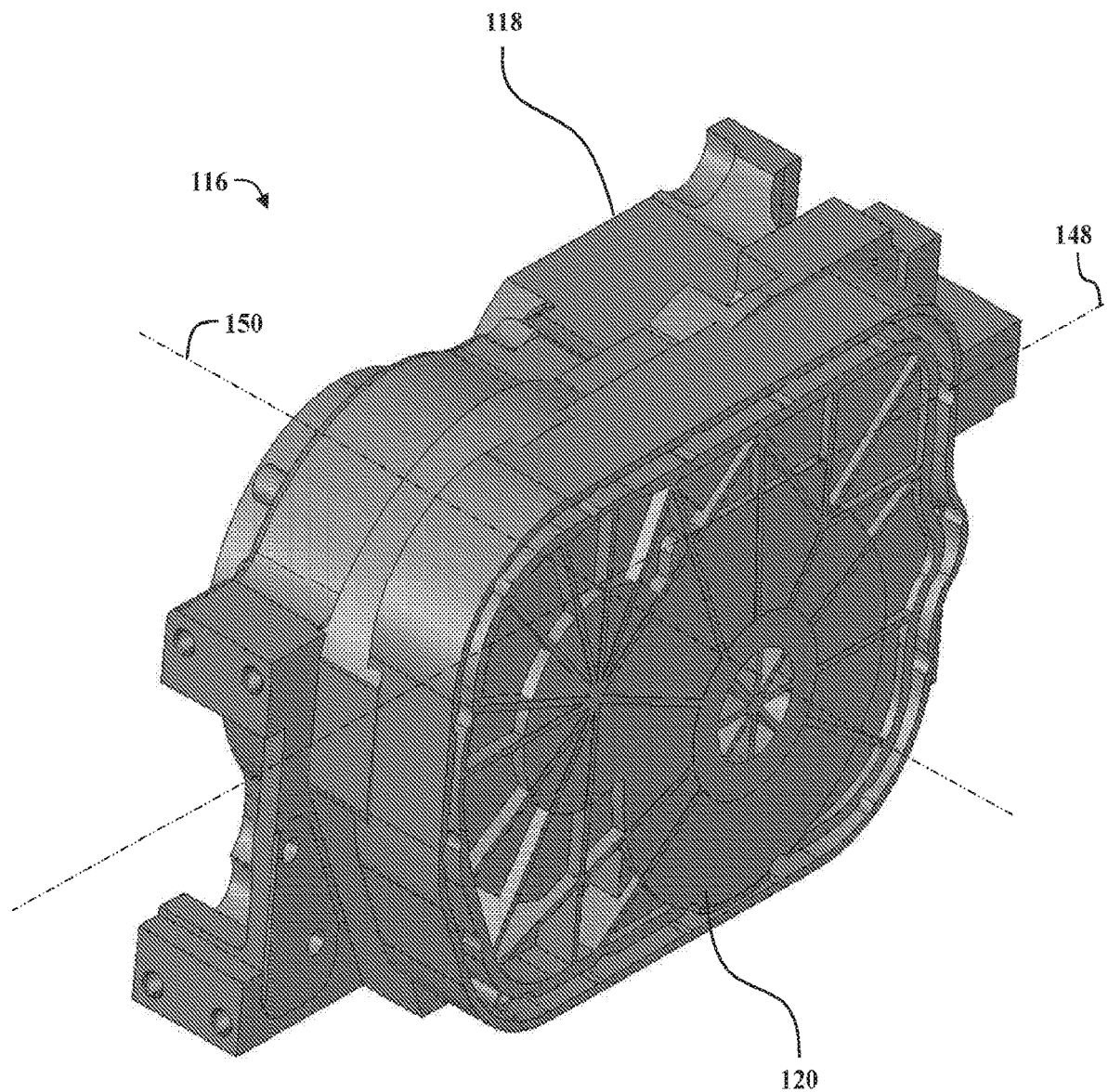
FIGS. 36 and 37 are perspective views of a gearbox that may be used with the axle assembly shown in FIG. 2, according to embodiments of the present invention.
Figure 37:
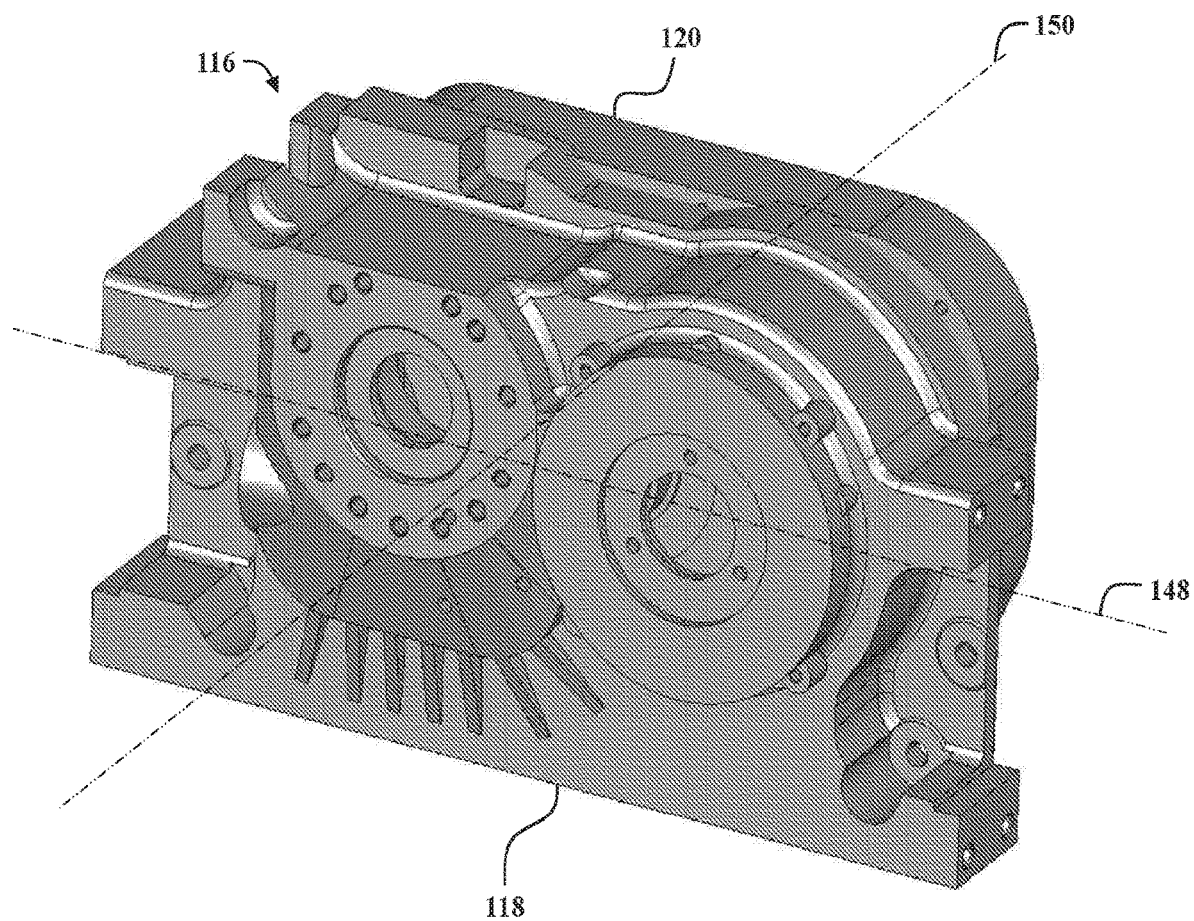
Figure 38:
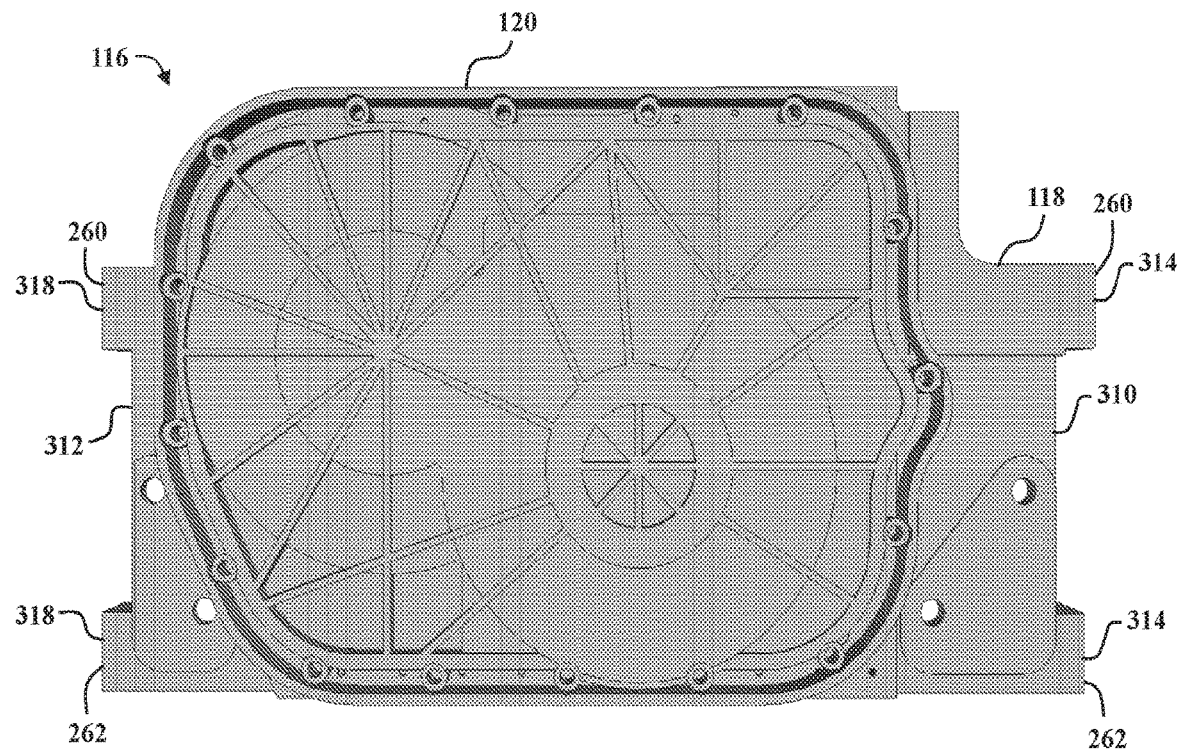
FIGS. 38-41 are side views of the gearbox shown in FIG. 36.
Figure 39:
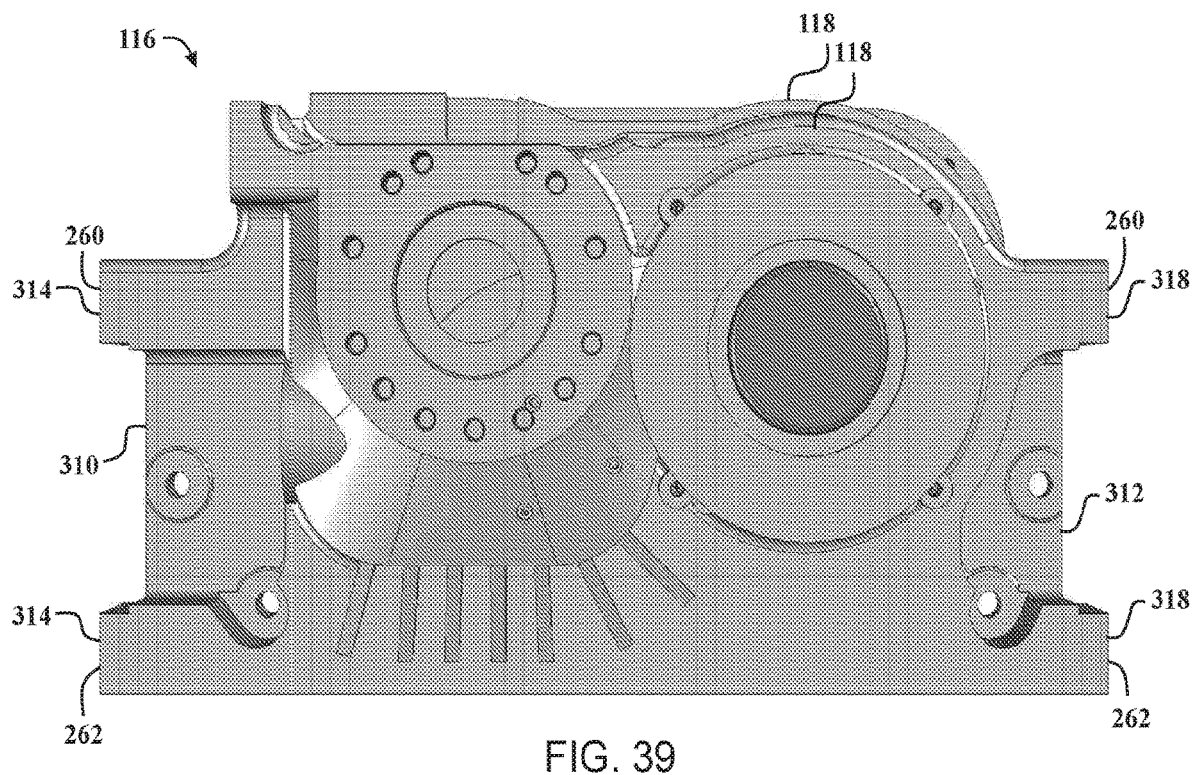
Figure 40:
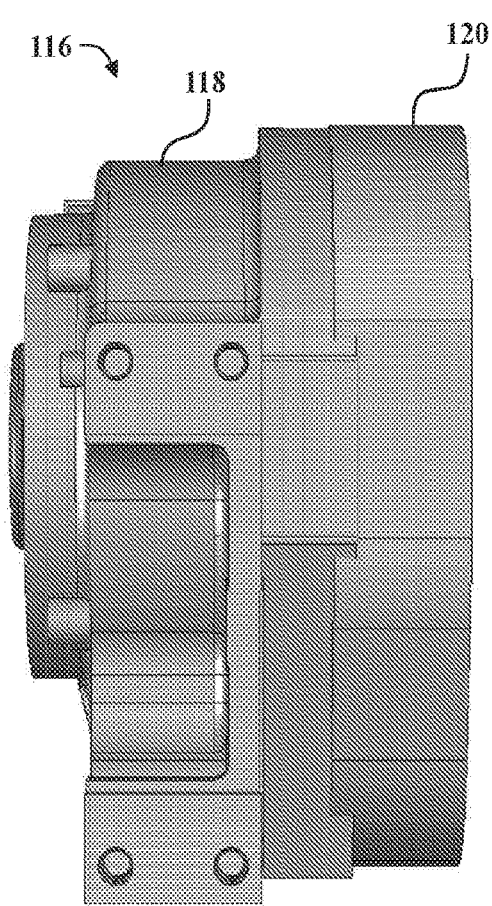
Figure 41:
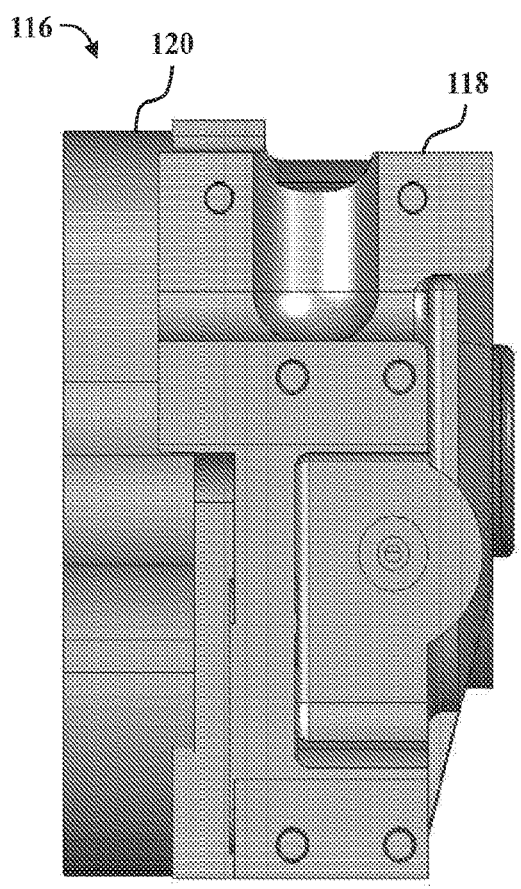
Figure 42:
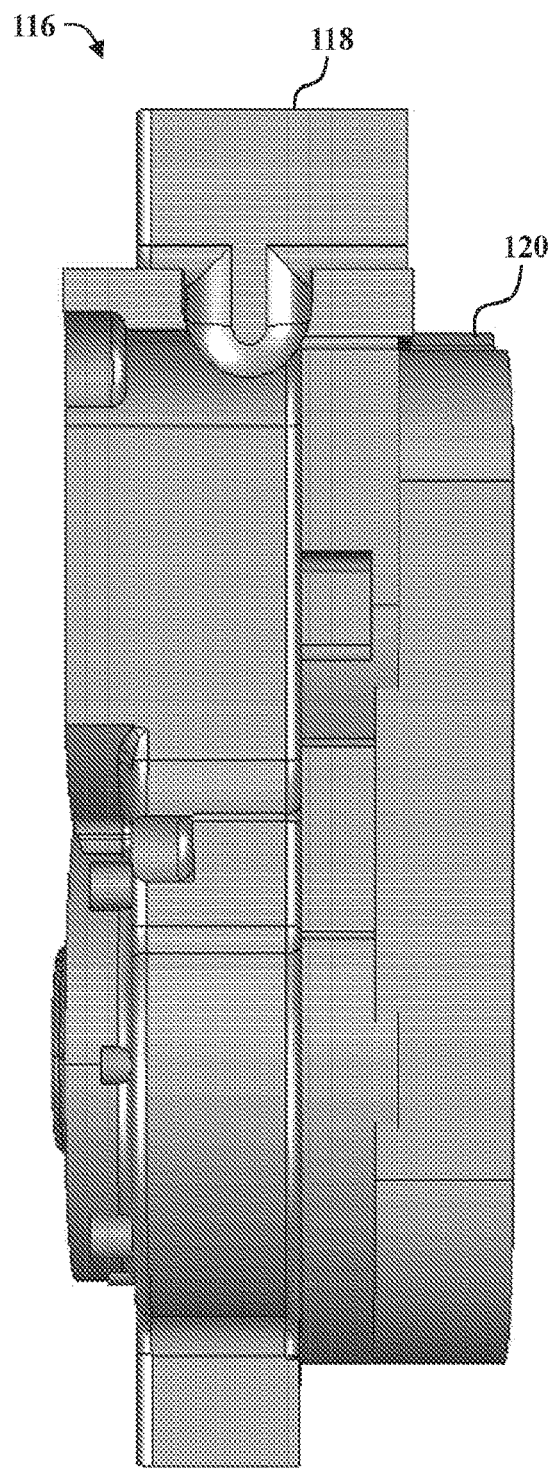
FIG. 42 is a top view of the gearbox shown in FIG. 36.
Figure 43:
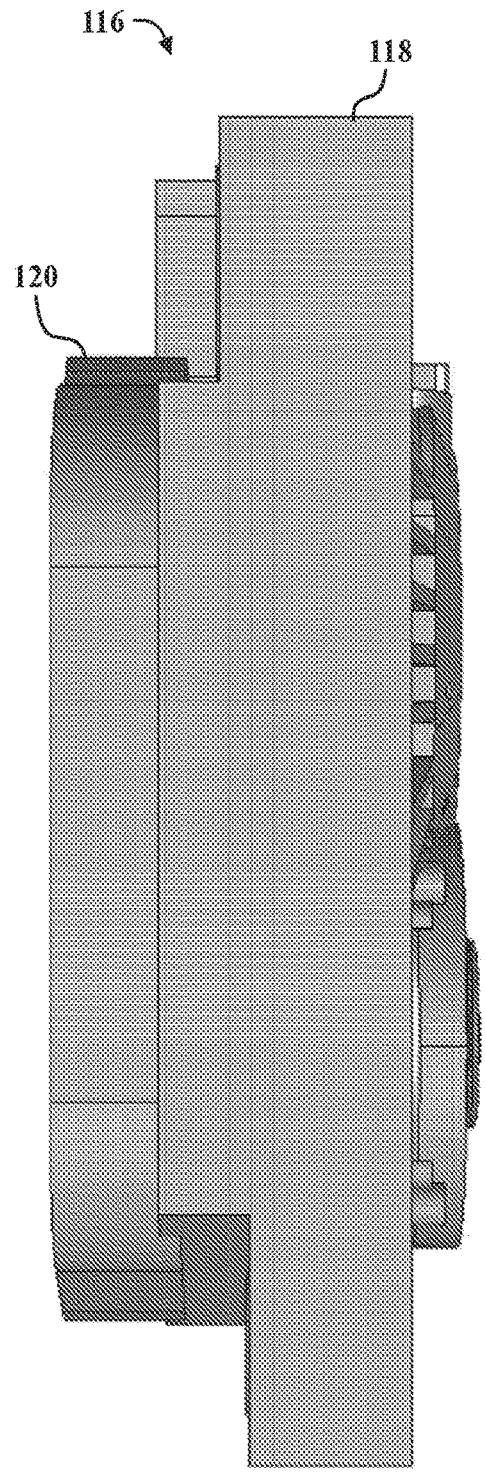
FIG. 43 is a bottom view of the gearbox shown in FIG. 36.
Figure 44:
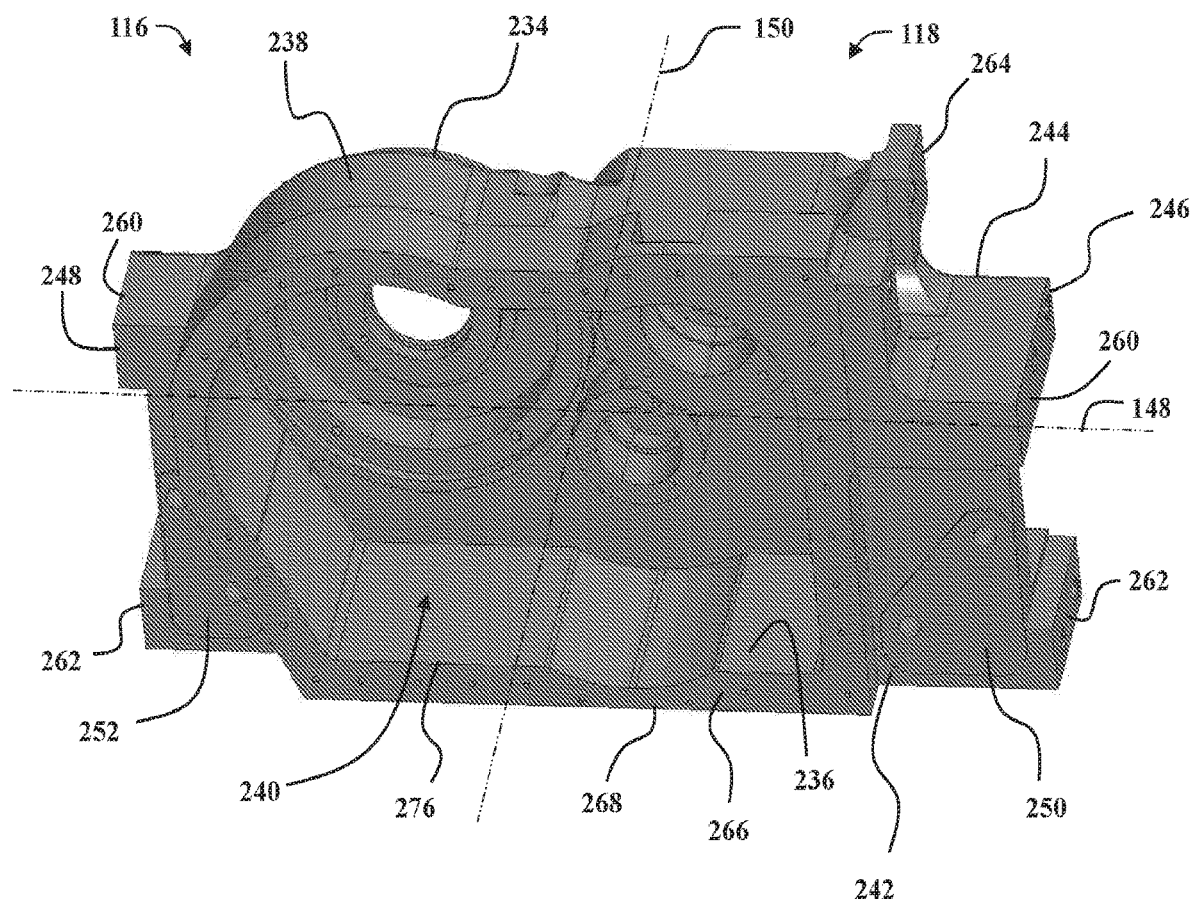
FIG. 44 is a perspective view of a gearbox housing that may be used with the gearbox shown in FIG. 36, according to embodiments of the present invention.
Figure 45:
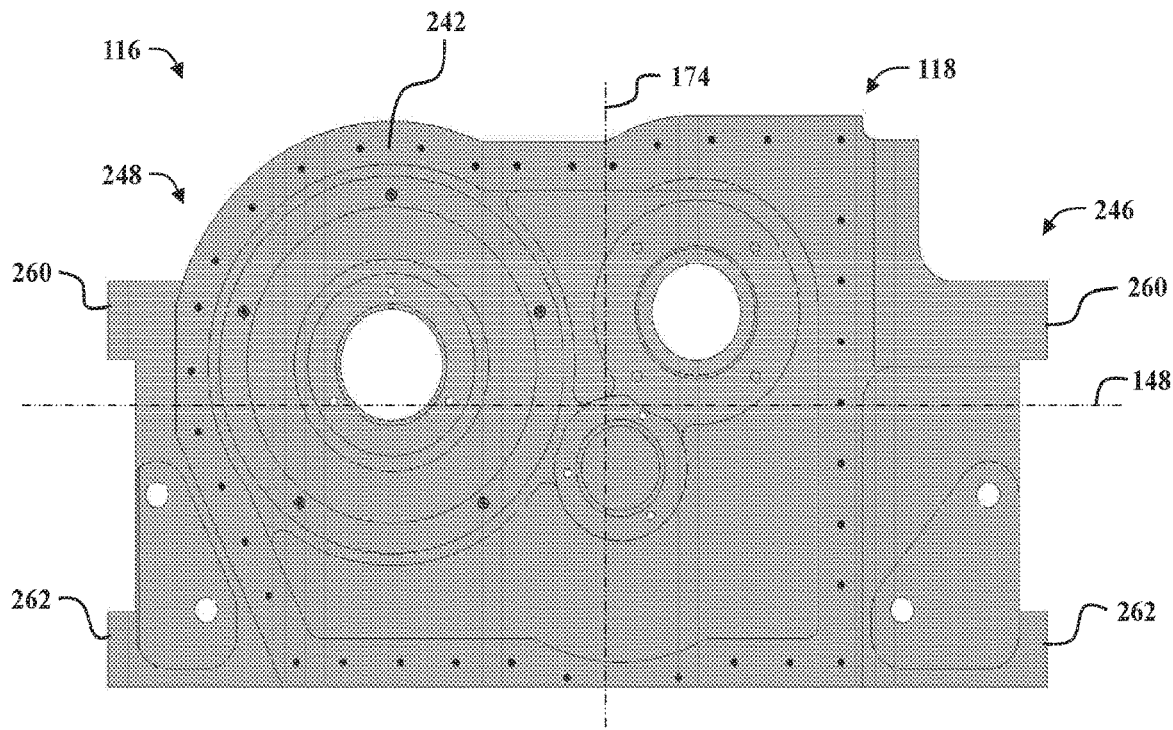
FIGS. 45-48 are side views of the gearbox housing shown in FIG. 44.
Figure 46:
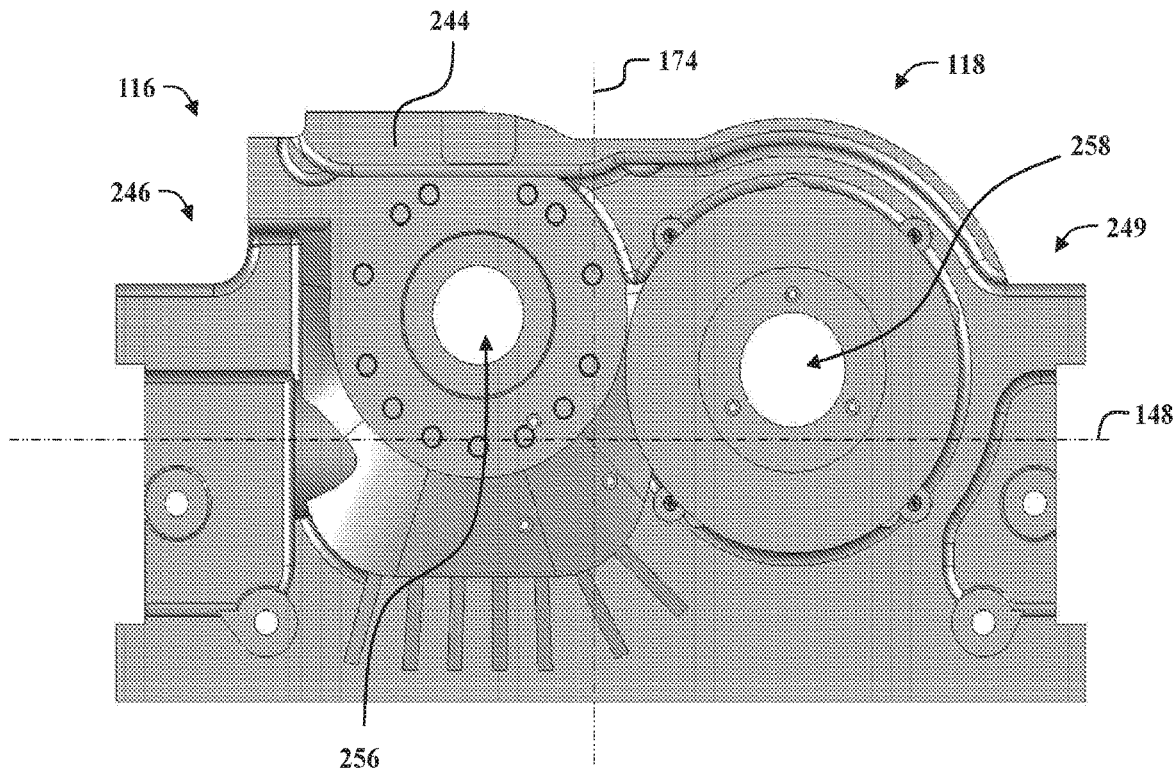
Figure 47:
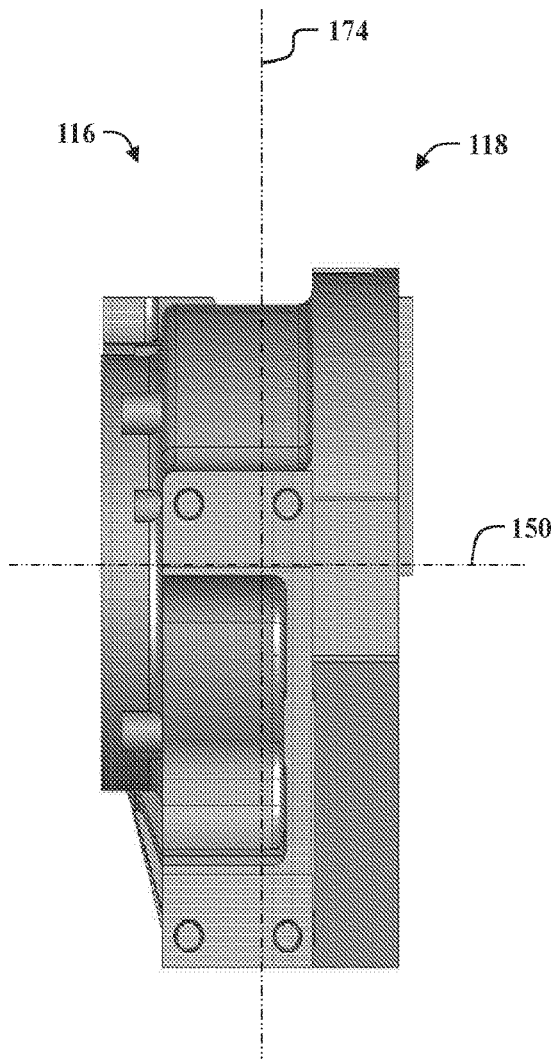
Figure 48:
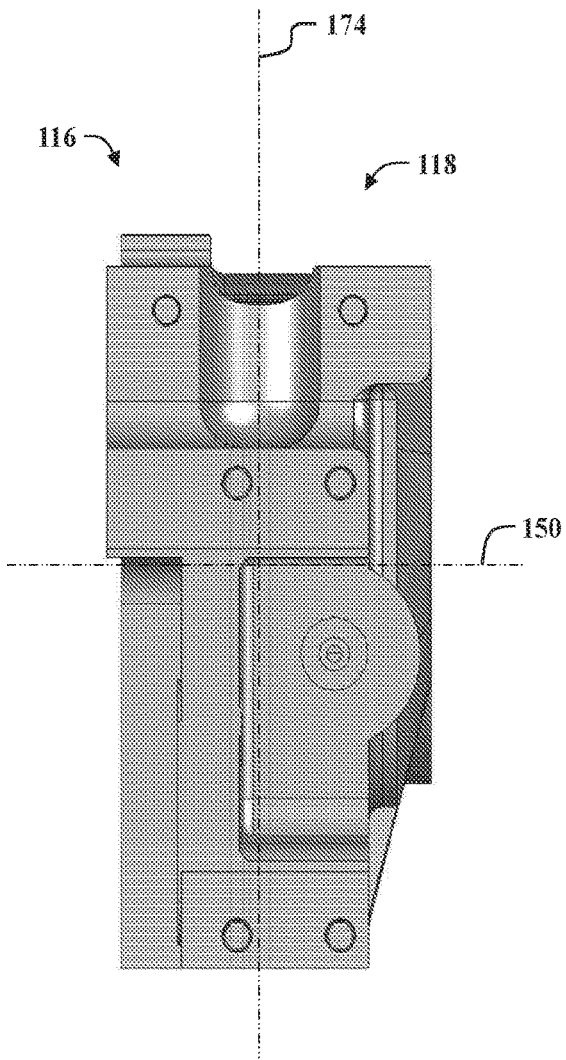
Figure 49:
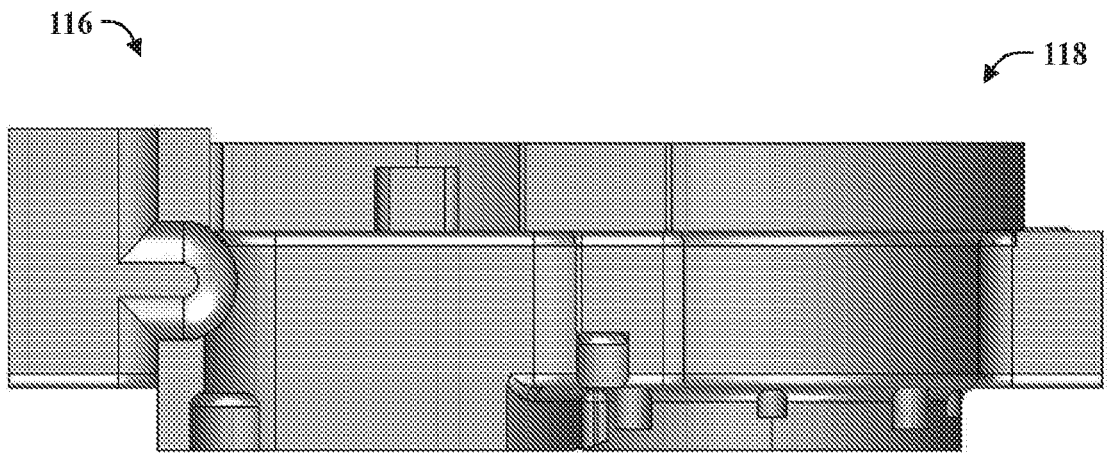
FIG. 49 is a top view of the gearbox housing shown in FIG. 44.
Figure 50:
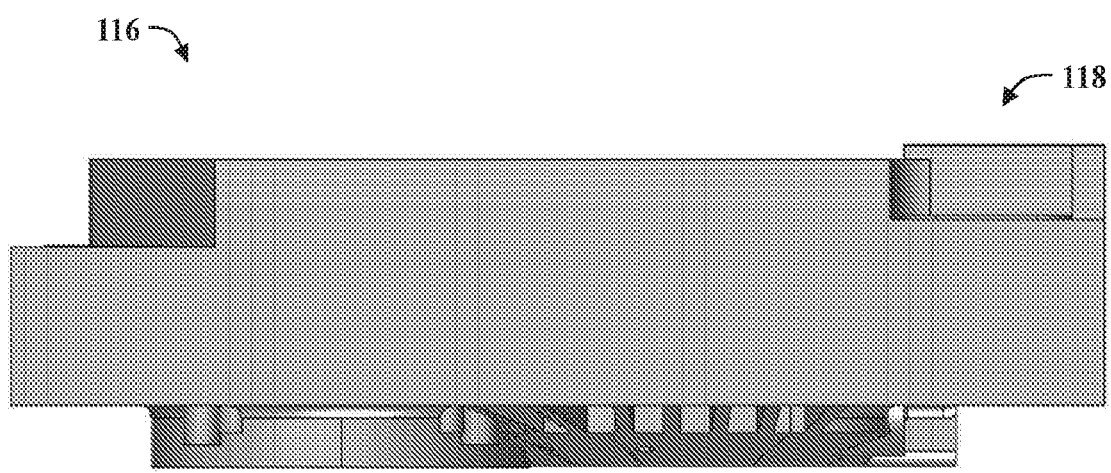
FIG. 50 is a bottom view of the gearbox housing shown in FIG. 44.
Figure 51:
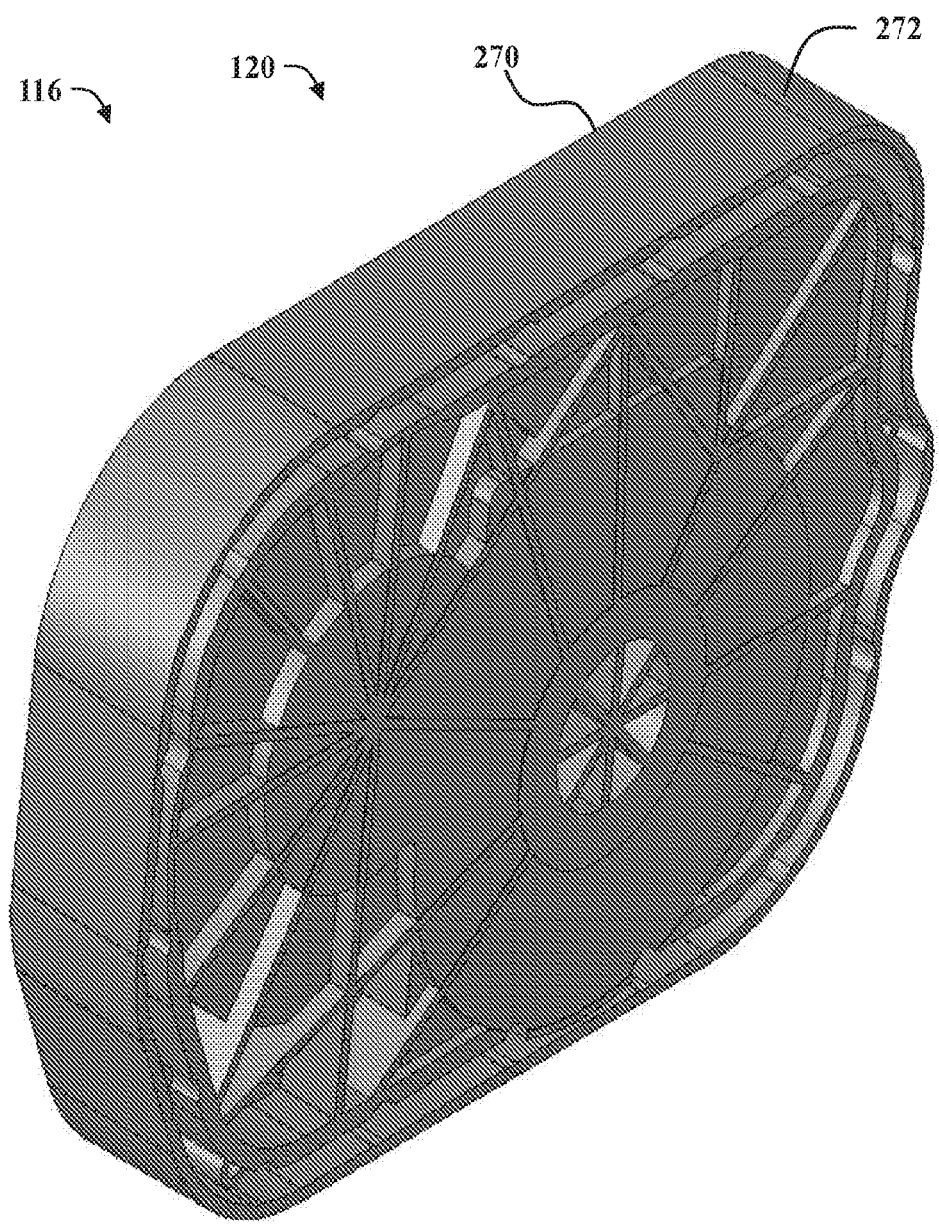
FIGS. 51-52 are perspective views of a gearbox cover that may be used with the gearbox shown in FIG. 36, according to embodiments of the present invention.
Figure 52:
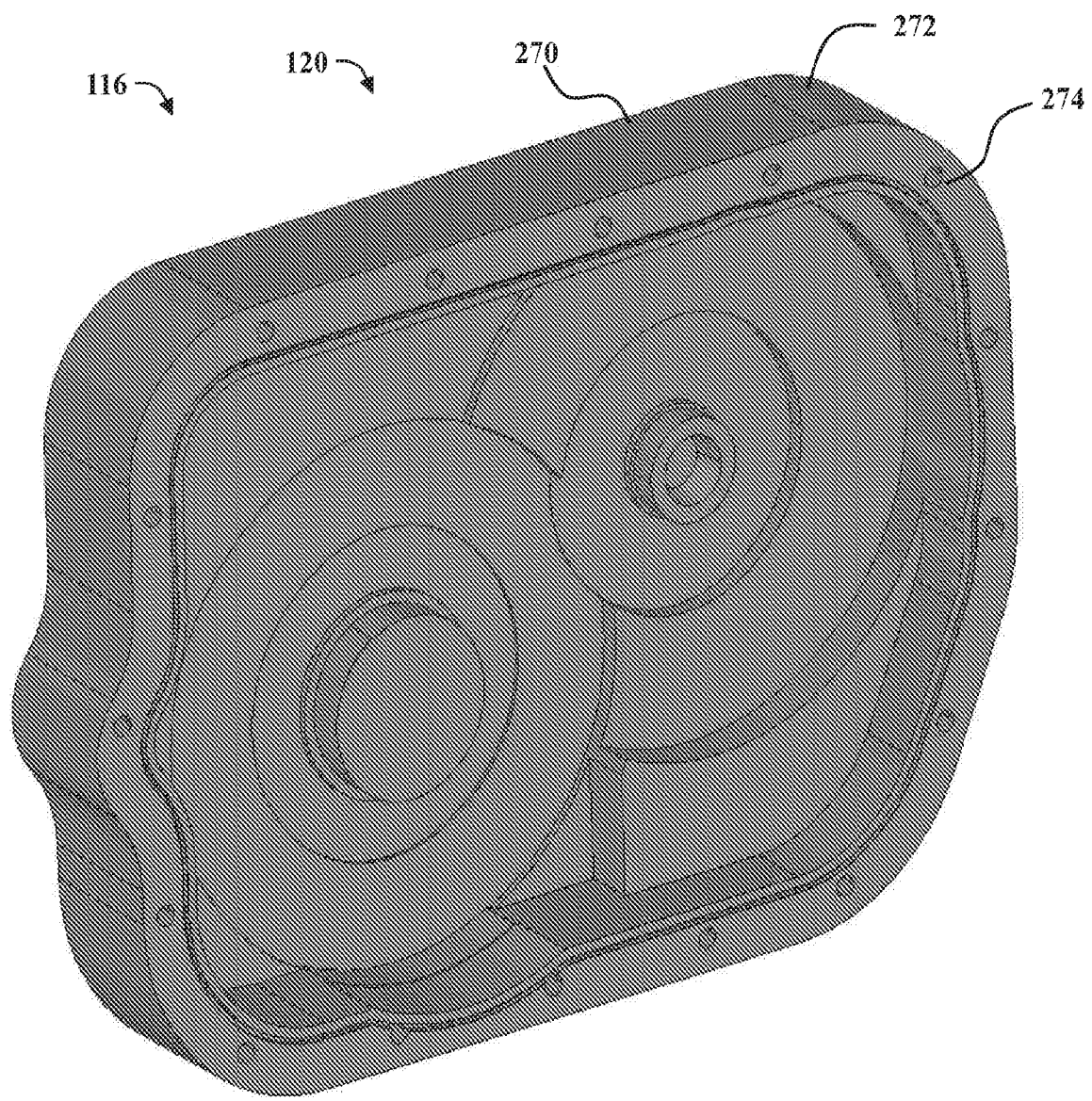
Figure 53:
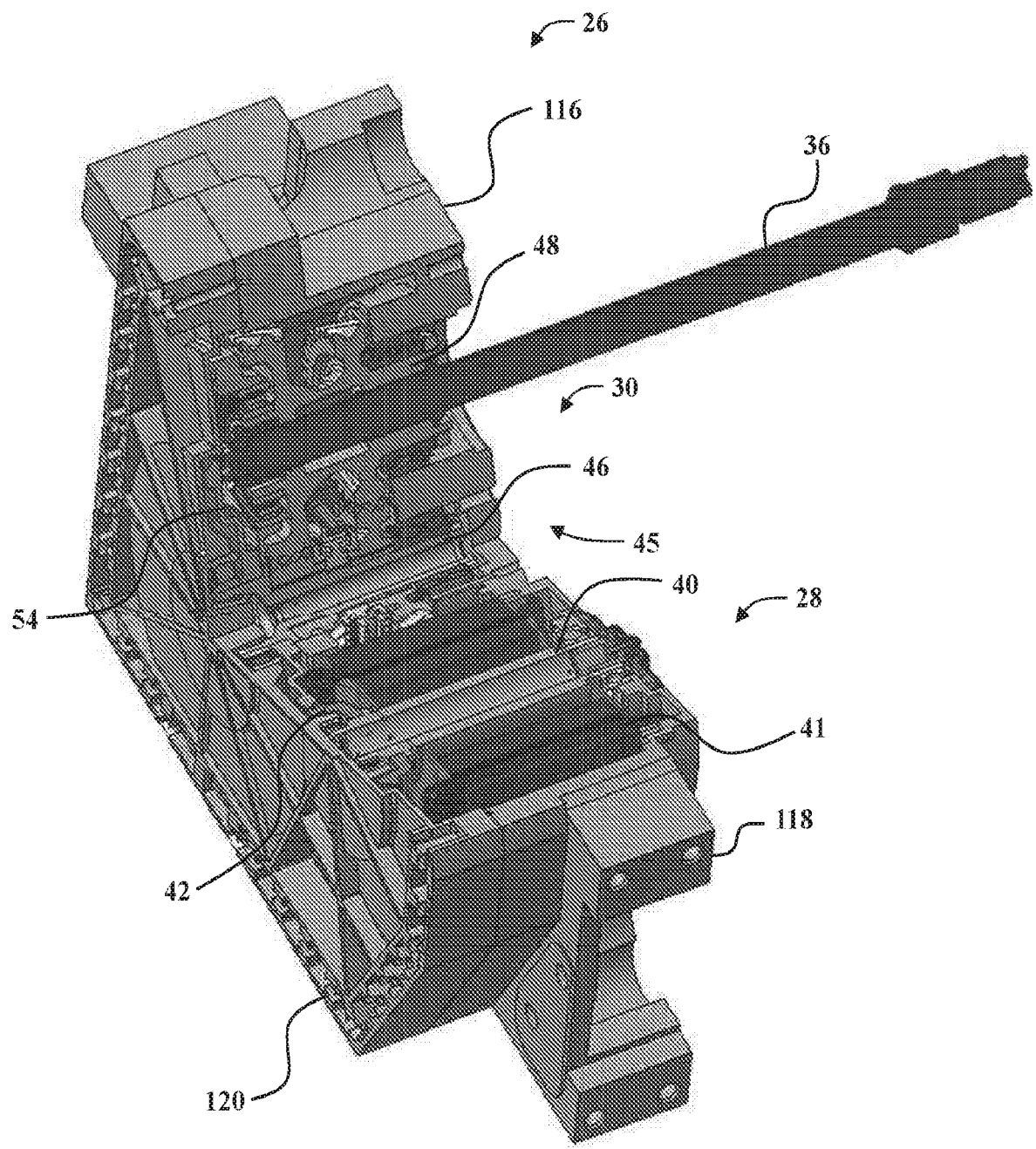
FIG. 53 is a cutaway perspective view of a gearbox housing and a drive unit that may be used with the axle assembly shown in FIG. 2, according to embodiments of the present invention.
Figure 54:
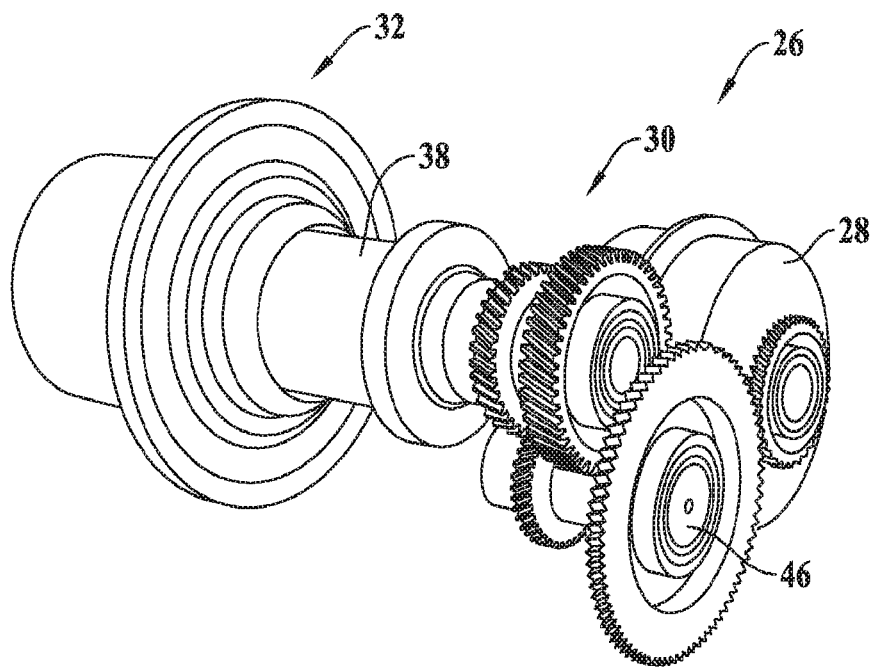
FIGS. 54-55 are schematic views of a drive unit that may be used with the axle assembly shown in FIG. 2.
Figure 55:
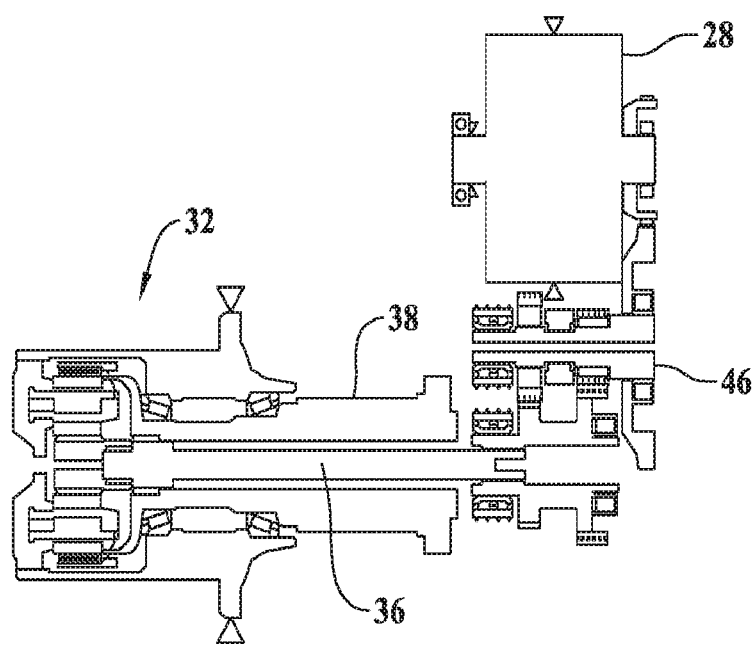

As shown in FIGS. 1-2, the bridge section 14 is arranged between each outer section 16 of the axle housing 12. It is desirable for a height of a low floor to be both as low as possible, and a width to be as wide as possible in order to maximize capacity of the vehicle. As such, the bridge section 14 is offset from the axis of rotation 24 of the wheels 22 in order to decrease the height of the low floor of the vehicle. The outer sections 16 are configured to support the wheel drive units 26 within the axle housing. Each outer section 16 has a width, which must be decreased in order to increase the width of the low floor of the vehicle. The bridge section 14 may be integrally formed with the outer sections 16 or may be coupled to the outer sections 16 using methods commonly used in the art. For example, the bridge section 14 may be welded, pressed, or bolted to the outer sections 16. The bridge section 14 may be hollow or solid.

The axle assembly 10 may further include a braking system for the vehicle. The braking system may include an air cylinder 34, brake hoses, brake drums, brake rotors, brake calipers, and the like. In the embodiment shown, the air cylinders 34 are coupled to the axle housing 12 and arranged near each of the outer sections 16. The air cylinders 34 may be coupled to brake shoes directly or through a linkage.

Referring now to FIGS. 3-2 and 53-69, the wheel drive unit 26 is shown with the axle housing 12 removed. The drive unit 26 includes an axle shaft 36 coupled to the transmission unit 30 and the wheel end assembly 32. The axle shaft 36 extends along an axle centerline axis 37 that defines the axis of rotation 24 between a first axle end 36*a* and a second axle end 36*b* (shown in FIG. 59).

The transmission unit 30 is coupled to both the electric machine 28 and the axle shaft 36, and the wheel end assembly 32 is coupled to the wheel 22. As such, torque generated by the electric machine 28 is transferred through the transmission unit 30 to the wheel end assembly 32, and then to the wheel 22. The drive unit 26 further includes a spindle 38 (shown in FIG. 54) coupled to the axle housing 12. The axle shaft 36 is disposed in the spindle 38 between the wheel end assembly 32 and the transmission unit 30. As will be discussed in further detail below, the transmission unit 30 has two reduction ratios, which may be selectively engaged by an operator of the vehicle, or a transmission controller.

The electric machine 28 generates torque to drive the wheels 22. The electric machine 28 includes a rotor shaft 40 that protrudes from an electric motor 41. A drive pinion 42 is fixed to the rotor shaft 40. The rotor shaft 40 extends along a rotor shaft centerline axis 44 that defines a rotational axis that extends through the electric machine 28. The rotor shaft centerline axis 44 is orientated parallel to the axle centerline axis 37. The electric machine 28 may be a DC or AC motor, brushed or brushless, and other types commonly known in the art.

The electric machine 28 is oriented such that the rotor shaft 40 protrudes away from the respective wheel 22 with the rotor shaft centerline axis 44 of the rotor shaft 40 arranged parallel to the axis of rotation 24 of the wheels 22. The electric machine 28 is spaced a distance longitudinally from the axis of rotation 24 of the wheels 22.

By orienting the electric machine 28 such that the rotor shaft 40 protrudes away from, and is longitudinally spaced from the axis of rotation 24 the respective wheel 22, packaging space within the outer sections 16 of the axle housing 12 is increased without increasing the width of the outer sections 16. The increased packaging space within the outer sections 16 allows the transmission unit 30 to be arranged adjacent to the electric machine 28. Preferably, the overall width of the electric machine 28 is substantially similar to the overall width of the transmission unit 30. As such, the packaging space is not materially affected by the introduction of the electric machine 28. Stated another way, with the transmission unit 30 arranged adjacent to the electric machine 28 the width of the low floor may be wider than if the transmission unit 30 was arranged otherwise. Furthermore, the increased packaging space allows for the transmission unit 30 to be configured with multiple reduction ratios. Aligning each of the axes of rotation 24, 44 in a parallel manner increases the efficiency of the transmission unit 30.

As mentioned above, the drive unit 26 includes the transmission unit 30. The transmission unit 30 has a first reduction ratio and a second reduction ratio. The transmission unit 30 includes the output assembly 43 and an offset gear reduction assembly 45 that is coupled to the output assembly 43 and the drive pinion 42 of the electric machine 28 for transferring torque from the electric machine 28 to the output assembly 43. The output assembly 43 includes an output shaft 48 and a plurality of output gears that are fixedly coupled to the output shaft 48. The offset gear reduction assembly 45 includes an idler shaft 46 that is orientated substantially parallel with the output shaft 48, and a plurality of idler gears that are rotatably coupled to the idler shaft 46, and a shift mechanism 50. Each idler gear is configured to mesh with a corresponding output gear such that a rotation of an idler gear causes a rotation of the corresponding output gear. The shift mechanism 50 is coupled to the idler shaft 46 for selectively transferring torque from the idler shaft 46 to the plurality of idler gears.

The idler shaft 46 and the output shaft 48 each have two ends rotatably supported by bearings 52 in the drive unit 26. A drive wheel 54 is fixed to the idler shaft 46 and meshes with the drive pinion 42. The drive wheel 54 transfers torque to the idler shaft 46 from the drive pinion 42.

In addition to the drive wheel 54, two idler gears 56, 58 are rotatably supported on the idler shaft 46. A first idler gear 56 corresponds to the first reduction ratio of the transmission unit 30, and a second idler gear 58 corresponds to the second reduction ratio of the transmission unit 30. Each of the idler gears 56, 58 can spin freely on the idler shaft 46 such that when the corresponding reduction ratio is not engaged, no torque is transferred between the idler shaft 46 and the idler gear 56, 58. As will be discussed in further detail below, each idler gear 56, 58 includes a splined portion engageable with the shift mechanism 50 to rotatably couple the idler gear 56, 58 to the idler shaft 46.

Figure 59:
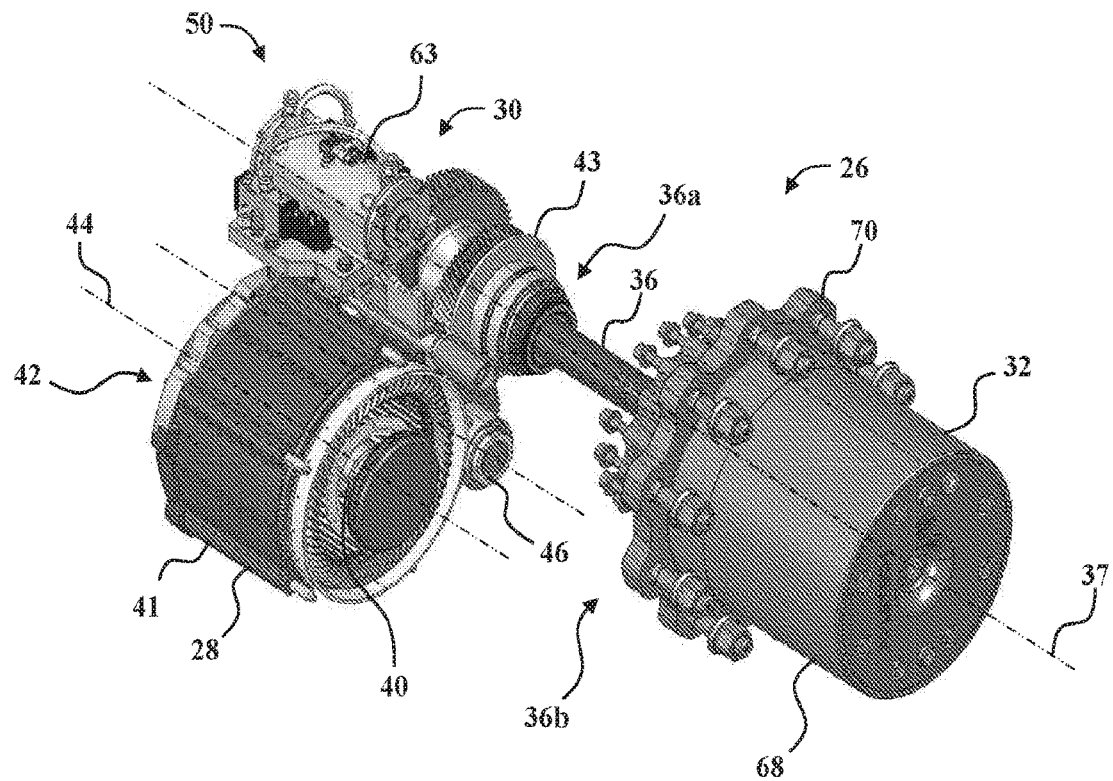
FIGS. 59-64 are perspective views of the drive unit shown in FIG. 54, according to embodiments of the present invention.
Figure 60:
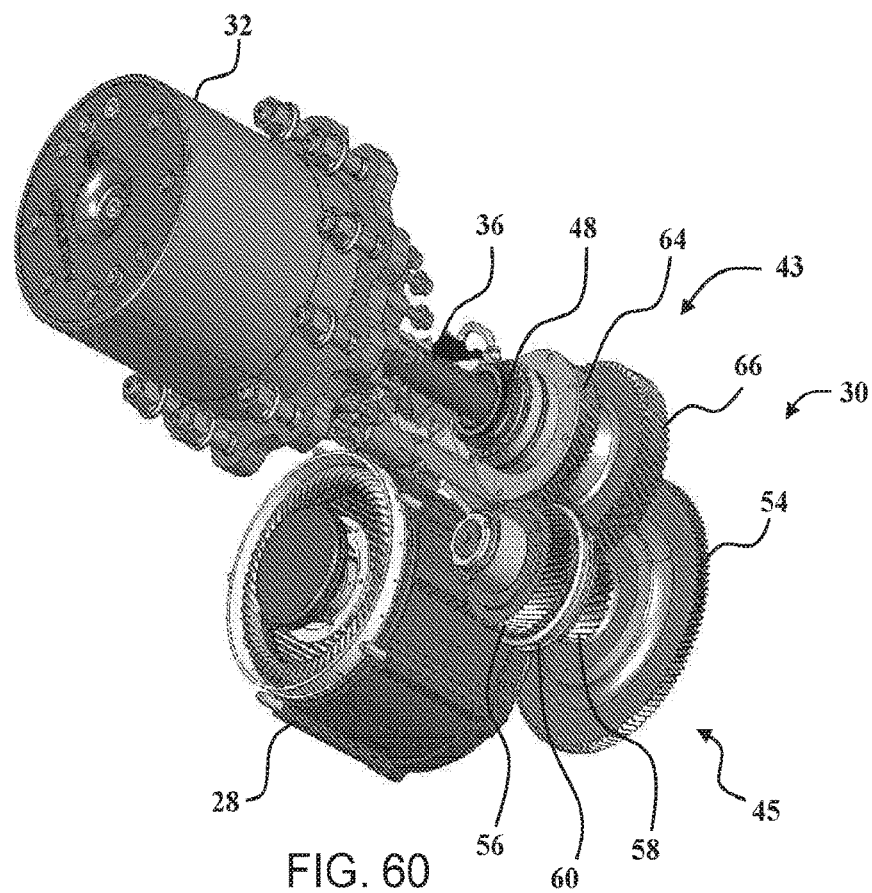
Figure 61:
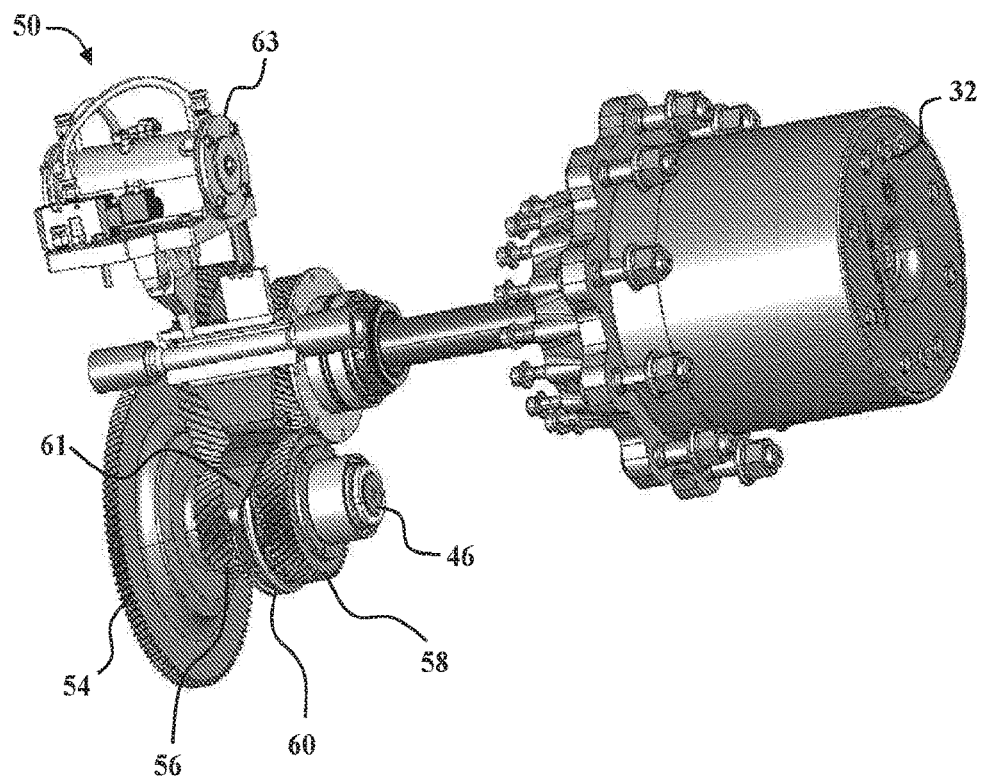
Figure 62:
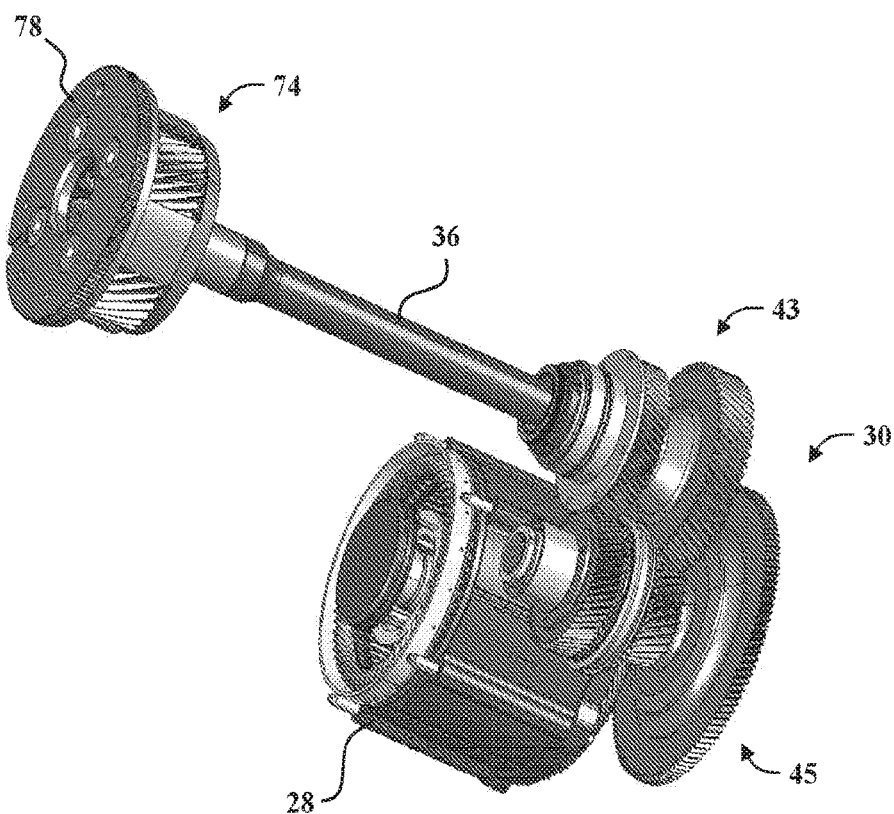
Figure 63:
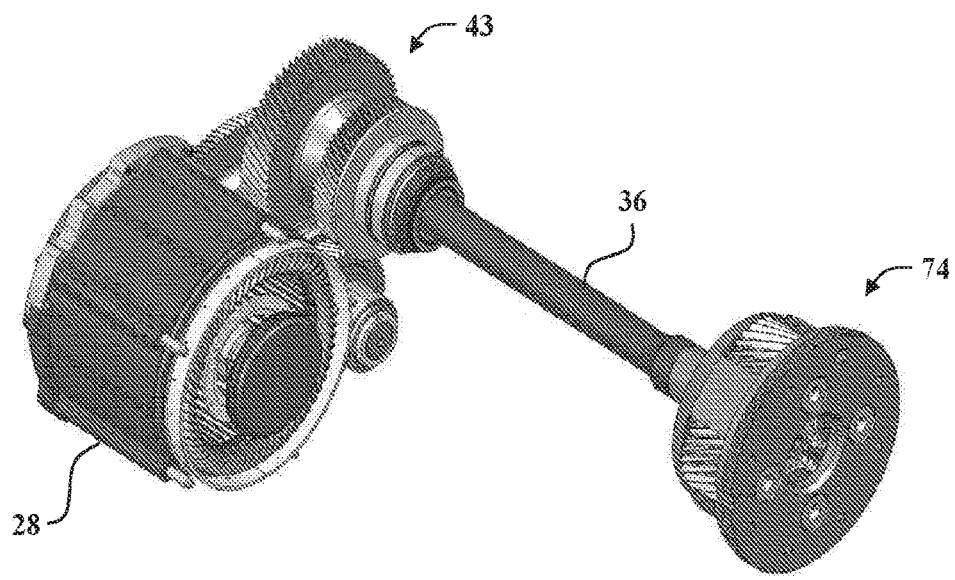
Figure 64:
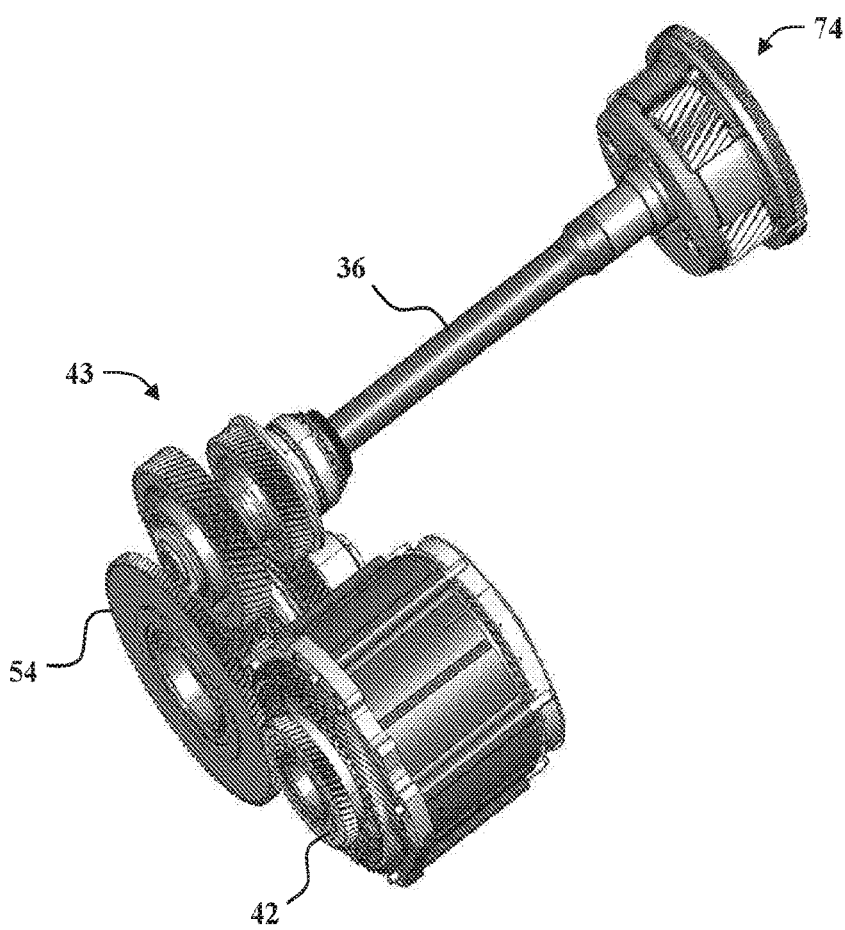
Figure 65:
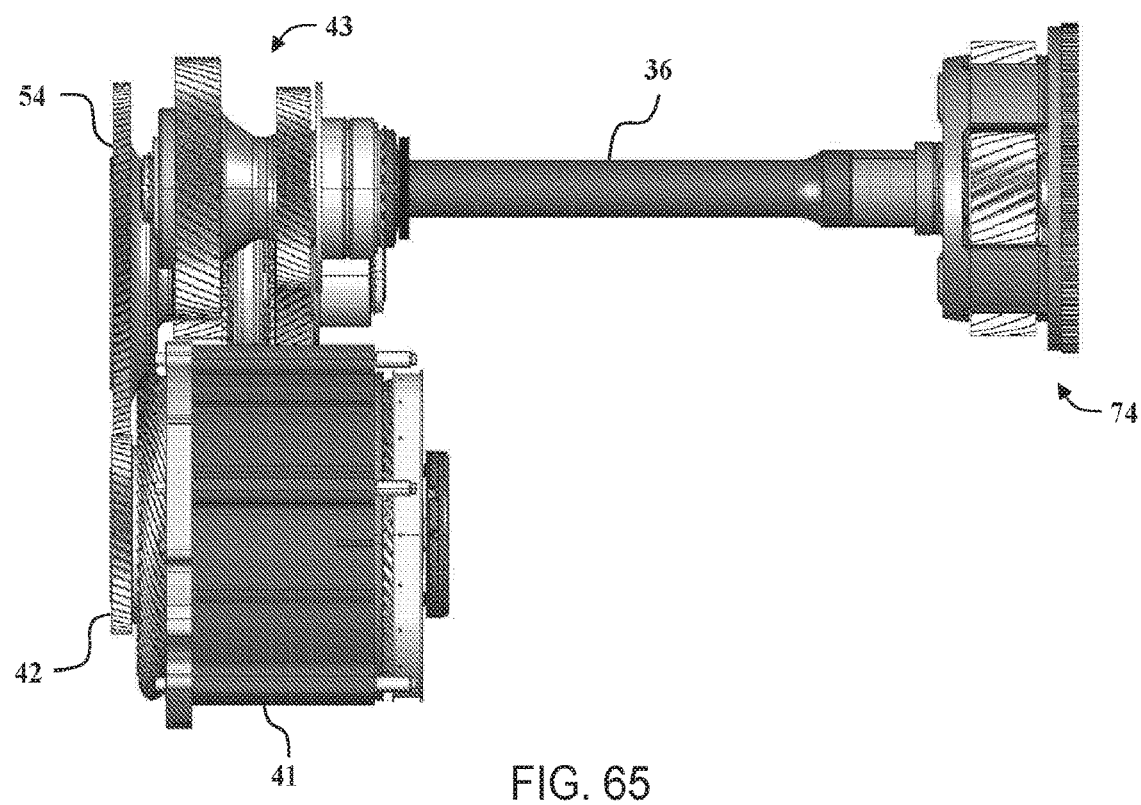
FIG. 65 is a top view of the portion of the drive unit shown in FIGS. 59-64.
Figure 66:
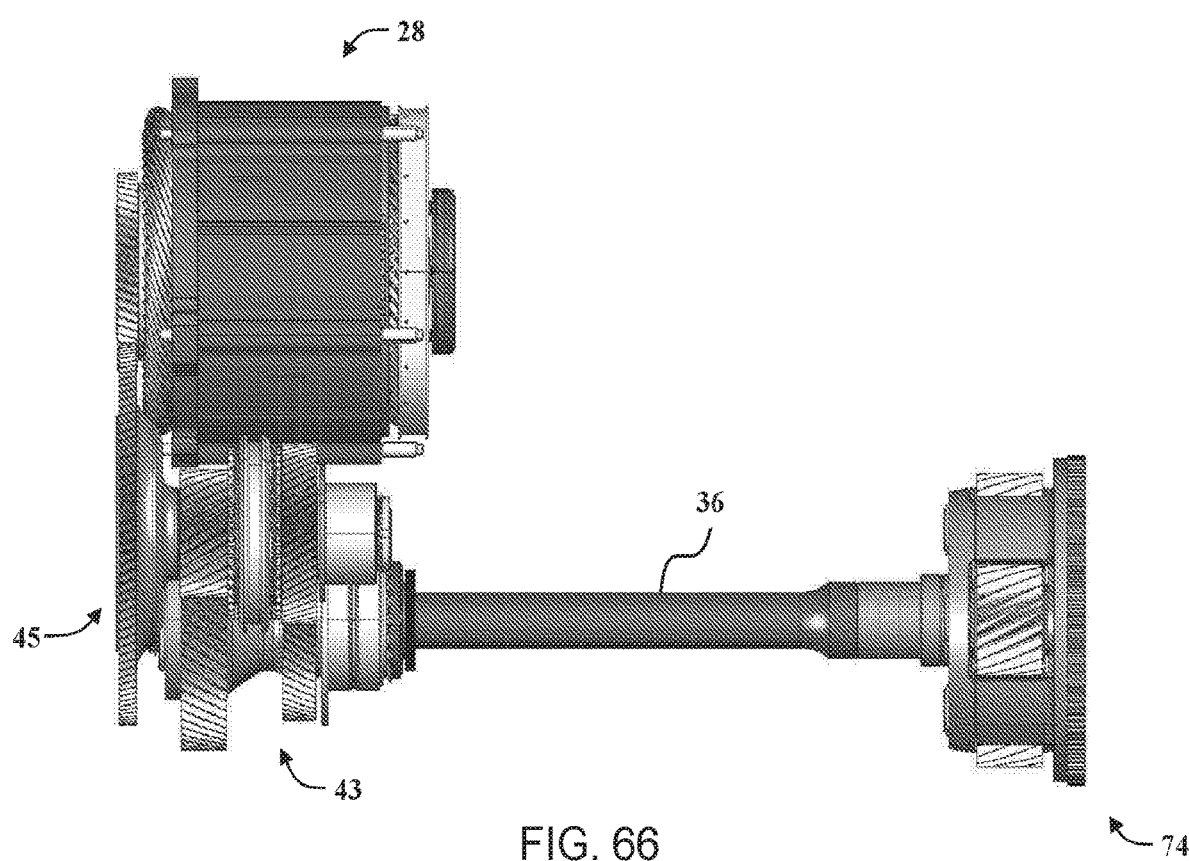
FIG. 66 is a bottom view of the portion of the drive unit shown in FIGS. 59-64.
Figure 67:
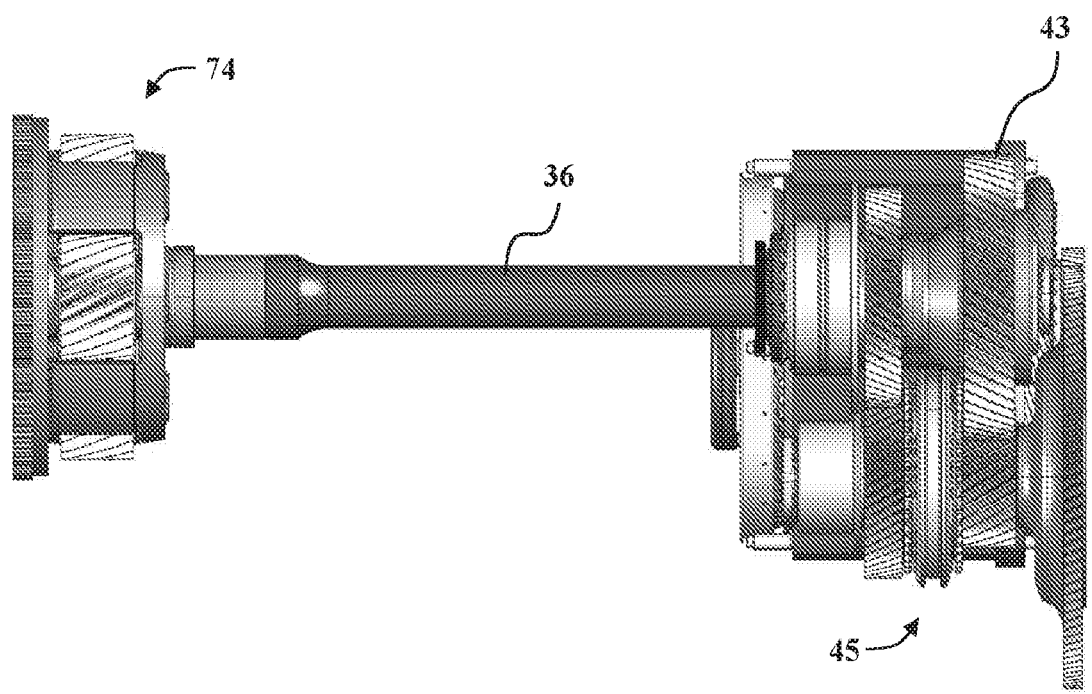
FIG. 67 is a side view of the portion of the drive unit shown in FIGS. 59-64.

The shift mechanism 50 of the transmission unit 30 includes a shift ring 60, a shift fork 61, and an actuator 63 (shown in FIGS. 59-61). The shift ring 60 is slideable along the idler shaft 46 between the first idler gear 56 and the second idler gear 58. The shift ring 60 is rotatably coupled to the idler shaft 46 such that the shift ring 60 and the idler shaft 46 rotate at the same speed. The shift ring 60 includes at least one splined portion engageable with the splined portion of either of the idler gears 56, 58. Additionally, the shift ring 60 defines a groove 62 configured to engage the shift fork 61.

The shift fork 61 is coupled to the actuator 63 and movable to select the first reduction ratio and the second reduction ratio. The shift fork 61 is engaged with the shift ring 60 such that the shift fork 61 is capable of moving the shift ring 60 into engagement with one of the idler gears 56, 58. Additionally, the shift fork 61 may be movable into a neutral position where neither of the idler gears 56, 58 are engaged with the shift ring. The shift mechanism 50 may further include a synchronizer to aid shifting. The actuator may be controlled manually or automatically. The actuator may be responsive to hydraulic pressure, pneumatic pressure, or electronic signals generated by a transmission control module. Alternatively, the actuator may include a mechanical linkage controlled by the vehicle operator.

The transmission unit 30 further includes two output gears 64, 66. Each of the output gears 64, 66 is coupled to the output shaft 48, a first output gear 64 engaged with the first idler gear 56, and a second output gear 66 engaged with the second idler gear 58. The output gears 64, 66 are rotatably fixed to the output shaft 48 such that the output gears 64, 66 and the output shaft 48 rotate at the same speed. The output shaft 48 defines a bore extending therethrough. The bore is configured to receive the axle shaft 36 and may be splined or keyed such that the axle shaft 36 and the output shaft 48 rotate at the same speed. As mentioned above, the axle shaft 36 is disposed in the spindle 38 and coupled between the wheel end assembly 32 and the transmission unit 30.

The wheel end assembly 32 is arranged at an end of the spindle 38 opposite the transmission unit 30. The wheel end assembly 32 includes a wheel hub 68 having a wheel flange 70. The wheel hub 68 is rotatably supported on the spindle 38 by a pair of hub bearings 72. The wheels 22 may be secured to the wheel flange 70 using bolts, nuts, and other fasteners known in the art.

Each wheel end assembly 32 further includes a planetary reduction 74, which increases torque to drive the wheels 22. The planetary reduction 74 includes a sun gear 76, a planet carrier 78, a plurality of planet gears 80, and a ring gear 82. The ring gear 82 is coupled to the spindle 38. The sun gear 76 is coupled to the end of the axle shaft 36 and disposed in the ring gear 82. The ring gear 82 is fixed relative to the sun gear 76.

The plurality of planet gears 80 are rotatably coupled to the planet carrier 78. The planet carrier 78 is arranged adjacent to the ring gear 82 with each planet gear 80 disposed in the ring gear 82. Each planet gear 80 engages both the ring gear 82 and the sun gear 76. When the axle shaft 36 rotates the sun gear 76, the sun gear 76 rotates each planet gear 80, which in turn rotates the planet carrier 78. The planet carrier 78 is coupled to the wheel hub 68 such that the planet carrier 78 and the wheel hub 68 rotate at the same speed.

Figures 56, 57:
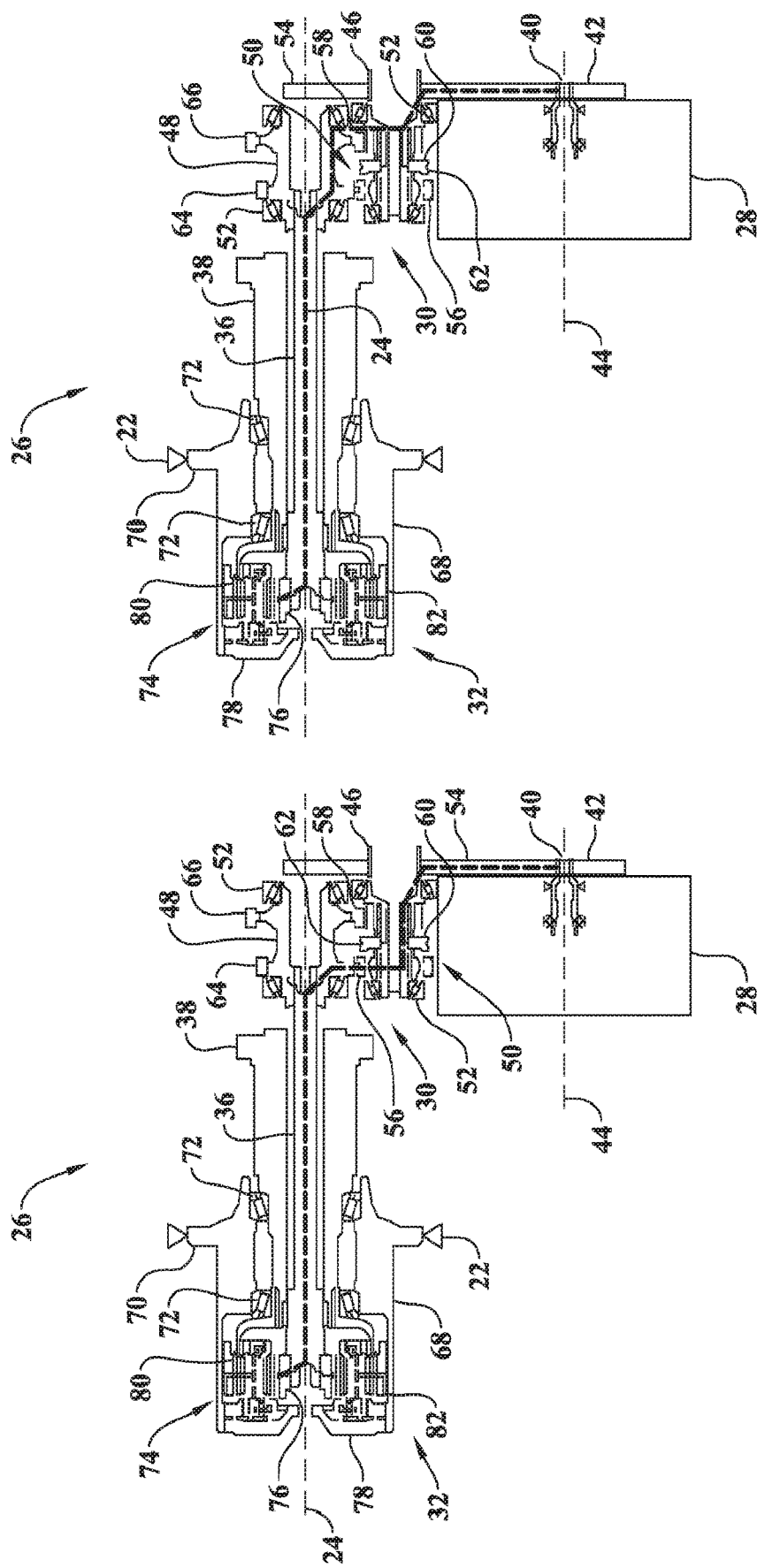
FIG. 56 is a cross-sectional view of a drive unit that of FIG. 54, shown in a first reduction ratio.
FIG. 57 is a cross-sectional view of the drive unit of FIG. 54 shown in a second reduction ratio.

Referring specifically to FIG. 56, the drive unit 26 is shown with the transmission unit 30 in the first reduction ratio and a torque path showing torque transfer through the drive unit 26. Torque is generated in the electric machine 28 to rotate the rotor shaft 40 and the drive pinion 42. The drive pinion 42 rotates the drive wheel 54 coupled to the idler shaft 46. The idler shaft 46 rotates the shift ring 60, which is engaged with the first idler gear 56. The first idler gear 56 is engaged with the first output gear 64 to transfer rotation to the output shaft 48 and axle shaft 36. Rotation of the axle shaft 36 is further transferred through the planetary reduction 74 to the wheels 22.

Referring now to FIG. 57, the drive unit 26 is shown with the transmission unit 30 in the second reduction ratio and a torque path showing torque transfer through the drive unit 26. Torque is generated in the electric machine 28 to rotate the rotor shaft 40 and the drive pinion 42. The drive pinion 42 rotates the drive wheel 54 coupled to the idler shaft 46. The idler shaft 46 rotates the shift ring 60, which is engaged with the second idler gear 58. The second idler gear 58 is engaged with the second output gear 66 to transfer rotation to the output shaft 48 and axle shaft 36. Rotation of the axle shaft 36 is further transferred through the planetary reduction 74 to the wheels 22.

In some embodiments, the drive unit 26 includes the axle shaft 36 extending along the axle centerline axis 37 between a first axle end 36a and a second axle end 36b. The wheel end assembly 32 is coupled to the first axle end 36a. The electric machine 28 includes the rotor shaft 40, the drive pinion 42 coupled to and end of the rotor shaft 40, and the electric motor 41 for rotating the rotor shaft 40. The rotor shaft 40 extends along the rotor shaft centerline axis 44 that is orientated parallel to the axle centerline axis 37. The transmission unit 30 is configured to transfer torque from the electric machine 28 to the axle shaft 36.

In the illustrated embodiment, the electric machine 28 is positioned adjacent to the transmission unit 30, and the electric motor 41 is positioned between the drive pinion 42 and the wheel end assembly 32. The transmission unit 30 includes the output assembly 43 that is coupled to the second axle end 36b such that a rotation of the output assembly rotates the axle shaft 36. The offset gear reduction assembly 45 is coupled to the output assembly 43 and the drive pinion 42 of the electric machine 28 for transferring torque from the electric machine to the output assembly.

The output assembly 43 includes the output shaft 48 coupled to the second axle end 36b and orientated co-axially with the axle shaft 36. The plurality of output gears 64, 66 are fixedly coupled to the output shaft 48. The offset gear reduction assembly 45 includes the idler shaft 46 that is orientated substantially parallel with the output shaft 48. The plurality of idler gears 56, 58 are rotatably coupled to the idler shaft 46. Each idler gear 56, 58 is configured to mesh with a corresponding output gear 64, 66 such that a rotation of an idler gear causes a rotation of the corresponding output gear. The shift mechanism 50 is coupled to the idler shaft 46 for selectively transferring torque from the idler shaft 46 to the plurality of idler gears 56, 58. The drive wheel 54 is coupled to an end of the idler shaft 46 and is configured to mesh with the drive pinion 42 of the electric machine 28 for transferring torque from the electric machine 28 to the idler shaft 46.

Figure 68:
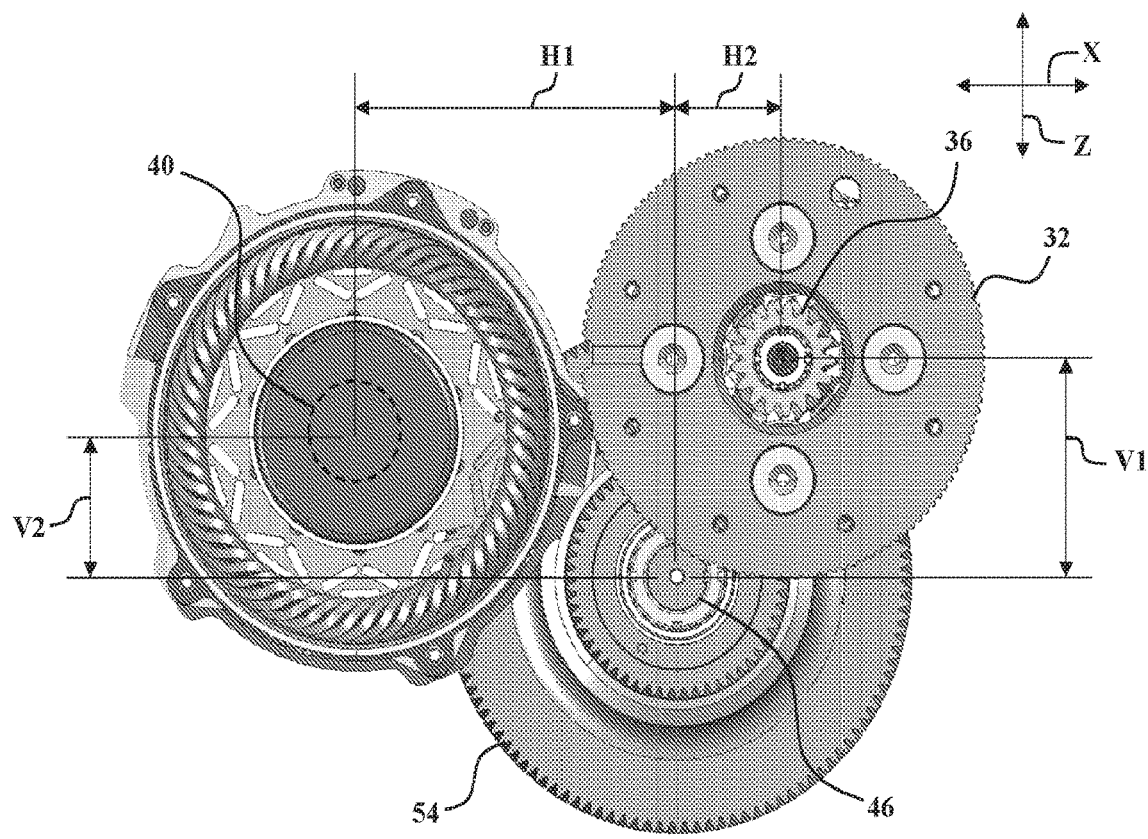
FIG. 68 is an elevation view of a front portion of the portion of the drive unit shown in FIGS. 59-64.
Figure 69:
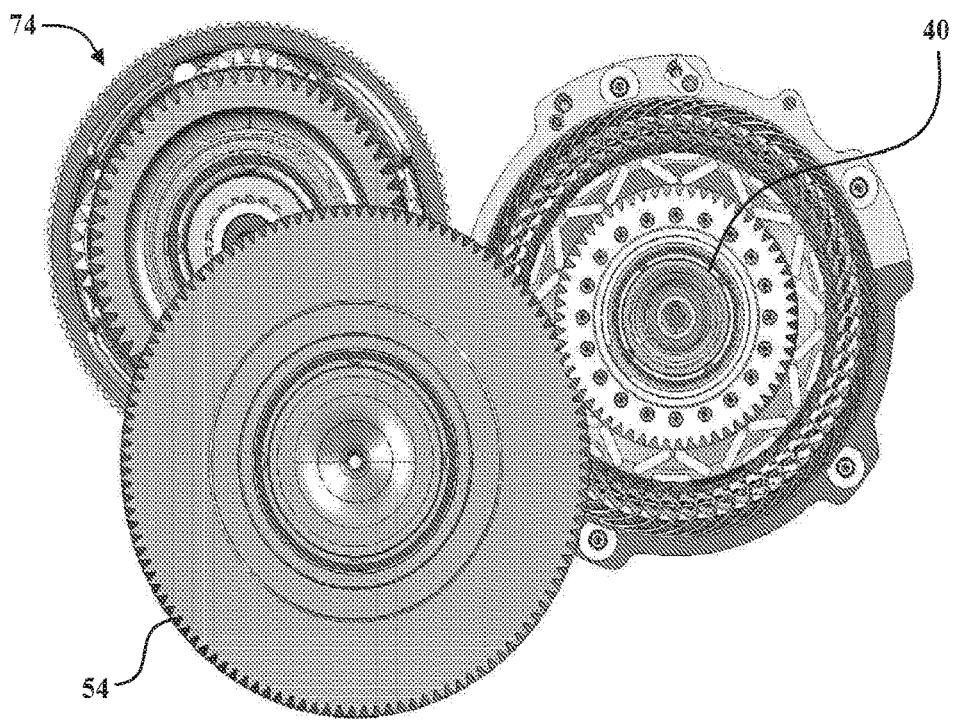
FIG. 69 is an elevation view of a rear portion of the portion of the drive unit shown in FIGS. 59-64.

In the illustrated embodiment, as shown in FIG. 68, the idler shaft 46 is spaced a first horizontal distance H1 from the rotor shaft 40 and second horizontal distance H2 from the axle shaft 36 along a horizontal axis X such that the idle shaft 46 is orientated between the axle shaft 36 and the rotor shaft 40 along the horizontal axis X. In the illustrated embodiment, the first horizontal distance H1 is greater than the second horizontal distance H2. In some embodiments, the first horizontal distance H1 is equal to, or less than, the second horizontal distance H2. The idler shaft 46 is also positioned a first vertical distance V1 below the output shaft 48 and the axle shaft 36, and a second vertical distance V2 below the rotor shaft 40 along a vertical axis Z. In the illustrated embodiment, the first vertical distance V1 is greater than the second vertical distance V2. In some embodiments, the first vertical distance V1 is equal to, or less than, the second vertical distance V2.

In some embodiments, the transmission unit 30 includes a 2-speed transmission including the plurality of output gears including the first output gear 64 and the second output gear 66 spaced along the output shaft 48. The plurality of idler gears includes the first idler gear 56 meshed with the first output gear 64 and the second idler gear 58 meshed with the second output gear 66.

In the illustrated embodiment, the wheel end assembly 32 includes the wheel hub 68 adapted to be coupled to at least one wheel 22, and the wheel hub planetary drive 74 coupled to the axle shaft 36 and to the wheel hub 68 for transferring torque from the axle shaft 36 to the wheel hub 68. The wheel hub planetary drive 74 includes the planetary gear having the sun gear 76 of the planetary gear coupled to the axle shaft 36. The planet carrier 78 of the planetary gear is coupled to the wheel hub 68, and the ring gear 82 of the planetary gear is coupled to the hub spindle 38 and is held stationary with respect to the planet carrier 78 and the sun gear 76.

Figure 58:
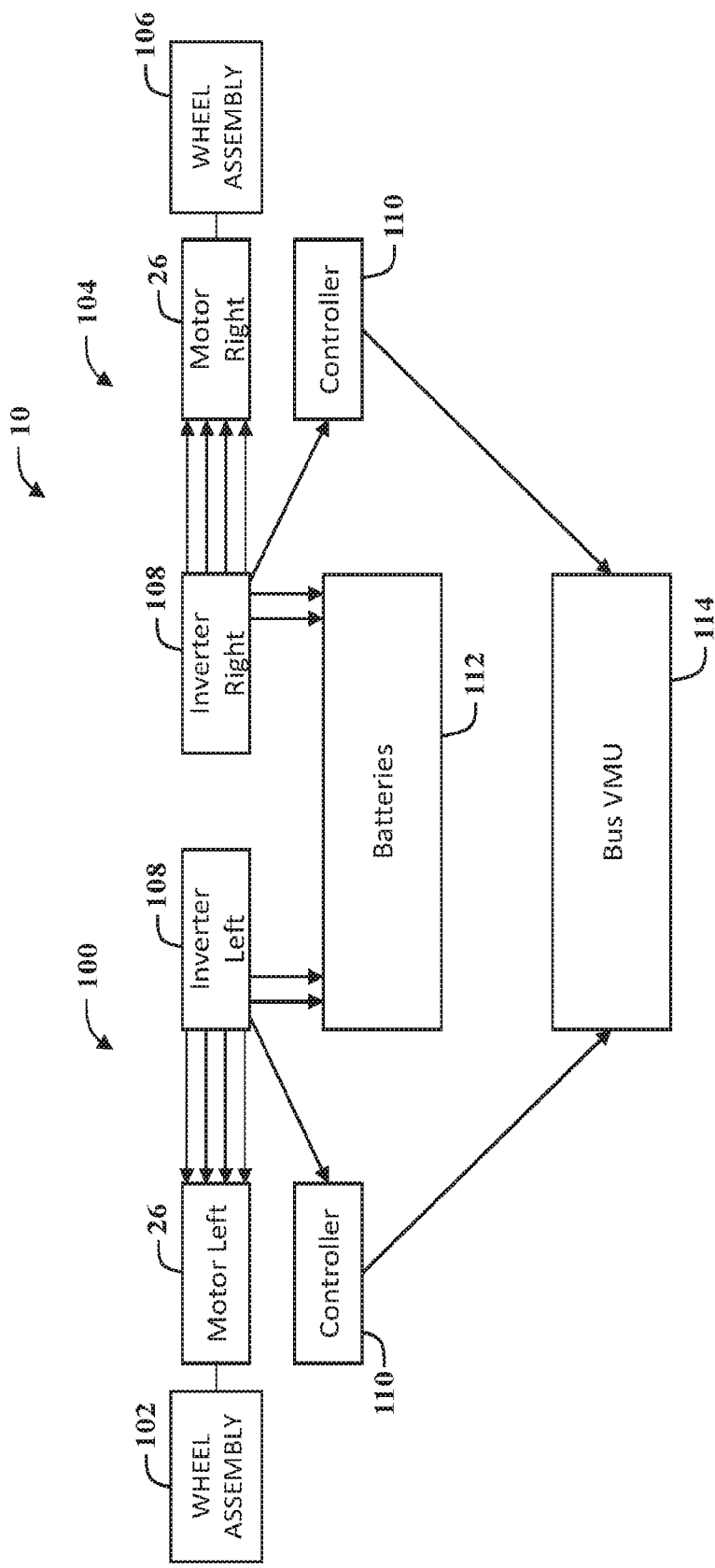
FIG. 58 is a block diagram of axle assembly shown in FIG. 2.

Referring to FIGS. 2 and 58, in some embodiments, the axle assembly 10 may include a first drive unit 100 for driving a first wheel assembly 102, and a second drive unit 104 for driving a second wheel assembly 106. The first drive unit 100 and the second drive unit 102 each include a drive unit 26. The first drive unit 100 includes a first axle shaft and the second drive unit 104 includes a second axle shaft oriented coaxially with the first axle shaft along the axle centerline axis 37 that defines the axis of rotation 24.

In one embodiment, the axle assembly 10 may include an inverter device 108 coupled to each of the first and second drive units 100 and 104, and a controller 110 for operating the electrical inverter device 108 and the drive units 100 and 104. Each inverter device 108 is coupled to one or more batteries 112 for supplying electrical power to the inverter electrical inverter 108. Each controller 110 is coupled to a VMU unit 114. In one embodiment, the first drive unit 100 is configured to operate independently from the second drive unit 104. In addition, each controller 110 is programmed to operate the corresponding motor assemblies at a variable speed. For example, in one embodiment, the VMU 114 may be programmed to transmit signals to each controller 110 such that, during operation, the controller 110 of the first drive unit 100 may operate the drive unit of the first drive unit 100 at a first rotational speed, and the controller 110 of the second drive unit 100 may operate the drive unit of the second drive unit 104 at a second rotational speed that is different than the first rotational speed of the first drive unit 100. In addition, during operation, only one of the motor assemblies may be operated to drive the corresponding wheel assembly with the other drive unit allowing the corresponding wheel assembly to spin freely. This provides the axle assembly 10 with the capability of not driving one of the electric motors when the load requirements are low. This can be done through the controller that doesn't send power to one of the motors, or can be done mechanically to disconnect the motor. Disconnection can be through a neutral position as part of a speed change mechanism, or through a clutch or the like. When in this mode, the axle assembly 10 operates to drive only one wheel on one side of the vehicle. For example, in a tandem axle configuration (four wheels), the axle assembly 10 may operate to generate power that can be alternated between different motors based on needs and loads.

Referring to FIGS. 2-52, in the illustrated embodiment, each outer section 16 includes a gearbox 116 that includes a gearbox housing 118 and a gearbox cover 120. The bridge section 14 includes a cradle assembly 122 that is coupled to each gearbox housing 118. The cradle assembly 122 includes a cradle frame 124, a top cover 126 that is removably coupled to a top portion 128 of the cradle frame 124, and a bottom cover 130 that is removably coupled to a bottom portion 132 of the cradle frame 124. The cradle frame 124 includes an inner surface 134 that defines a cavity 136 that extends through the cradle frame 124. The top cover 126 extends across the top portion 128 of the cradle frame 124 and the bottom cover 130 extends across the bottom portion 132 of the cradle frame 124 to enclose the cavity 136 to form a cradle chamber 138. The cradle chamber 138 is sized and shaped to receive one or more electrical inverter devices 108 that are positioned within the cradle chamber 138. In some embodiments, the cradle assembly may be built with the inverters inside or may be assembled without the inverters inside the cradle chamber.

The cradle frame 124 includes a forward member 140, a rear member 142, a first side member 144 and an opposite second side member 146. The first side member 144 and the second side member 146 extend along a longitudinal axis 148 and are spaced a distance apart along a transverse axis 150 that is perpendicular to the longitudinal axis 148. In the illustrated embodiments, the transverse axis 150 is substantially parallel to the axis of rotation 24 of each wheel 22. The forward member 140 is coupled between the first side member 144 and the second side member 146 to form a front portion 152 of the cradle frame 124. The rear member 142 is coupled between the first side member 144 and the second side member 146, and is spaced a distance from the forward member 140 along the longitudinal axis 148 to form a rear portion 154 of the cradle frame 124.

The first side member 144 and the second side member 146 each include one or more cable access openings 156 that extend through the side members. The cable access opening 156 is sized and shaped to receive a plurality of electrical cables therethrough to allow electrical and communication cables to extend from the electrical inverter devices 108 positioned within the cradle chamber 138 to an area outside the cradle chamber 138. The electrical and communication cables may include, but are not limited to, 3 phase cables, two DC cables, a motor connection cable, and customer interface cable.

A pair of forward mounting flanges 158 extend outwardly from opposite ends of the forward member 140. Each forward mounting flange 158 includes a mounting member 160 and a support arm 162 that is coupled between the mounting member 160 and the forward member 140. The mounting member 160 is spaced a distance outwardly from an outer surface 164 of a corresponding side member 144, 146 as measured along the transverse axis 150. The mounting member 160 includes a planar mounting surface 166 that is configured to engage an outer surface of a corresponding gearbox housing 118. The planar mounting surface 166 is orientated substantially parallel to the outer surface 164 of the corresponding side members 144, 146.

Referring to FIGS. 24-27, in the illustrated embodiment, the forward member 140 includes a top surface 168 and a bottom surface 170, and includes a height 172 measured between the top surface 168 and the bottom surface 170 along a vertical axis 174. The mounting member 160 includes a bottom surface 176 and a top surface 178 and the planar mounting surface 166 extending between the bottom surface 176 and the top surface 178. The planar mounting surface 166 includes a height 180 measured between the top surface 178 and the bottom surface 176 of the mounting member 160 along the vertical axis 174. The bottom surface 176 of the mounting member 160 is substantially flush with the bottom surface 170 of the forward member 140. The top surface 178 of the mounting member 160 is spaced a vertical distance from the top surface 168 of the forward member 140 such that the height 180 of the mounting surface 166 is greater than the height 172 of the forward member 140. A plurality of fastener openings extending through the planar mounting surface 166 of the mounting member 160. Each fastener opening is sized and shaped to receive a fastener such as, for example, a bolt and/or screw, therethrough to couple the cradle frame 124 to the gearbox housing 118.

In addition, the support arm 162 includes an arcuate top surface 182 that extends between the top surface 178 of the mounting member 160 and the top surface 168 of the forward member 140. The support arm 162 also includes an arcuate outer surface 184 and an arcuate inner surface 186. The arcuate inner surface 186 defines a gap 188 between the mounting member 160 and a side member outer surface 164 of the corresponding side members 144, 146. The gap 188 is sized and shaped to receive a portion of the gearbox housing 118 therein to facilitate coupling the cradle frame 124 to the gearbox housing 118.

Referring to FIGS. 19-23, in the illustrated embodiment, the forward member 140 also includes a suspension arm support assembly 190 that extends outwardly from the outer surface of the forward member 140. The outer surface of the forward member 140 includes an arcuate shape that defines a pair of slots 192 between opposing ends of the suspension arm support assembly 190 and the forward member outer surface. Each slot 192 is sized and shaped to receive an end of a tie-rod 20, and a mounting surface 194 is defined at each end of the suspension support arm assembly 190 to facilitate coupling the tie-rod 20 to the suspension arm support assembly 190. The forward member outer surface includes recessed portions 196 that are positioned with respect to at each end of the suspension support arm assembly 190. Each recessed portion 196 is sized and shaped to receive an end of a tie-rod 20 such that each tie-rod 20 extends outwardly from the forward member 140 at an oblique angle.

In the illustrated embodiment, a pair of rear mounting flanges 198 extend outwardly from opposite ends of the rear member 142. Each rear mounting flange 198 includes a rear mounting member 200 and a rear support arm 202 that is coupled between the rear mounting member 200 and the rear member 142. The rear mounting member 200 is spaced a distance outwardly from the corresponding side member outer surface 164 as measured along the transverse axis 150. The rear mounting member 200 also includes a rear planar mounting surface 204 that is configured to engage an outer surface of a corresponding gearbox housing 118, and is orientated substantially parallel to the side member outer surface 164 and the planar mounting surface 166 of the forward mounting member 160.

In the illustrated embodiment, the planar mounting surface 166 of the forward mounting member 160 and the rear planar mounting surface 204 that are positioned on the same side of the cradle frame 124 are orientated within the same plane to facilitate coupling the cradle assembly 122 to the corresponding gearbox housing 118. In addition, the rear planar mounting surface 204 includes a height 206 measured along the vertical axis 174 that is substantially similar to the height of the corresponding planar mounting surface 166 of the forward mounting member 160. In one embodiment, the forward mounting member 160 includes a length 302 (shown in FIG. 21) defined along the longitudinal axis 148, and the rear mounting member 200 includes a length 304 defined along the longitudinal axis 148 that is longer than the length 302 of the forward mounting member 160.

Each rear mounting member 200 includes a plurality of fastener openings extending through the rear planar mounting surface 204 that are sized and shaped to receive a fastener such as, for example, a bolt and/or screw, therethrough to couple the cradle frame 124 to the gearbox housing 118. Similar to the forward mounting member 160, each rear support arm 202 includes an arcuate top surface that extends between a top surface of the rear mounting member 200 and a top surface of the rear member 142. The rear support arm 202 also includes an arcuate outer surface and an arcuate inner surface. The arcuate inner surface of the rear support arm 202 defines a gap 208 between the rear mounting member 200 and the corresponding side member outer surface 164 that sized and shaped to receive a portion of the gearbox housing 118 therein.

Referring to FIGS. 28-35, in the illustrated embodiment the top cover 126 and the bottom cover 130 each include a plate 210 that includes an outer surface 212 and an inner surface 214 that extend between extend between a front endwall 216 and a rear endwall 218 along the longitudinal axis 148, and between opposing side endwalls 220 along the transverse axis 150. Each front endwall 216 includes an arcuate shape that matches the arcuate shape of the inner surface of the forward member 140. The top cover 126 and the bottom cover 130 each include a plurality of fastening tabs 222 extend outwardly from the side endwalls 220 and the rear endwall 218. Each fastening tab 222 includes an opening extending therethrough that is sized and shaped to receive fastener to facilitate coupling the top cover 126 to the cradle frame 124.

The top portion 128 of the cradle frame 124 includes a top grove 224 that is defined along a perimeter of the cavity 136 adjacent the cradle inner surface 134 that is sized and shaped to receive a portion of an outer edge of the top cover 126 such that the outer surface 212 of the top cover 126 is positioned substantially flush with the top surface of the forward member 140, rear member 142, and side members 144, 146 of the cradle frame 124. A plurality of positioning slots 226 are defined along the top surfaces of the rear member 142 and side members 144, 146. Each positioning slot 226 is sized and shaped to receive a corresponding fastening tab 222 therein. The top surfaces of the rear member 142 and side members 144, 146 include an opening defined within each positioning slot 226 to receive a fastener therein to facilitate coupling the top cover 126 to the cradle frame 124.

Similarly, the bottom portion 132 of the cradle frame 124 includes a bottom grove 228 that is defined along a perimeter of the cavity 136 adjacent the cradle inner surface 134 that is sized and shaped to receive a portion of an outer edge of the bottom cover 130 such that the outer surface 212 of the bottom cover 130 is positioned substantially flush with the bottom surface of the forward member 140, rear member 142, and side members 114, 146 of the cradle frame 124. A plurality of positioning slots 230 are defined along the bottom surfaces of the rear member 142 and side members 144, 146 for receiving a corresponding fastening tab 222 therein. An opening is defined within each positioning slot 230 to receive a fastener therein to facilitate coupling the bottom cover 130 to the cradle frame 124.

The top cover 126 also includes a plurality of openings 232 extending through the plate 210 and are sized and shaped to receive fasteners therethrough to facilitate mounting the electrical inverter devices 108 within the cradle chamber 138.

Referring to FIGS. 36-52, in the illustrated embodiment, the gearbox 116 includes the gearbox housing 118 and the gearbox cover 120. The gearbox housing 118 includes a body 234 including a plurality of walls having an inner surface 236 and a outer surface 238. The inner surface 236 defines a gearbox cavity 240 that is sized and shaped to receive the drive unit 26 therein. The outer surface 238 extends between a front-side portion 242 and a back-side portion 244 along the transverse axis 150, and between a forward portion 246 and a rear portion 248 along the longitudinal axis 148.

The front-side portion 242 of the gearbox housing 118 includes a first mounting surface 250 positioned adjacent to the forward portion 246 and a second mounting surface 252 positioned adjacent to the rear portion 248. The first mounting surface 250 includes a substantially planar surface having a shape matching the shape of the planar mounting surface 166 of the forward mounting flange 158. The second mounting surface 252 includes a substantially planar surface having a shape matching the shape of the planar mounting surface of the rear mounting flange 204. The first mounting surface 250 and the second mounting surface 252 each include a plurality of fastener openings extending through the gearbox housing 118 and are sized and shaped to receive corresponding fasteners therein to facilitate coupling the gearbox housing 118 to the cradle frame 124. In the illustrated embodiment, the forward mounting flange 158 is adapted to be coupled to the gearbox housing 118 at the first mounting surface 250 adjacent to the forward portion 246, and the rear mounting flange 198 is adapted to be coupled to the gearbox housing 118 at the second mounting flange 252 adjacent to the rear portion 248.

A shaft opening 256 extends through the back-side portion 244 and is sized and shaped to receive the axle shaft 36 therethrough. A motor opening 258 also extends through the back-side portion 244 and is sized and shaped to receive a portion of the electric machine 28.

In the illustrated embodiment, the forward portion 246 and the rear portion 248 each include a upper support flange 260 and a lower support flange 262 that is spaced a distance from the upper support flange 260 along the vertical axis 174. The upper support flange 260 and the lower support flange 262 are configured to couple the gearbox housing 118 to a suspension arm 18 extending outwardly from the gearbox housing 118 to facilitate coupling the axle assembly 10 to the vehicle. The forward portion 246 includes a suspension arm support flange 264 that is positioned above the upper support flange 260 along the vertical axis 174. The suspension arm support flange 264 is adapted to couple a tie-rod 20 to the gearbox housing 118 and is orientated such that the tie-rod 20 extends outwardly from the gearbox housing 118 substantially parallel to the longitudinal axis 148.

The front-side portion 242 also includes a mounting shoulder 266 extending outwardly from an outer surface of the front-side portion 242. The mounting shoulder 266 extends around a perimeter of the opening and includes a planar front surface 268. A plurality of holes are defined along the front surface 268 for receiving corresponding fasteners therein to facilitate coupling the gearbox cover 120 to the gearbox housing 118.

The gearbox cover 120 includes a body 270 including an outer surface 272 having a shape that substantially matches the shape of the mounting shoulder 266. The gearbox cover 120 includes a plurality of openings 274 extending around a perimeter of a mounting surface of the body 270 that are sized and shaped to received fasteners therethrough to facilitate coupling the gearbox cover 120 to the gearbox housing 118. The gearbox cover 120 is adapted to be coupled to the gearbox housing 118 to enclose the drive unit within the gearbox cavity 240. The mounting shoulder 266 includes a positioning groove 276 defined along the front surface 268. The gearbox cover 120 includes a positioning lip that extends outwardly from a surface of the gearbox cover 120 and is configured to engage the positioning groove 276 to facilitate coupling the gearbox cover 120 to the gearbox housing 118. The mounting shoulder 266 extends outwardly a distance from the front-side portion 242 along the transverse axis 150 such that the gearbox cover 120 is positioned within a gap 278 defined between the forward mounting flange 158 and the corresponding rear mounting flange 198 when the gearbox 116 is mounted to the cradle frame 124.

In the illustrated embodiment, the axle housing 12 includes the first outer section 16a, the second outer section 16b, and the bridge section 14 extending between the first outer section 16a and the second outer section 16b. The first outer section 16a includes the gearbox 116 including the inner surface 236 that defines the gearbox cavity 240 that is sized and shaped to receive the electric machine 28 and the transmission unit 30. The bridge section 14 includes the cradle assembly 122 that is coupled to the gearbox 116. The cradle assembly 122 includes the inner surface 134 defining the support chamber 138 that is sized and shaped to receive the inverter assembly 108 therein. In some embodiments, the second outer section 16b includes a second gearbox 116 that is coupled to the cradle assembly 122 and configured to support the second drive unit 26 therein.

In the illustrated embodiment, the gearbox 116 includes the gearbox housing 118 and the gearbox cover 120 that is removably coupled to the gearbox housing 118. The cradle assembly 122 is removably coupled to the gearbox housing 118.

The cradle assembly 122 includes the cradle frame 124. The cradle frame 124 includes the forward member, the rear member, and the pair of opposing side members 144, 146 extending between the forward member 140 and the rear member 142 along the longitudinal axis 148. A first mounting flange 158 extends outwardly from the first side member 144 of the pair of opposing side members and is configured to couple to an outer surface of the gearbox housing 118. A second mounting flange 198 extending outwardly from the first side member 144 and is configured to couple to the outer surface of the gearbox housing 118. The first mounting flange 158 is spaced a distance from the second mounting flange 198 along the longitudinal axis 148 to define the gap 278 between the first mounting flange 158 and the second mounting flange 198. The gearbox cover 120 is positioned within the gap 278 with the gearbox housing 118 coupled to the cradle frame 124.

The cradle frame 124 includes a suspension arm support assembly 190 that extends outwardly from the forward member 140. The suspension arm support assembly 190 is configured to couple to a tie-rod 20 that is coupled to a vehicle frame. The cradle assembly 122 includes the top cover 126 that is removably coupled to the top portion of the cradle frame 124. The cradle assembly 122 includes the bottom cover 130 that is removably coupled to the bottom portion of the cradle frame 124. In some embodiments, the bottom cover 130 is fixedly coupled to the bottom portion. In other embodiments, the cradle frame 124 and bottom cover 130 are formed as a unitary member. In the illustrated embodiment, the cradle frame 124 includes the cable access openings 156 defined through at least one of the pair of opposing side members 144, 146.

The gearbox housing 118 includes a body 234 that extends between a first endwall 310 and an opposite second endwall 312. A pair of first support flanges 314 extend outwardly from the first endwall 310. The pair of first support flanges 314 are configured to couple to a first mount arm 316 that is coupled to a vehicle frame. A pair of second support flanges 318 extend outwardly from the second endwall 312. The pair of second support flanges 318 are configured to couple to a second mount arm 320 that is coupled to the vehicle frame. The gearbox housing 118 also includes the suspension arm support flange 264 that is adapted to couple a tie-rod 20 to the gearbox housing 118.

In the illustrated embodiment, the axle assembly 10 is coupled to the vehicle frame 11. The axle assembly 10 includes the axle housing 12 including the bridge section 14 extending between the first outer section 16a and the opposite second outer section 16b. The first outer section 16a includes a first gearbox 116. The second outer section 16b include a second gearbox 116. The bridge section 14 includes the cradle assembly 122 that is coupled to the first gearbox and the second gearbox. The cradle assembly 122 includes the inner surface that defines the support chamber within the cradle assembly 122. A first drive unit 100 is adapted to couple to the first wheel assembly 102. The first drive unit 100 includes a first electric machine 28 positioned within the first gearbox 116. The first electric machine 28 includes a drive pinion coupled to a rotor shaft. The first transmission unit 30 is positioned within the first gearbox 116 and includes the output assembly 43 and the offset gear reduction assembly that is coupled to the output assembly 43 and the drive pinion of the first electric machine 28 for transferring torque from the first electric machine to the output assembly. The first axle shaft is coupled to the output assembly 43 and extends outwardly from an outer surface of the first gearbox 116. A second drive unit 102 is adapted to couple to a second wheel assembly 106. The second drive unit 102 includes a gear reduction and a second axle shaft that is oriented coaxially with the first axle shaft along the axle centerline axis. The gear reduction is positioned within the second gearbox 116. The second axle shaft extends outwardly from the second gearbox towards the second wheel assembly. An inverter assembly 108 is positioned within the support chamber of the cradle assembly 122. The inverter assembly is coupled to the first electric machine for providing electrical power to the first electric machine.

In one embodiment, the axle assembly 10 may include a 700 mm Walk Through ultra-low floor (ULF) with a 275/70r22.5 Tire, 2 speed: −11.1:1; 19.6:1, Axle Weight Rating of 11,600 kg, and 750,000 mile capable. The axle assembly 10 may also include a 1,000 mm Walk Through ULF with 445/45r22.5 Tire, 2 speed: 11.1:1; 19.6:1, Axle Weight Rating of 10,500 kg, and 750,000 mile capable. The axle assembly 10 may also include a 580 mm Walk Through ULF with 305/70r22.5 Tire, 2 speed: 11.1:1; 19.6:1, Axle Weight Rating of 12,600 kg, and 750,000 mile capable. The axle assembly 10 may also include a 700 mm Walk Through ULF, One Speed, 275/70r22.5 Tire, 1 speed: 15:1, Axle Weight Rating of 11,600 kg, and 750,000 mile capable. The axle assembly 10 may also include a 1,000 mm Walk Through ULF, One Speed with 275/70r22.5 Tire, 1 speed: 15:1, Axle Weight Rating of 10,500 kg, 750,000 mile capable. The axle assembly 10 may also include a 580 mm Walk Through ULF, One Speed with 305/70r22.5 Tire, 1 speed: 15:1, Axle Weight Rating of 12,600 kg, and 750,000 mile capable.

A controller, computing device, server or computer, such as described herein, includes at least one or more processors or processing units and a system memory (see above). The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. An axle assembly comprising:
   an axle housing including a first gearbox, a second gearbox, and a bridge section between the first gearbox and the second gearbox; and
   a drive unit for driving a wheel assembly, the drive unit including:
      an axle shaft extending along an axle centerline axis between a first axle end and a second axle end with the second axle end disposed within the axle housing;
      a wheel end assembly coupled to the first axle end spaced from the axle housing;
      an electric machine positioned within the first gearbox and including a rotor shaft, a drive pinion coupled to the rotor shaft, and an electric motor for rotating the rotor shaft, the rotor shaft extending along a rotor shaft centerline axis orientated parallel to the axle centerline axis; and
      a transmission unit positioned within the first gearbox and configured to transfer torque from the electric machine to the axle shaft, the transmission unit including:
         an output assembly coupled to the second axle end such that a rotation of the output assembly rotates the axle shaft; and
         an offset gear reduction assembly coupled to the output assembly and the drive pinion of the electric machine for transferring torque from the electric machine to the output assembly.

2. The axle assembly of claim 1, wherein the electric motor is positioned between the drive pinion and the wheel end assembly.

3. The axle assembly of claim 1, wherein the rotor shaft extends along the rotor shaft centerline axis away from the electric motor in a first direction, and the axle shaft extends along the axle centerline axis away from the axle housing in a second direction with the first direction being opposite to the second direction.

4. The axle assembly of claim 1, wherein the output assembly includes:
   an output shaft coupled to the second axle end and orientated co-axially with the axle shaft; and
   a plurality of output gears fixedly coupled to the output shaft.

5. The axle assembly of claim 4, wherein the offset gear reduction assembly includes: an idler shaft orientated substantially parallel with the output shaft;
   a plurality of idler gears rotatably coupled to the idler shaft, each idler gear configured to mesh with a corresponding output gear such that a rotation of an idler gear causes a rotation of the corresponding output gear;
   a shift mechanism coupled to the idler shaft for selectively transferring torque from the idler shaft to the plurality of idler gears; and
   a drive wheel coupled to an end of the idler shaft, the drive wheel configured to mesh with the drive pinion for transferring torque from the electric machine to the idler shaft.

6. The axle assembly of claim 5, wherein the idler shaft is spaced a horizontal distance from the rotor shaft.

7. The axle assembly of claim 6, wherein the idler shaft is positioned a vertical distance below the output shaft and the rotor shaft.

8. The axle assembly of claim 5, wherein the transmission unit includes a 2-speed transmission including the plurality of output gears including a first output gear and a second output gear spaced along the output shaft, the plurality of idler gears includes a first idler gear meshed with the first output gear and a second idler gear meshed with the second output gear.

9. The axle assembly of claim 1, further comprising an inverter assembly positioned within the axle housing and coupled to the electric machine for providing electrical power to the electric machine.

10. The axle assembly of claim 1, further comprising
   a second drive unit for driving a second wheel assembly, the second drive unit
including: a second axle shaft extending along the axle centerline axis;
   a second wheel end assembly coupled to the second axle shaft and spaced from the second gearbox;
   a second electric machine positioned within the second gearbox; and
   a second transmission unit positioned within the second gearbox and configured to transfer torque from the second electric machine to the second axle shaft, the transmission unit including: a second output assembly coupled to the second axle shaft such that a rotation of the second output assembly rotates the second axle shaft; and
   a second offset gear reduction assembly coupled to the second output assembly and the second electric machine for transferring torque from the second electric machine to the second output assembly.

11. The axle assembly of claim 1, wherein the bridge section includes a cradle assembly including an inner surface defining a support chamber.

12. The axle assembly of claim 11, further comprising an inverter assembly positioned within the support chamber and coupled to the electric machine.

13. An axle housing for use with an axle assembly including a drive unit including an axle shaft, an electric machine, a transmission unit coupled to the axle shaft and the electric machine, the axle housing comprising:
   a first outer section, a second outer section, and a bridge section extending between the first outer section and the second outer section;
   the first outer section including a gearbox including an inner surface that defines a cavity configured to receive the electric machine and the transmission unit therein, the axle shaft extending outwardly from the first outer section; and
   the bridge section including a cradle assembly coupled to the gearbox, the cradle assembly including an inner surface that defines a support chamber.

14. The axle housing of claim 13, wherein the axle assembly includes a second drive unit, the second outer section includes a second gearbox coupled to the cradle assembly and configured to support the second drive unit therein.

15. The axle housing of claim 13, wherein the gearbox housing includes:
   a body extending between a first endwall and an opposite second endwall;
   a pair of first support flanges extending outwardly from the first endwall, the pair of first support flanges configured to couple to a first mount arm coupled to a vehicle frame; and
   a pair of second support flanges extending outwardly from the second endwall, the pair of second support flanges configured to couple to a second mount arm coupled to the vehicle frame.

16. The axle housing of claim 13, wherein the axle shaft extends along an axle centerline axis between a first axle end and a second axle end with the second axle end disposed within the gearbox; and wherein a wheel end assembly is coupled to the first axle end spaced from the gearbox.

17. The axle housing of claim 16, wherein the electric machine includes a rotor shaft, a drive pinion coupled to the rotor shaft, and an electric motor for rotating the rotor shaft, the rotor shaft extending along a rotor shaft centerline axis orientated parallel to the axle centerline axis.

18. The axle housing of claim 17, wherein the rotor shaft extends along the rotor shaft centerline axis away from the electric motor in a first direction, and the axle shaft extends along the axle centerline axis away from the gearbox in a second direction with the first direction being opposite to the second direction.

19. The axle housing of claim 17, wherein the transmission unit includes:

an output assembly coupled to the second axle end such that a rotation of the output assembly rotates the axle shaft; and an offset gear reduction assembly coupled to the output assembly and the drive pinion of the electric machine for transferring torque from the electric machine to the output assembly.

20. The axle housing of claim 19, wherein the offset gear reduction assembly includes: an idler shaft orientated substantially parallel with the output shaft;

a plurality of idler gears rotatably coupled to the idler shaft, each idler gear configured to mesh with a corresponding output gear such that a rotation of an idler gear causes a rotation of the corresponding output gear;

a shift mechanism coupled to the idler shaft, the shift mechanism including an idler shaft synchronizer to selectively transfer torque from the idler shaft to the output shaft via low gear or high gear pairs; and a drive wheel coupled to an end of the idler shaft, the drive wheel configured to mesh with the drive pinion for transferring torque from the electric machine to the idler shaft.

* * * * *